United States Patent
Abe et al.

(10) Patent No.: US 7,845,681 B2
(45) Date of Patent: Dec. 7, 2010

(54) AIRBAG AND AIRBAG APPARATUS

(75) Inventors: Kazuhiro Abe, Tokyo (JP); Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 224 days.

(21) Appl. No.: 12/223,440

(22) PCT Filed: Feb. 2, 2007

(86) PCT No.: PCT/JP2007/051771
§ 371 (c)(1),
(2), (4) Date: Jul. 31, 2008

(87) PCT Pub. No.: WO2007/088961
PCT Pub. Date: Aug. 9, 2007

(65) Prior Publication Data
US 2009/0020991 A1    Jan. 22, 2009

(30) Foreign Application Priority Data
Feb. 3, 2006  (JP) .............................. 2006-027355
Mar. 10, 2006  (JP) .............................. 2006-066041

(51) Int. Cl.
*B60R 21/16* (2006.01)
(52) U.S. Cl. .................. 280/743.1; 280/736; 280/743.2
(58) Field of Classification Search .................. 280/736, 280/739, 743.1, 743.2
See application file for complete search history.

(56) References Cited

U.S. PATENT DOCUMENTS

| | | | |
|---|---|---|---|
| 6,932,385 B2 | 8/2005 | Hawthorn et al. | |
| 2003/0020266 A1* | 1/2003 | Vendely et al. | ............. 280/739 |
| 2004/0012180 A1 | 1/2004 | Hawthorn et al. | |
| 2004/0017069 A1 | 1/2004 | Fischer | |
| 2004/0090054 A1* | 5/2004 | Bossecker et al. | ........... 280/739 |

(Continued)

FOREIGN PATENT DOCUMENTS

DE    196 40 322 A1    3/1998

(Continued)

OTHER PUBLICATIONS

European Search Report issued by European Patent Office dated Sep. 25, 2009 for European Patent Application No. 07713771.9.

*Primary Examiner*—Faye M. Fleming
(74) *Attorney, Agent, or Firm*—Foley & Lardner LLP

(57) ABSTRACT

An airbag and an airbag apparatus in which a vent hole is in a closed state or a slightly open state until an occupant plunges into the airbag and the vent hole becomes to an open state or a widely open state when the occupant plunges into the airbag. The inside of the airbag 10 is partitioned by inner panels 22A, 22B into a first chamber 1 centrally located and a second chamber surrounding the first chamber 1. A vent hole 18 is formed in a rear panel 14 to allow the communication between the second chamber 2 and the outside of the airbag. A lid member 60 is provided to cover the vent hole 18 from the inside of the rear panel 14. A tether (tethering member) 70 connects the lid member 60 and the inner panels 22A, 22B. When the airbag 10 is inflated, the tether 70 is tensioned to prevent the lid member 60 from moving out of the airbag 10.

23 Claims, 35 Drawing Sheets

U.S. PATENT DOCUMENTS

| | | |
|---|---|---|
| 2004/0130135 A1* | 7/2004 | Ekdahl .................. 280/739 |
| 2005/0248137 A1 | 11/2005 | Delventhal et al. |
| 2006/0151979 A1 | 7/2006 | DePottey et al. |
| 2006/0290116 A1* | 12/2006 | Bradburn ................ 280/739 |
| 2007/0145729 A1* | 6/2007 | Ishiguro et al. ............ 280/739 |

FOREIGN PATENT DOCUMENTS

| | | |
|---|---|---|
| DE | 103 32 549 A1 | 3/2004 |
| FR | 2 757 465 | 6/1998 |
| FR | 2 757 465 A1 | 6/1998 |
| JP | 6-127330 | 5/1994 |
| JP | 06-127330 A | 5/1994 |
| JP | 8-1156 | 1/1996 |
| JP | 9-142239 | 6/1997 |
| JP | 10-53084 | 2/1998 |
| JP | 2000-16228 | 1/2000 |
| JP | 2000-43674 | 2/2000 |
| JP | 2000-142307 | 5/2000 |
| JP | 2001-277991 | 10/2001 |
| JP | 2001-301555 | 10/2001 |
| JP | 2003-40065 | 2/2003 |
| JP | 2004-256091 | 9/2004 |
| JP | 2005-153726 | 6/2005 |
| WO | WO 2004/009404 A2 | 1/2004 |
| WO | WO 2006/041547 A2 | 4/2006 |
| WO | WO 2006/041552 A2 | 4/2006 |
| WO | WO 2006/073534 A2 | 7/2006 |

* cited by examiner

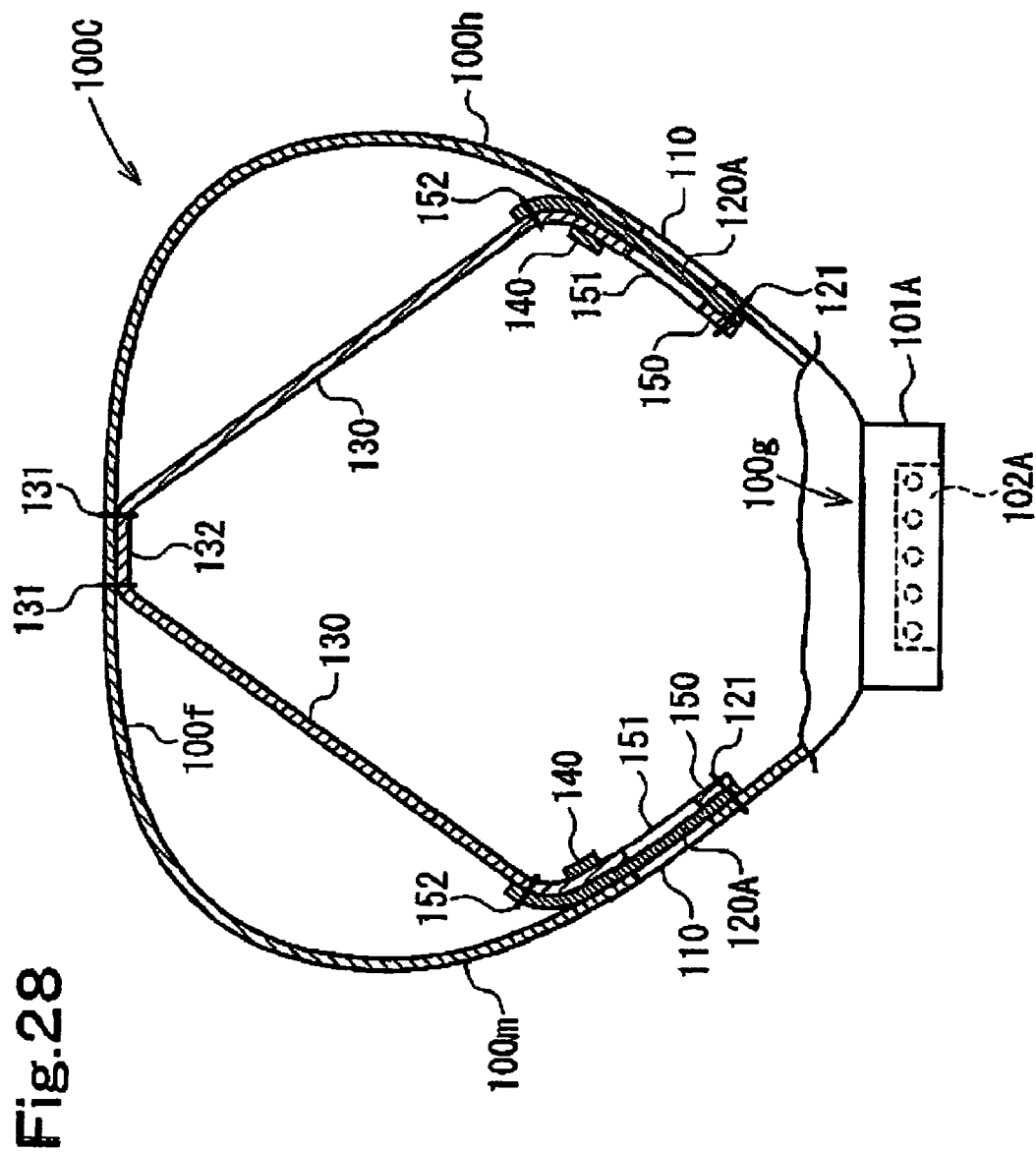

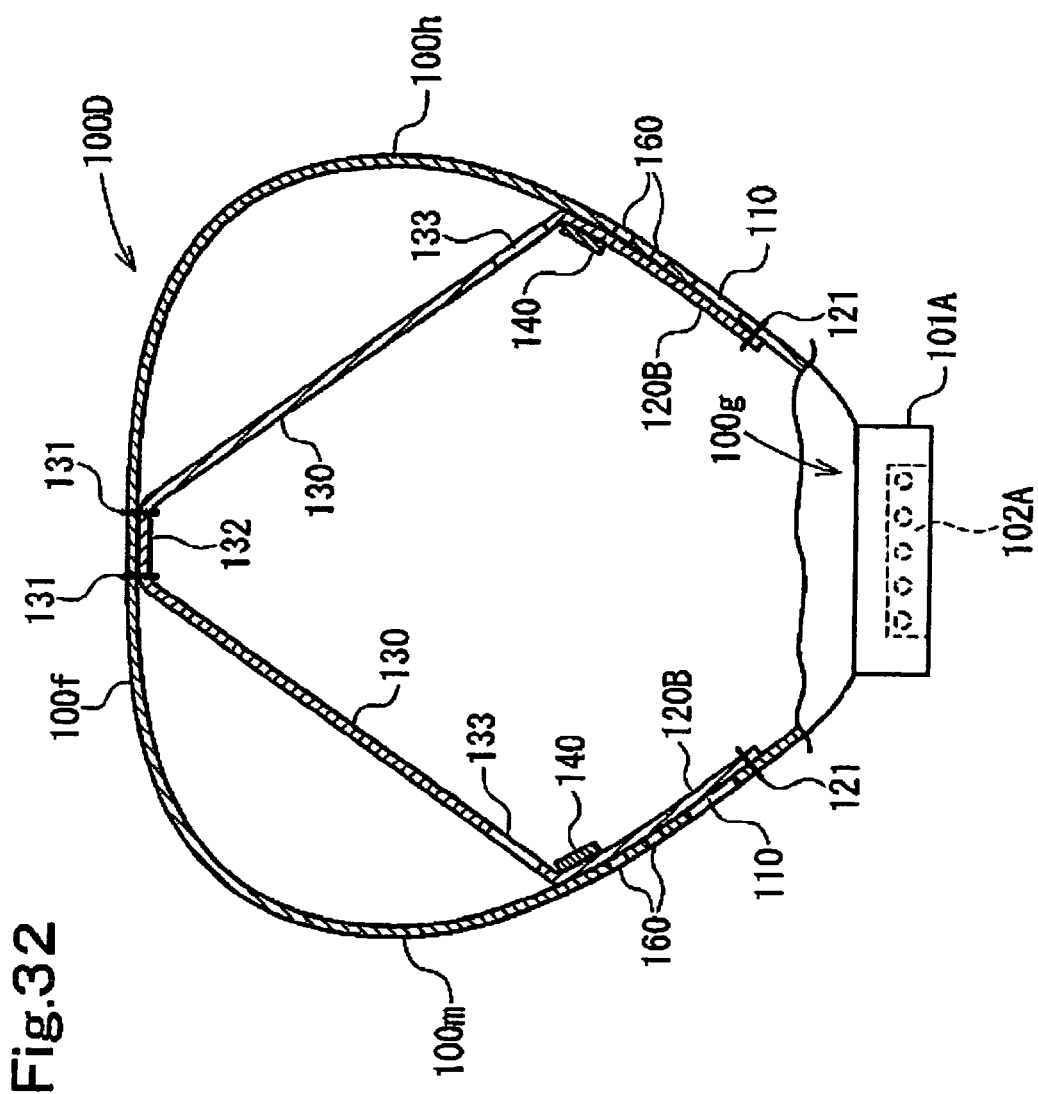

AIRBAG AND AIRBAG APPARATUS

TECHNICAL FIELD

The present invention relates to an airbag having a vent hole, which allows gas to be expelled from the inside of the airbag to the outside of the airbag so that an occupant is softly received by the airbag, and a regulating means for regulating gas flow through the vent hole. Further, the present invention relates to an airbag apparatus having the airbag.

BACKGROUND ART

It is well known to form a vent hole in an airbag to allow gas to be expelled from the inside of the airbag through the vent hole when a vehicle occupant plunges into the inflated airbag, whereby the vehicle occupant is softly received and restrained by the airbag.

JP2000-16228A discloses an airbag in which a vent hole is covered by a lid member until the inner gas pressure of the airbag reaches a predetermined value, and the lid member is released to open the vent hole when the inner gas pressure reaches the predetermined value.

In the aforementioned publication, description is made as regard to a driver-side airbag of a vehicle. The airbag disclosed in the aforementioned publication is made by sewing the peripheries of two circular sheet members (panels) together to form one chamber as a whole. The vent hole is formed in the sheet members on a side opposite to the vehicle occupant side of the airbag. The lid member is arranged to cover the vent hole.

In the airbag disclosed in the aforementioned publication, the vent hole is covered by the lid member until the inner gas pressure of the airbag reaches the predetermined value so that the outflow of gas through the vent hole is restricted when the airbag is inflated, thereby rapidly making the inner pressure of the airbag high and thus rapidly inflating the airbag.

As the inner gas pressure of the airbag exceeds the predetermined value, the lid member is released so as to open the vent hole. Therefore, gas flows out from the inside of the airbag through the vent hole when the vehicle occupant plunges into the inflated airbag, whereby the vehicle occupant is softly received and restrained by the airbag Patent Document 1: JP2000-16228A In the publication JP2000-16228A, the vent hole may be opened even in a stage before the occupant plunges into the airbag if the inner pressure of the airbag is increased to the predetermined value or more so that gas is unfortunately flowed out through the vent hole.

DISCLOSURE OF THE INVENTION

It is an object of the present invention to provide an airbag and an airbag apparatus in which a vent hole is kept in the closed state or the slightly opened state before an occupant plunges into the airbag and the vent hole is opened or widely opened when the occupant plunges into the airbag.

An airbag of the present invention includes a vent hole and a restriction means for restricting outflow of gas through the vent hole, and characterized in that the vent hole is formed in a surface opposite to an occupant facing surface of the airbag in the inflated state or in a side surface of the airbag in the inflated state, that the restriction means comprises: a lid member which is disposed inside the airbag to cover the vent hole; and a tethering member which extends inside the airbag to connect the lid member and said occupant facing surface, and that when the airbag is inflated, the lid member is prevented from moving to outside of the airbag and is overlaid on said vent hole by the tethering member so that the vent hole is closed or slightly opened, and as an occupant collides with the inflated airbag to depress said occupant facing surface, the lid member is pushed out of the airbag through the vent hole by the inner gas pressure of the airbag so as to open or widely open the vent hole.

An airbag apparatus of the present invention comprises the aforementioned airbag of the present invention, a gas generator for supplying gas into the airbag; a retainer to which the airbag is mounted; and a fixing member for fixing the airbag to the retainer.

The airbag apparatus may have such a structure that the fixing member is arranged inside the airbag, the fixing member is provided with an insertion loop through which said tethering member is inserted, said tethering member has one end portion which is connected to said occupant facing surface of the airbag, a midway portion which is inserted through the insertion loop, and the other end portion which continues to one end of said lid member, and the other end of the lid member on the side opposite to the tethering member relative to the vent hole is connected to a portion near the vent hole of the airbag.

BRIEF DESCRIPTION OF THE DRAWINGS

FIG. 17b is an enlarged perspective view of the vent hole and its periphery shown in FIG. 17a.

FIG. 18a is a perspective view of a passenger-side airbag according to an embodiment in its inflated state and FIG. 18b is a vertical sectional view the airbag shown in FIG. 18a.

FIGS. 23a and 23b are horizontal sectional views showing operational states of an airbag according to an embodiment, wherein FIG. 23a shows a state before an occupant depresses an occupant-side surface of the inflated airbag and FIG. 23b shows a state that the occupant depresses the occupant-side surface.

FIG. 24a is a perspective view of an airbag according to an embodiment in its inflated state and FIG. 24b is a vertical sectional view of the airbag shown in FIG. 24a.

FIG. 25a is a horizontal sectional view showing a state before an occupant collides with the airbag shown in FIG. 24a and FIG. 25b is a horizontal sectional view after the occupant collides with the airbag shown in FIG. 24a.

FIG. 26 is a horizontal sectional view immediately after the start of inflation of the airbag shown in FIG. 24a.

FIG. 28 is a horizontal sectional view of the airbag provided with the lid member shown in FIG. 27a in its inflated state.

FIG. 29 is a horizontal sectional view showing a state after an occupant collide with the airbag shown in FIG. 27a.

FIG. 32 is a horizontal sectional view of the airbag shown in FIG. 31a in its inflated state.

FIG. 33 is a horizontal sectional view showing a state after an occupant collides with the airbag shown in FIG. 31a.

FIG. 34 is a vertical sectional view showing the state after the occupant collides with the airbag shown in FIG. 31a.

DETAILED DESCRIPTION

Figure 1:
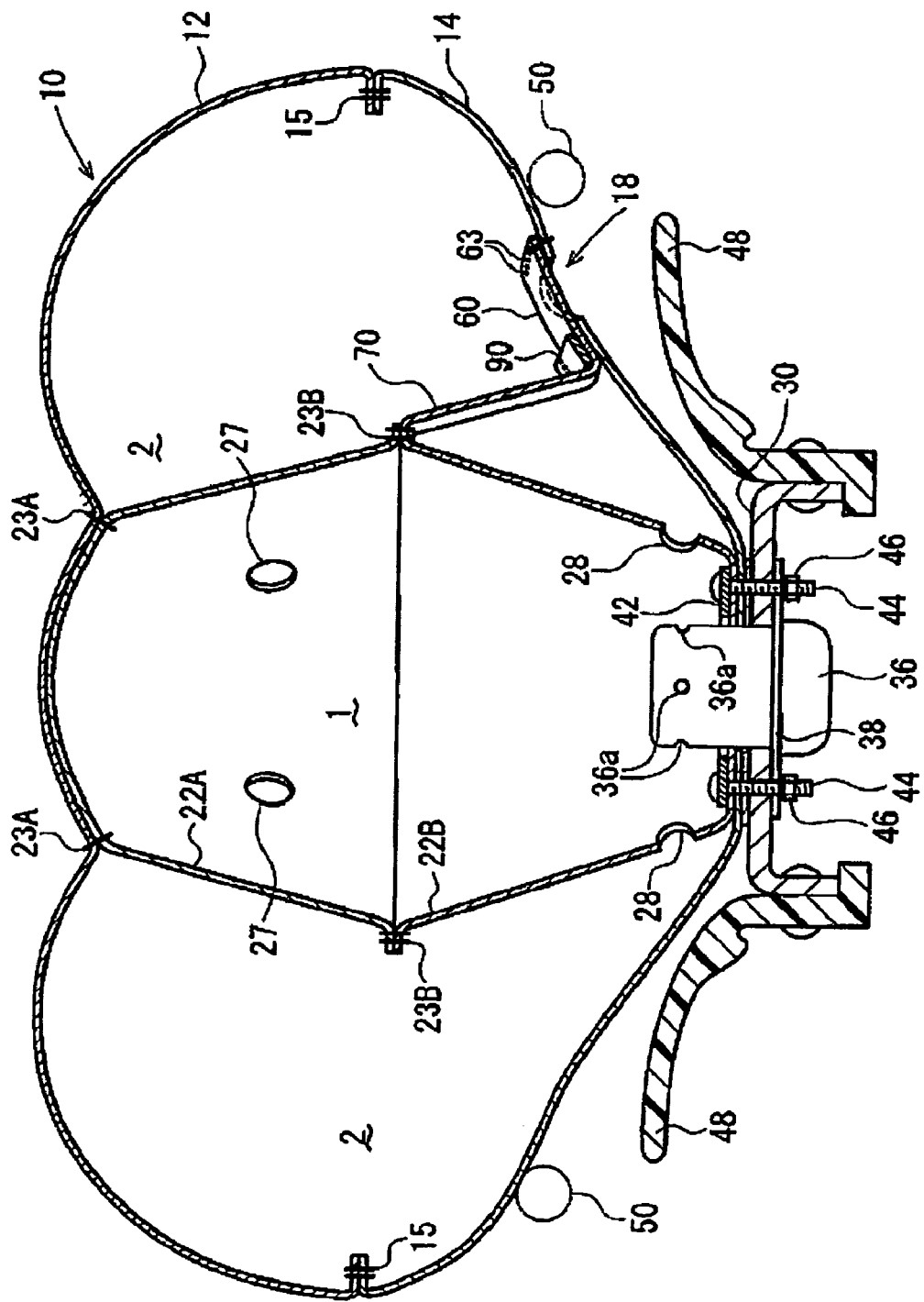
FIG. 1 is a sectional view of an airbag and an airbag apparatus according to an embodiment.

In an airbag and an airbag apparatus of the present invention, in a stage before an occupant plunges into the airbag when the airbag is inflated, a lid member is prevented from moving out of the airbag by a tethering member so that the lid member is overlaid on a vent hole so that the vent hole is closed or slightly opened. Therefore, the outflow of gas through the vent hole is restricted, thereby rapidly inflating the airbag. Further, this prevents and restricts gas supplied from a gas generator of the airbag apparatus into the airbag from uselessly flowing out of the airbag, thereby allowing the use of a relatively low-power gas generator and thus achieving the reduction in size, weight, and manufacturing cost of the airbag apparatus.

As the occupant plunges into the inflated airbag, an occupant facing surface of the airbag is pressed by the occupant and is thus depressed so that the lid member is allowed to move out of the airbag. Accordingly, the lid member is pressed out of the airbag through the vent hole by the inner gas pressure of the airbag so as to make the vent hole open or widely open, thereby allowing gas to flow out of the airbag through the vent hole. Therefore, the occupant can be received softly and restrained by the airbag Aspects of the present invention will be described below.

i) An aspect of the present invention may employ such a structure that an insertion loop through which said tethering member is inserted is formed on an inner surface of said surface opposite to the occupant facing surface or on an inner surface of said side surface, wherein the tethering member has one end portion which is connected to said occupant facing surface, a midway portion which is inserted through the insertion loop, and the other end portion which continues to one end (hereinafter, referred to as "free end") of said lid member, and wherein the other end (hereinafter, referred to as "fixed end") of the lid member on the side opposite to the tethering member relative to the vent hole is connected to a portion in the vicinity of the vent hole of the airbag.

According to this aspect, as the airbag is inflated, the lid member and a portion (a portion between the insertion loop and the lid member) of the tethering member continued from the lid member continuously extend along the inner surface of the airbag, thereby obtaining improved followability of the lid member relative to the inner surface of the airbag, i.e. improved closability of the vent hole.

ii) Another aspect of the present invention may employ such a structure that a first window is formed in the lid member, and a cover panel is overlaid on the lid member to cover the first window, wherein one end of said cover panel is connected to a portion of the lid member on the tethering member side relative to the first window, and the other end of said cover panel is connected to a portion of the lid member on the side opposite to the tethering member side relative to the first window, wherein a second window is formed in the cover panel at a position not corresponding to the first window, wherein when the airbag is inflated, the lid member is pulled by the tethering member and is thus tensioned and, according to the tension of the lid member, the cover panel is also tensioned to be overlaid on the lid member so that the first window and the second window are both closed, and wherein when the occupant collides with the inflated airbag to depress said occupant facing surface, the tension of the lid member is canceled so that the lid member is pushed out of the airbag through the vent hole by the inner gas pressure of the airbag, and the tension of the cover panel is also cancelled so that the cover panel is spaced apart form the lid member so as to open the first window and the second window.

In this aspect, the first window is formed in the lid member and the first window is covered by the cover panel. In addition, the second window is formed in the cover panel at a position not to be superposed on the first window.

According to this aspect, when the airbag is inflated, the lid member is pulled by the tethering member and is thus tensioned to be overlaid on the vent hole, and the cover panel is also tensioned to be overlaid on the lid member, thereby closing the first window and the second window. Therefore, gas inside the airbag is restricted from flowing out of the airbag through the first window, the second window, and the vent hole so that the airbag is rapidly inflated.

When the occupant collides with the inflated airbag to depress the occupant facing surface of the airbag, the tension of the lid member is cancelled so that the lid member is pushed out of the airbag through the vent hole by gas inner pressure of the airbag and the tension of the cover panel is also canceled so that the cover panel is spaced apart from the lid member, thereby opening the first window and the second window, respectively.

Even though the gas flowing out of the airbag through the vent hole collides with the inner side (the airbag side) of the lid member, the gas flows outside of the lid member (side opposite to the airbag side) through the first opening and the second opening, whereby gas smoothly flows out of the airbag.

In addition, even when the depression amount of the occupant facing surface when the occupant collides with the inflated airbag so that the spacing amount of the lid member from the vent hole is small, enough amount of gas flows out of the airbag because the gas flows out not only through the space between the lid member and the vent hole but also the first window and the second window.

iii) Yet another aspect of the present invention may employ such a structure that the first window and the second window are slits extending in the longitudinal direction of said tethering member.

This can improve the closability of the first window and the second window when the lid member and the cover panel are pulled by the tethering member and are thus tensioned and overlaid on the other.

iv) Yet another aspect of the present invention may employ such a structure that a sub vent hole is formed in said surface opposite to the occupant facing surface or said side surface at a position between the vent hole (hereinafter, referred to as "main vent hole") and said insertion loop, for allowing the communication between the inside and the outside of the airbag, wherein said lid member is arranged to cover both the main vent hole and the sub vent hole continuously, and wherein a release hole is formed in a portion of said lid member between an area thereof facing the sub vent hole and said tethering member or in a midway portion in the longitudinal direction of said tethering member, and is positioned to correspond to the sub vent hole so as to open the sub vent hole when said lid member is pushed out through the main vent hole.

In this aspect, the sub vent hole for allowing the communication between the inside and the outside of the airbag is formed in the surface opposite to the occupant facing surface or the side surface at a position between the main vent hole and the insertion loop for the tether, the lid member is arranged to cover both the main vent hole and the sub vent hole continuously. Further, the release hole is formed in a portion of the lid member between an area thereof facing the sub vent hole and the tethering member or in a midway portion in the longitudinal direction of the tethering member, and is positioned to correspond to the sub vent hole so as to open the sub vent hole when the lid member is pushed out through the main vent hole.

According to this aspect, when the airbag is inflated, the lid member is pulled by the tethering member and is thus tensioned and overlaid on both the main vent hole and the sub vent hole. Therefore, the outflow of gas through the main vent hole and the sub vent hole is restricted, thereby rapidly inflating the airbag.

When the occupant collides with the inflated airbag and depresses the occupant facing surface of the airbag, the lid member is pushed out of the airbag through the main vent hole by gas inner pressure of the airbag so as to open and widely open the main vent hole. As the lid member is pushed out through the main vent hole, the release hole moves toward the sub vent hole and is superposed on the sub vent hole, thereby opening the sub vent hole. Accordingly, gas flows out through both the main vent hole and the sub vent hole.

Therefore, even when the depression amount of the occupant facing surface when the occupant collides with the inflated airbag so that the spacing amount of the lid member from the vent hole is small, enough amount of gas flows out of the airbag because the gas flows out not only through spaces between the lid member and the vent hole but also the sub vent hole.

v) Yet another aspect of the present invention may employ such a structure that a plurality of the sub vent holes are formed at positions shifted in a direction from said insertion loop to said main vent hole, wherein said release hole is an elongated hole extending in the longitudinal direction of the tethering member.

According to this structure, the larger the depression amount of the occupant facing surface when the occupant collides with the inflated airbag is, the larger the moving distance of the release hole toward the sub vent hole is, so that the release hole is superposed on a larger number of the sub vent holes. The entire opening amount of the sub vent holes is increased so that a larger amount of gas flows out of the airbag.

As the flowing amount of gas out of the airbag is increased, the impact absorbing amount of the airbag is increased.

Therefore, according to this aspect, the impact absorbing amount can be adjusted according to the depression amount of the occupant facing surface of the airbag.

For example, the larger the occupant's body is or the higher the collision speed is, the larger the depression amount of the occupant facing surface when the occupant collides with the inflated airbag is. According to the aspect of claim 6, in this case, the entire opening amount of the sub vent hole is increased so that a larger amount of gas flows out of the airbag, thereby sufficiently absorbing impact.

vi) Yet another aspect of the present invention may employ such a structure that at least two vent holes are formed in the surface opposite to the occupant facing surface or the side surfaces, wherein the lid members are provided to cover the vent holes, respectively, and the free end portions of said lid members are connected to said occupant facing surface via the tethering members.

In this case, midway portions in the longitudinal direction of the tethering members are detachably connected to each other by a connecting means, which is adapted to cancel the connection between the tethering members when the inner pressure of the airbag reaches a predetermined value or more.

According to this structure, since the midway portions in the longitudinal direction of the tethering members are connected to each other until the inner pressure of the airbag reaches the predetermined value from the start of inflation of the airbag, the tethering members are restricted from elongating toward the occupant side. Therefore, the tethering members are tensioned before the occupant facing surface of the airbag bulges to a position where is the position at the completion of inflation of the airbag. Accordingly, at an early stage of the inflation of the airbag, the lid member is pulled by the tethering member and is tensioned to close the vent hole so that the airbag is rapidly inflated to have high inner pressure, thereby rapidly inflating the airbag.

After that, as the inner pressure of the airbag reaches the predetermined value or more, the connection between the tethering members by the connecting means is cancelled and the tethering members are thus separated from each other. Accordingly, the restriction of elongation of the tethering members toward the occupant side is cancelled so that the occupant facing surface of the airbag bulges to the position where is the position at the completion of inflation of the airbag.

The tethering members may directly connect the lid member and the occupant facing surface or indirectly connect them via an inner member.

vii) Yet another aspect of the present invention may employ such a structure that an inner member is arranged inside the airbag to connect the occupant facing surface and the surface opposite to the occupant facing surface of the airbag in the inflated state, and said tethering member is connected to said inner member.

In this aspect, the inner member is arranged inside the airbag to connect the occupant facing surface and the surface opposite to the occupant facing surface of the airbag in the inflated state, and the tethering member is connected to the inner member. In this case, according to the inflation of the airbag, the inner member is deployed to elongate toward the occupant side and the lid member is pulled inside the airbag by the inner member via the tethering member so that the lid member is overlaid on the vent hole. As the airbag receives the occupant and the occupant facing surface is thus depressed, the inner member is deflected so that the force pulling the lid member inside the airbag is cancelled and the lid member is spaced apart from the vent hole.

viii) Yet another aspect of the present invention may employ such a structure that said inner member is an inner panel for partitioning the inside of the airbag into a first chamber centrally located and a second chamber surrounding the first chamber, wherein said inner panel is provided with a communication hole formed therein for allowing the communication between the first chamber and the second chamber, wherein said airbag is structured such that gas is first introduced into the first chamber so as to inflate the first chamber and the gas is then introduced from the first chamber to the second chamber through the communication hole so as to inflate the second chamber, and wherein said vent hole is arranged to allow the communication between the second chamber and the outside of the airbag.

In this aspect, gas is first introduced into the first chamber centrally located in the airbag defined by the inner panel as the inner member so that the first chamber is inflated. According to the inflation of the first chamber, the inner panel is deployed to elongate toward the occupant side. The first chamber has a relatively small volume relative to the entire airbag and does not directly communicate with the vent hole so that the first chamber can be extremely rapidly inflated. Therefore, the lid member is pulled inside the airbag by the inner panel via the tethering member so that the lid member is overlaid on the vent hole so as to make the vent hole in the closed or slightly open state at an early stage. As a result of this, gas inside the second chamber is restricted from flowing out of the airbag through the vent hole so that the second chamber can also be rapidly inflated to have high inner pressure, thereby accelerating the inflation of the airbag as a whole.

ix) Yet another aspect of the present invention may employ such a structure that said inner member is a restriction strap of which one end is connected to the occupant facing surface of the airbag and the other end is connected to the surface opposite to the occupant facing surface.

In this aspect, the inner member is a restriction strap of which one end is connected to the occupant facing surface of the airbag and the other end is connected to the surface opposite to the occupant facing surface, thereby simplifying the structure.

x) Yet another aspect of the present invention may employ such a structure that an inner member is arranged to extend across the inside of the airbag to connect side portions of the airbag in the inflated state, and said tethering member is connected to said inner member.

In this aspect, the inner member is arranged to extend across the inside of the airbag to connect side portions of the airbag, thereby allowing greater flexibility in arrangement of the vent hole.

xi) Yet another aspect of the present invention may employ such a structure that said tethering member and said inner member is integrally formed.

In this aspect, the inner member and the tethering member are integrally formed, thereby saving labor for sewing and facilitating the manufacture of the airbag.

Also in this aspect, the airbag senses depression of the airbag (retraction of the occupant facing surface) in a relatively wide area of the occupant facing surface. That is, the inner member extending across the inside of the airbag and connecting the side portions of the airbag can retract according to the depression of the occupant facing surface to cancel the force pulling the lid member inside the airbag so as to open the vent hole even when the occupant plunges into the airbag at a position shifting from the center to depress a portion relatively near the outer periphery of the occupant facing surface.

xii) Yet another aspect of the present invention may employ such a structure that one end of said tethering member is connected to said lid member and the other end of said tethering member is connected to said occupant facing surface.

In this aspect, the lid member and the occupant facing surface can be easily connected regardless of the position of the vent hole.

xiii) Yet another aspect of the present invention may employ such a structure that a gas inlet for introducing gas from a gas generator or a gas generator receiving portion where the gas generator is received is formed in the surface opposite to said occupant facing surface of the airbag, and said the other end of the tethering member is connected to a portion confronting to the gas inlet or the gas generator receiving portion of said occupant facing surface.

In this aspect, as gas is introduced through the gas inlet or the gas generator received at the gas generator receiving portion is actuated to spout gas into the airbag from the gas generator, gas collides with a confronting portion of the occupant facing surface confronting the gas inlet or the gas generator receiving portion so that the confronting portion is rapidly deployed toward the occupant side. Since the tethering member is connected to the confronting portion, the tethering member is also deployed to elongate toward the occupant side. As a result of this, the lid member is pulled and tensioned by the tethering member so that the lid member is overlaid on the vent hole in the early stage of inflation of the airbag.

As mentioned above the lid member is overlaid on the vent hole in the early stage of inflation of the airbag, thereby extremely rapidly inflating the airbag.

xiv) Yet another aspect of the present invention may employ such a structure that said tethering member and said inner member are integrally formed.

According to this structure, it is possible to facilitate the manufacturing process of parts and the entire sewing process of the airbag.

xv) Yet another aspect of the present invention may employ such a structure that a deflection loop through which said tethering member is inserted is provided on the inner surface of said occupant facing surface, wherein one end of said tethering member is connected to said lid member and a midway portion in the longitudinal direction of said tethering member is inserted into said deflection loop.

In this aspect, a larger spacing amount of the lid member from the vent hole can be obtained even when the depression amount of the occupant facing surface is small.

xvi) Yet another aspect of the present invention may employ such a structure that, as said deflection loop(s), a plurality of occupant-side deflection loops are disposed on said occupant facing surface at different positions and a plurality of opposite-occupant-side deflection loops are disposed on the surface opposite to said occupant facing surface, wherein the midway portion of said tethering member is inserted through the occupant-side deflection loops and the opposite-occupant-side deflection loops alternately.

In this aspect, a larger spacing amount of the lid member from the vent hole can be obtained even when the depression amount of the occupant facing surface is small.

According to this aspect, the deflection loops are arranged at different position on the occupant facing surface and the midway portions of the tethering member are inserted into the deflection loops. Therefore, the tethering member is distorted so that the lid member is pushed out of the airbag through the vent hole even when the occupant facing surface is partially retracted.

xvii) Yet another aspect of the present invention may employ such a structure that a pulling member is arranged inside the airbag for pulling a midway portion in the longitudinal direction of said tethering member to the side opposite to the occupant facing surface, wherein said pulling member is connected at its proximal end to the inner surface of the airbag at the side opposite to the occupant facing surface and is provided at its distal end with a guide loop through which the tethering member is inserted, and wherein a midway portion in the longitudinal direction of said tethering member is inserted through the guide loop.

In this aspect, since the proximal end (opposite to the lid member) of the tethering member is pulled toward the occupant side and the midway portion of the tethering member is pulled toward the side opposite to the occupant facing surface by the pulling member when the airbag is inflated, the tethering member is hardly distorted at a stage before the occupant facing surface of the inflated airbag is depressed by the occupant.

xviii) In yet another aspect of the present invention, it is preferable that the lid member does not protrude outside the airbag through the vent hole and is overlaid on the vent hole from the inside of the airbag at the start of inflation of the airbag. Since the vent hole is closed or slightly opened at the start of inflation of the airbag, gas is prevented from flowing out of the airbag through the vent hole during the inflation of the airbag. As a result, the airbag is rapidly inflated.

xix) In yet another aspect of the present invention, it is preferable that the airbag is folded keeping the state that the lid member does not protrude outside the airbag through the vent hole and is overlaid on the vent hole from the inside of the airbag. By folding the airbag in this manner, the lid member is in the state overlaid on the vent hole from the start of inflation of the airbag.

xx) Yet another aspect of the present invention may employ such a structure that an open type vent hole which always allows the communication between the inside and the outside of the airbag is provided.

In the airbag having the open type vent hole, gas flows out of the airbag through the open type vent hole mainly even during the inflation of the airbag. When the airbag is depressed so that the thickness of the airbag is changed, the vent hole with the lid member is also opened so that gas smoothly flows out through both the opened vent hole with the lid member and the open type vent hole.

xxi) Yet another aspect of the present invention may employ such a structure that a fixing member for the airbag which is arranged in the airbag is provided with an insertion loop through which said tethering member is inserted.

In the present invention, the midway portion in the longitudinal direction of the tethering member to be inserted through the aforementioned deflection loop(s) and the guide loop is a midway portion in the longitudinal direction of the tethering member which is on a side opposite to the lid member relative to the insertion loop in case that the tethering member is also inserted through the insertion loop.

Figure 2:
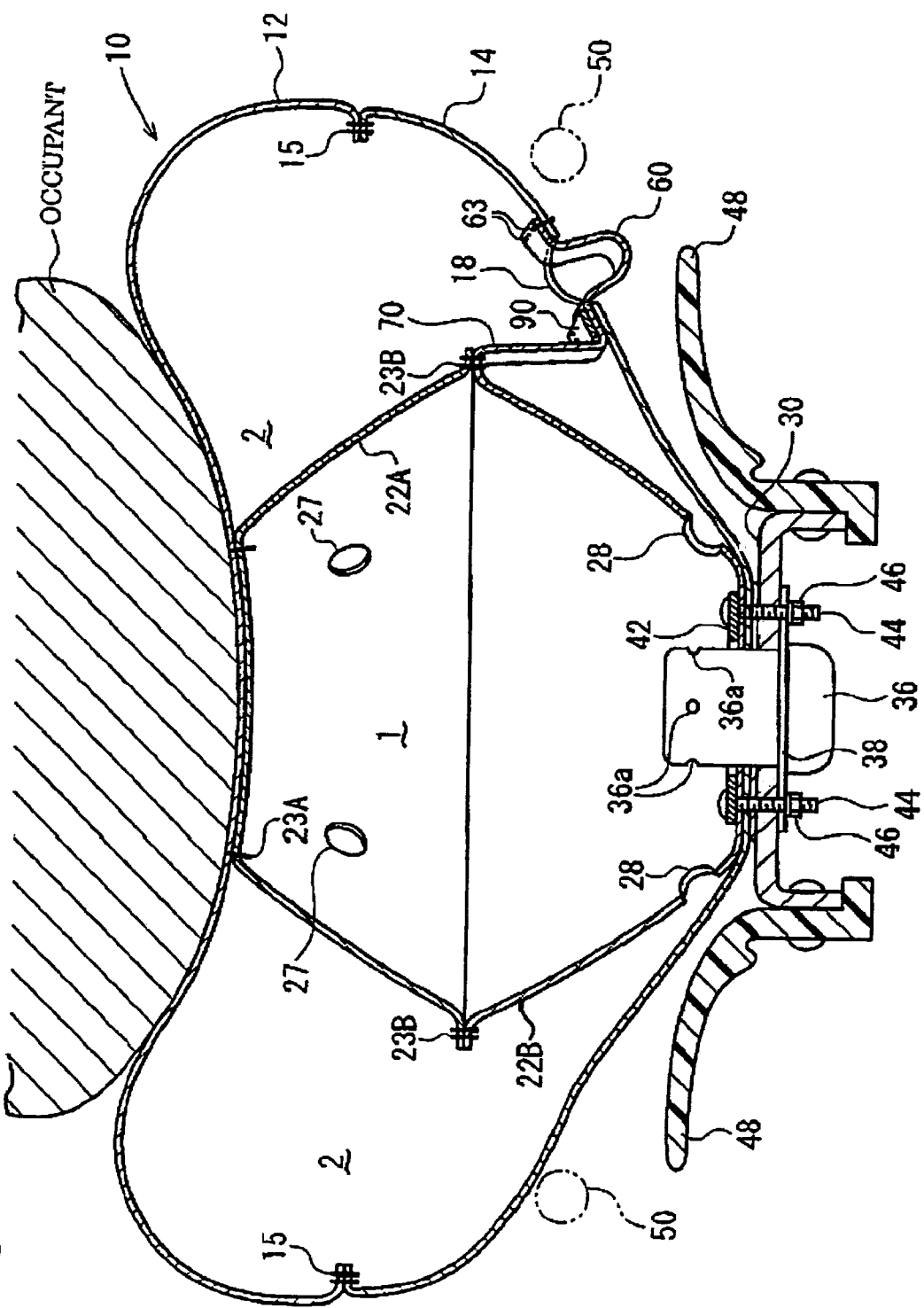
FIG. 2 is a sectional view of the airbag and the airbag apparatus shown in FIG. 1 when receiving an occupant.
Figure 3:
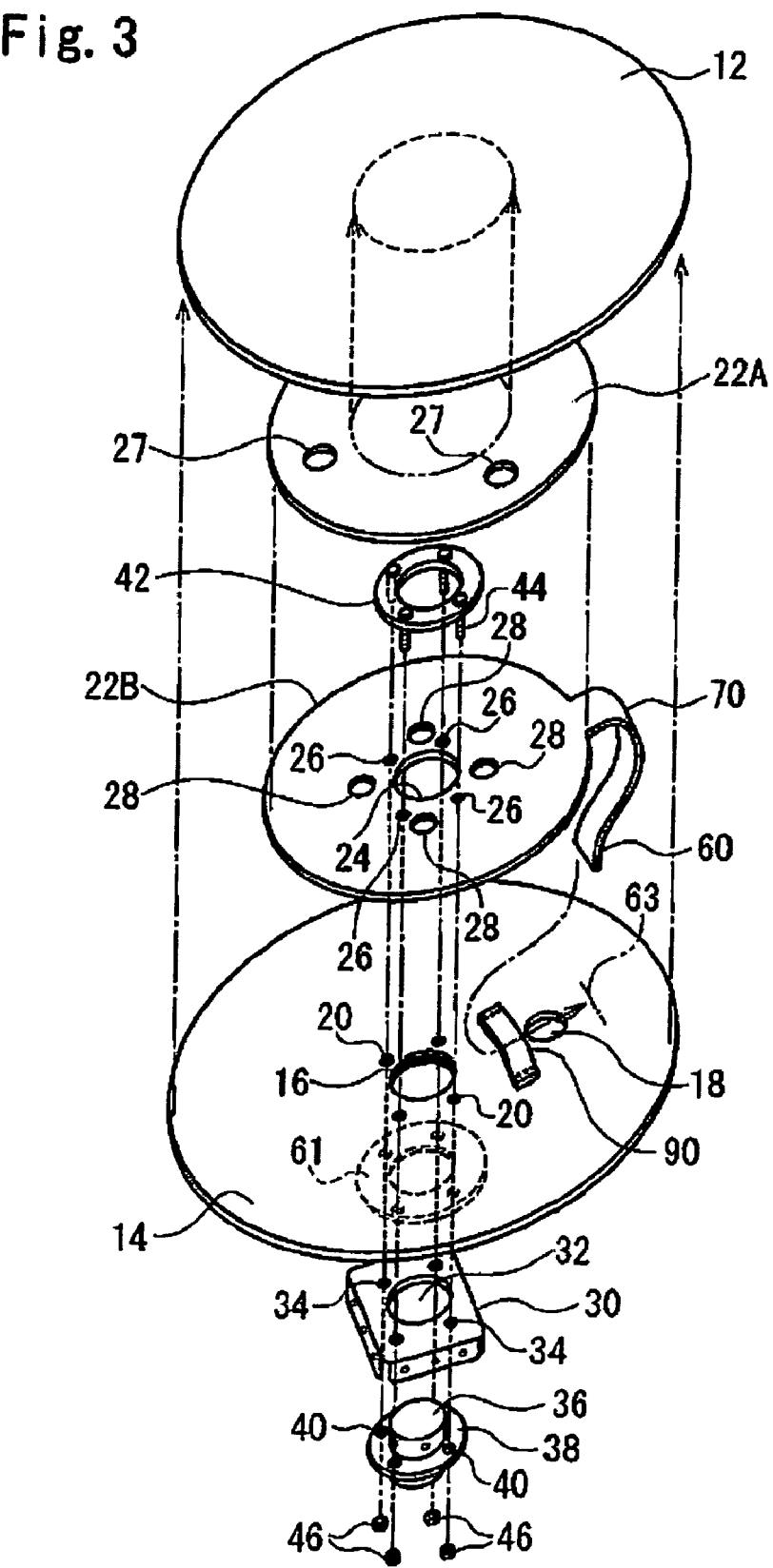
FIG. 3 is an exploded perspective view of the airbag and the airbag apparatus shown in FIG. 1.
Figure 4:
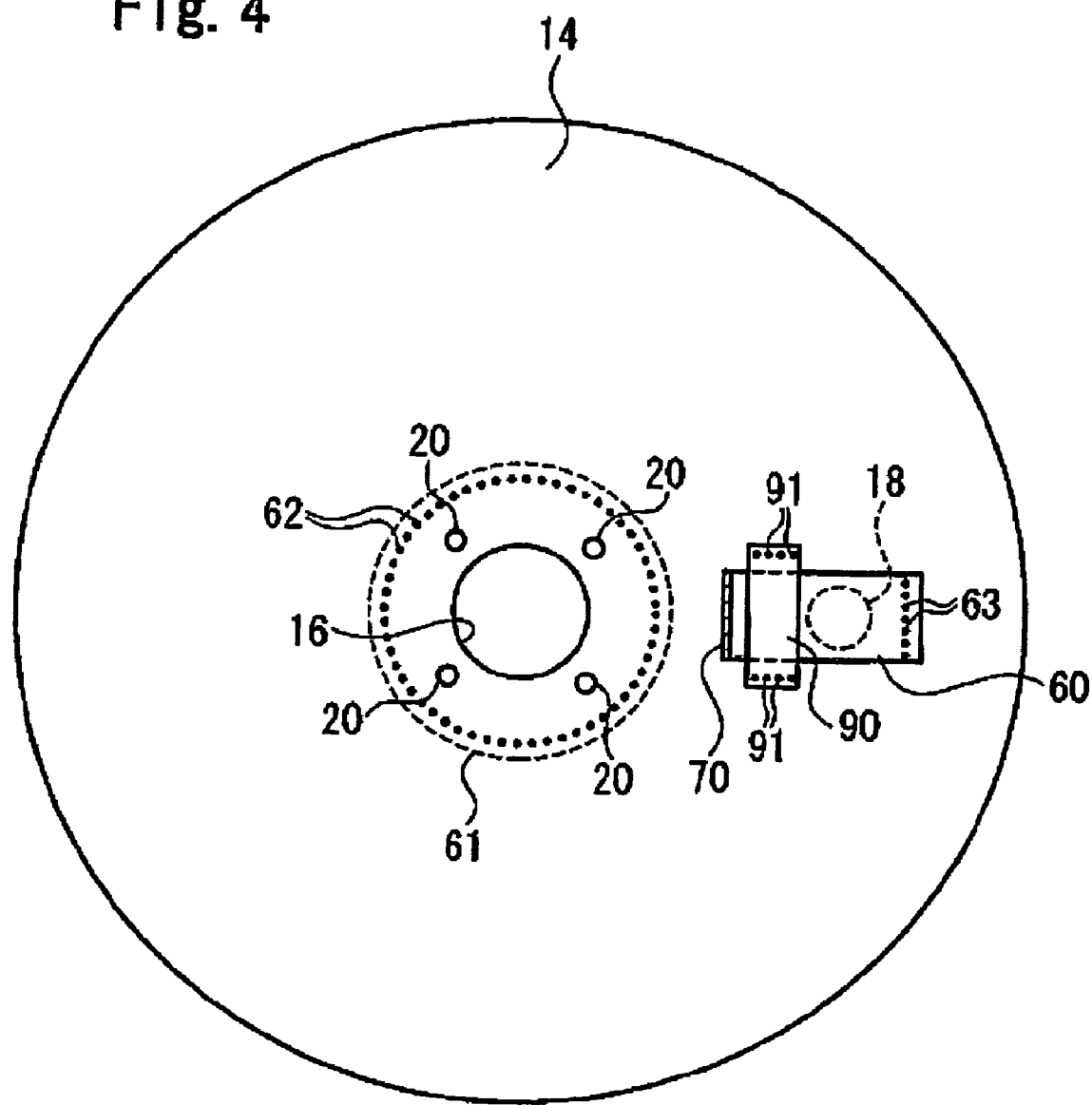
FIG. 4 is a plan view of a rear panel of the airbag shown in FIG. 1.

Hereinafter, embodiments of the present invention will be described with reference to the attached drawings. FIG. 1 and FIG. 2 are sectional views of an airbag and an airbag apparatus according to an embodiment, FIG. 3 is an exploded perspective view of the airbag and the airbag apparatus, and FIG. 4 is a plan view of a rear panel of the airbag. FIG. 1 shows a state before an occupant plunges into the airbag and FIG. 2 shows a state after the occupant plunges into the airbag.

In this embodiment, the airbag 10 is a driver-side airbag of a vehicle.

The airbag 10 comprises a front panel 12 composing an occupant-side surface, a rear panel 14 composing an outer surface opposite to the occupant-side surface, first and second inner panels 22A, 22B as inner members for partitioning the inside of the airbag 10 into a first chamber 1 and a second chamber 2, a vent hole 18 for allowing the communication between the second chamber 2 and the outside of the airbag 10, a lid member 60 for restricting gas from flowing out through the vent hole 18, a tether 70 as a tethering member connecting the lid member 60 to the inner panel 22B, and so on.

The front panel 12, the rear panel 14, and the first and second inner panels 22A, 22B are circular woven fabrics, respectively. The front panel 12 and the rear panel 14 have substantially the same diameter and their peripheries are sewn together by seam 15 so as to make an envelope shape. The seam 15 is provided circularly in an annular shape along the outer periphery of the front panel 12 and the rear panel 14. The seam 15 is made of sewing yarns, but not limited thereto.

The rear panel 14 has an inflator (gas generator)-receiving opening 16 and the aforementioned vent hole 18 formed therein. The opening 16 is arranged at the center of the rear panel 14. A patch cloth 61 which is an annular woven fabric is attached to a portion around the opening 16 from the outside of the airbag 10. Numeral 62 (FIG. 4) designates a seam sewing the patch cloth 61 and the rear panel 14 together. The seam 62 is provided circularly in an annular shape along the outer periphery of the patch cloth 61. Around the opening 16, bolt through holes 20 are formed penetrating the patch cloth 61 and the rear panel 14. The vent hole 18 is disposed between the outer periphery of the patch cloth 61 and the outer peripheral edge (seam 15) of the rear panel 14.

The lid member 60 is overlaid on the vent hole 18 from the inside of the airbag 10. In this embodiment, the lid member 60 is integrally formed with the tether 70.

The first inner panel 22A and the second inner panel 22B are arranged inside the airbag 10. The first and second inner panels 22A, 22B are arranged substantially coaxially with the front panel 12 and the rear panel 14 and the peripheries of the first and second inner panels 22A, 22B are sewn together by seam 23B as first connecting means. By the first and second inner panels 22A, 22B, the inside of the airbag 10 is partitioned into the first chamber 1 centrally located and the second chamber 2 surrounding the first chamber 1. The first chamber 1 is formed on the inner side of the inner panels 22A, 22B.

The central portion of the first inner panel 22A of the front panel 12 side (a portion on a distal end side of the inner panel 22A in a state that the airbag 10 is inflated) is sewn to the central portion of the front panel 12 by a seam 23A.

The central portion of the second inner panel 22B of the rear panel 14 side (a portion on a rear end side of the second inner panel 22B in the state that the airbag 10 is inflated) is provided with an inflator-receiving opening 24 which is formed substantially coaxially with the inflator-receiving opening 16 of the rear panel 14. The inner panel 22B is also provided with bolt through holes 26 formed in a peripheral portion around the opening 24 at locations corresponding to the bolt through holes 20 of the rear panel 14.

The first and second inner panels 22A, 22B have communication holes 27, 28 for allowing the communication between the first chamber 1 and the second chamber 2. In this embodiment, the communication holes 28 of the second inner panel 22B are located relatively near the inflator receiving opening 24 such that the communication holes 28 are located on extended lines of gas spouting directions of an inflator 36 which is arranged in the first chamber 1 through the inflator-receiving openings 16, 24 as will be described later, that is, located to face gas exhaust holes 36a of the inflator 36. However, the locations of the communication holes 27, 28 are not limited thereto.

It should be noted that reinforcing members such as patches may be attached to peripheral portions of the openings 16, 24, the communication holes 27, 28, and/or the vent hole 18.

In this embodiment, the aforementioned tether 70 is integrally formed with the second inner panel 22B so that one end (proximal end) portion of the tether 70 is continued from the outer periphery of the second inner panel 22B. The other end (distal end) portion of the tether 70 functions as the lid member 60 covering the vent hole 18.

However, the tether 70 may be formed integrally with the first inner panel 22A or separately from both the first and second inner panels 22A, 22B. Further, the tether 70 may be connected to a portion of the inner panels 22A, 22B other than the outer peripheries of the inner panels 22A, 22B. Furthermore, the lid member 60 may be formed separately from the tether 70 and attached to the distal end of the tether 70.

In this embodiment, the inner surface of the rear panel 14 is provided with an insertion loop 90 through which a midway portion of the tether 70 is inserted. As shown in FIG. 4, the insertion loop 90 in this embodiment is disposed close to the center side relative to the vent hole 18 (between the vent hole 18 and the outer periphery of the patch cloth 61). In this embodiment, the insertion loop 90 is composed of a substantially rectangular small cloth. A pair of side portions of the rectangular small cloth are sewn to the rear panel 14 by seams 91. The tether 70 is inserted and drawn between the cloth and the panel 14 from the other pair of sides of the cloth.

As shown in FIG. 4, the lid member 60 extends in a radial direction of the rear panel 14 and across vent hole 18. The tether 70 is connected to a central side (proximal end side) of the rear panel 14 of the lid member 60 and is inserted into the insertion loop 90. At the distal end of the lid member 60 is sewn to the rear panel 14 by seam 63 at a portion near the outer periphery of the rear panel 14 relative to the vent hole 18.

The length of the tether 70 is set to ensure that, when the airbag 10 is inflated, the tether 70 is pulled inside the airbag 10 by the inner panels 22A, 22B and is thus tensioned so as to prevent the lid member 60 from moving out of the airbag 10 (from being pushed out of the airbag 10 through the vent hole 18 by the inner gas pressure of the airbag 10) and also to ensure that the lid member 60 is prevented from being spaced apart from the inner surface of the rear panel 14 because the lid member 60 is excessively pulled inside the airbag 10 by the tether 70.

A retainer 30 for mounting the airbag 10 has an inflator mounting opening 32 formed at the center thereof and bolt through holes 34 formed around the opening 32.

The inflator 36 is substantially cylindrical in shape and has gas exhaust holes 36a formed in outer side face of a distal end portion in the axial direction of the cylinder. In this embodiment, the gas exhaust holes 36a are four which are equally spaced in the peripheral direction of the inflator 36. The inflator 36 is structured to spout gas through gas exhaust holes 36a in radial directions. A flange 38 for securing the inflator is formed to project from the side periphery of a midway portion in the axial direction of the cylinder as the inflator 36. The flange 38 is provided with bolt through holes 40 formed therein. The distal end portion of the inflator 36 is fitted into the inflator mounting opening 32.

For mounting the airbag 10 to the retainer 30, the peripheral portion of the inflator-receiving opening 24 of the second inner panel 22B is superposed on the peripheral portion of the inflator-receiving opening 16 of the rear panel 14. Then, the superposed peripheral portions are overlaid on the peripheral portion of the inflator mounting opening 32 of the retainer 30. Stud bolts 44 of a holding ring 42 are inserted into the respective bolt through holes 26, 20, 34, 40 of the second inner panel 22B, the rear panel 14, the retainer 30, and the flange 38 and nuts 46 are screwed onto distal ends of the stud bolts 44, thereby fixing the second inner panel 22B, the rear panel 14, and the inflator 36 to the retainer 30.

Therefore, the peripheral portion of the inflator-receiving opening 24 of the second inner panel 22B is connected to the peripheral portion of the inflator-receiving opening 16 of the rear panel 14, the outer peripheries of the first and second inner panels 22A, 22B are connected to each other, and the central portion of the first inner panel 22A is connected to the front panel 12.

After that, the airbag 10 is folded and a module cover 48 is attached to the retainer 30 to cover the airbag 10 in the folded state, thereby composing the airbag apparatus. The airbag 10 may be previously folded prior to the fixing of the airbag 10 to the retainer 30. The airbag apparatus is mounted to a steering wheel 50 of an automobile.

In the present invention, it is preferable that the airbag 10 is folded in a state that the lid member 60 does not protrudes out of the airbag 10 through the vent hole 18 and the lid member 60 is overlaid on the vent hole 18 from the inside of the airbag during folding the airbag 10. By folding the airbag 10 in this manner, the lid member 60 is overlaid on the vent hole 18 from the initial stage of inflation of the airbag 10 when the airbag 10 is inflated. The outflow of gas through the vent hole 18 is restricted from the initial stage of inflation of the airbag 10, thereby rapidly inflating the airbag 10.

In the event of a collision of a vehicle in which the airbag apparatus having the aforementioned structure is mounted, the inflator 36 is actuated to spout gas into the airbag 10. The airbag 10 is inflated by gas to push open a module cover 48 and is thus deployed into the vehicle cabin.

In the airbag 10, gas from the inflator 36 is first supplied into the first chamber 1 so that the first chamber 1 is inflated. According to the inflation of the first chamber 1, the first and second inner panels 22A, 22B are developed to elongate toward the occupant side and the tether 70 is pulled inside the airbag 10 by the inner panels 22A, 22B and is thus tensioned, thereby preventing the lid member 60 from moving out of the airbag 10. Therefore, the lid member 60 is prevented from being pushed out of the airbag 10 through the vent hole 18 by the inner gas pressure of the airbag 10 and is thus overlaid on the vent hole 18 to close the vent hole 18. Then, gas enters from the first chamber 1 into the second chamber 2 through the communication holes 27, 28 so that the second chamber 2 is inflated.

In the airbag 10, the first chamber 1 has a relatively small volume relative to the entire volume of the airbag 10 and does not directly communicate with the vent hole 18 so that the first chamber 1 can be extremely rapidly inflated. Therefore, the tether 70 is tensioned at an early stage so as to prevent the lid member 60 from moving out of the airbag, thereby making the vent hole 18 in the closed state. Accordingly, the gas inside the second chamber is restricted from flowing out of the airbag through the vent hole 18 so that the second chamber 2 can also be rapidly inflated to have high inner pressure. As a result, the inflation of the airbag 10 as a whole is accelerated.

As mentioned above, in this embodiment, the airbag 10 is folded keeping the state that the lid member 60 is overlaid on the vent hole 18 from the inside of the airbag 10, whereby the lid member 60 is in the state overlaid on the vent hole 18 from the start of inflation of the airbag 10. Since the outflow of gas through the vent hole 18 is restricted from the start of inflation of the airbag 10, the second chamber 2 can be extremely rapidly inflated.

In this embodiment, since the communication holes 28 for allowing communication between the first chamber 1 and the second chamber 2 are located on extended lines of gas spouting directions of an inflator 36 disposed inside the first chamber 1, that is, located to face the gas exhaust holes of the inflator 36, gas is spouted from the gas exhaust holes 36a toward the communication holes 28 when the inflator 36 is actuated. Accordingly, gas from the inflator 36 easily enters into the second chamber 2 through the communication holes 28. Therefore, the inflation of the second chamber 2 is further accelerated.

When the occupant plunges into the thus inflated airbag 10, the front panel 12 of the airbag 10 is pressed by the occupant and thus depressed toward the rear panel 14 so that the inner panels 22A, 22B are distorted as shown in FIG. 2, thereby allowing the lid member 60 to move out of the airbag 10. Therefore, the lid member 60 is pushed out of the airbag 10 through the vent hole 18 by inner gas pressure. As a result, gas flows out of the airbag 10 through the vent hole 18, whereby the occupant is softly received and restrained by the airbag 10.

Figure 5:
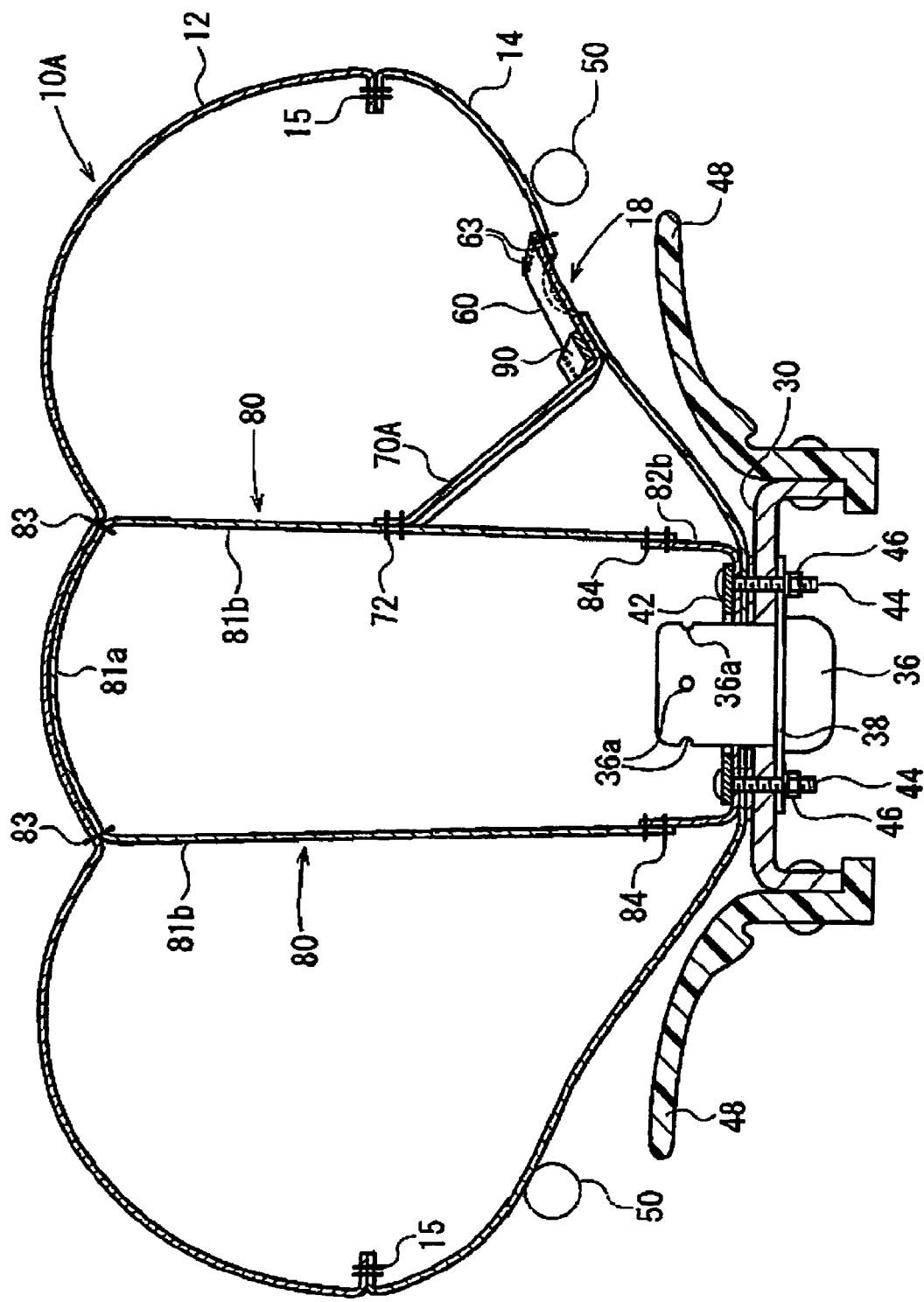
FIG. 5 is a sectional view of an airbag and an airbag apparatus according to an embodiment.
Figure 6:
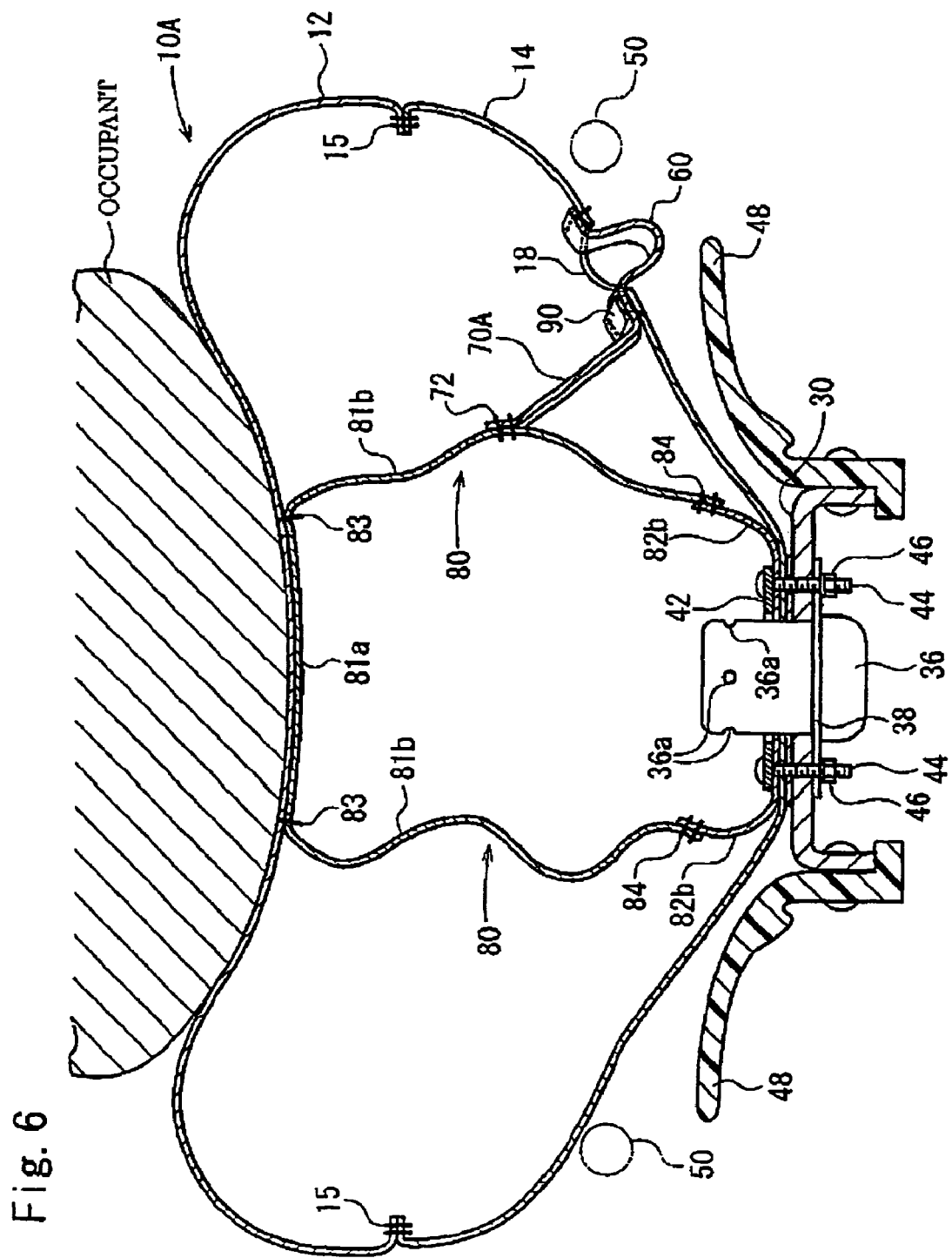
FIG. 6 is a sectional view of the airbag and the airbag apparatus shown in FIG. 5 when receiving an occupant.
Figure 7:
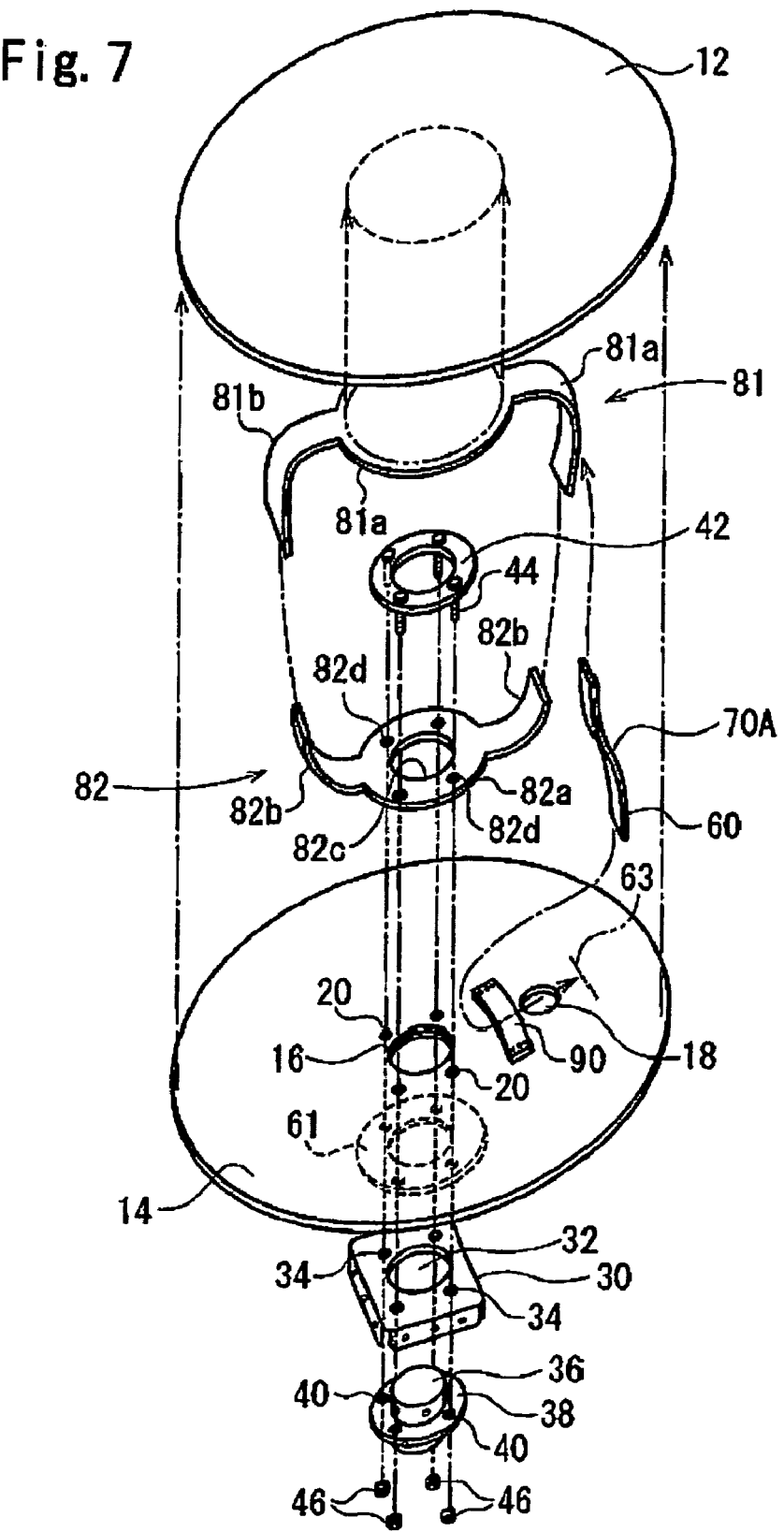
FIG. 7 is an exploded perspective view of the airbag and the airbag apparatus shown in FIG. 5.

FIG. 5 and FIG. 6 are sectional views of an airbag and an airbag apparatus according to another embodiment, and FIG. 7 is an exploded perspective view of the airbag and the airbag apparatus. FIG. 5 shows a state before an occupant plunges into the airbag and FIG. 6 shows a state after the occupant plunges into the airbag.

In this embodiment, the airbag 10A comprises a front panel 12 composing an occupant-side surface, a rear panel 14 composing an outer surface opposite to the occupant-side surface, restriction straps 80 as inner members inside the airbag 10A for connecting the front panel 12 and the rear panel 14, a vent hole 18 for allowing the communication between the inside and the outside of the airbag 10A, a lid member 60 for restricting gas from flowing out through the vent hole 18, a tether 70A as a tethering member connecting the lid member 60 to the restriction strap 80, and so on.

Also in this embodiment, the outer peripheries of the front panel 12 and the rear panel 14 are sewn together by seam 15 to compose an outer shell of the envelope-shape airbag 10A and the restriction straps 80 are arranged inside the airbag 10A. Also in this embodiment, the rear panel 14 has an inflator (gas generator)-receiving opening 16, the aforementioned vent hole 18, and bolt through holes 20 for securing the rear panel 14 to a retainer 30. The lid member 60 is overlaid on the vent hole 18 from the inside of the rear panel 14. Also in this embodiment, the lid member 60 is integrally formed with the tether 70A.

In this embodiment, the restriction straps 80 are composed of a first strap component 81 on the front panel 12 side and a second strap component 82 on the rear panel 14 side.

In this embodiment, the first strap component 81 comprises a base portion 81a disposed on a central portion of the front panel 12 and two strap-like portions 81b, 81b extending radially from the outer periphery of the base portion 81a. The base portion 81a is a circular woven fabric of which diameter is smaller than that of the front panel 12 and the strap-like portions 81b, 81b are positioned opposite to each other across the base portion 81a. The base portion 81a is disposed substantially coaxially with the front panel 12 and is sewn to the central portion of the front panel 12 by seam 83.

In this embodiment, the second strap component 82 comprises a base portion 82a disposed on a central portion of the rear panel 14 and two strap-like portions 82b, 82b extending radially from the outer periphery of the base portion 82a. The base portion 82a is a circular woven fabric of which diameter is smaller than that of the rear panel 14 and the strap-like portions 82b, 82b are positioned opposite to each other across the base portion 82a. The base portion 82a has an inflator-receiving opening 82c corresponding to the inflator-receiving opening 16 of the rear panel 14. The base portion 82a is also provided with bolt through holes 82d formed in a peripheral portion around the opening 82c at locations corresponding to the bolt through holes 20.

Distal ends of each pair of the strap-like portions 81b, 82b of the strap-like components 81, 82 are sewn by seam 84.

In this embodiment, one end (proximal end) portion of the tether 70A is sewn to a midway portion of one of continuous bodies (hereinafter, the continuous bodies will be sometimes referred to as "restriction straps 80") of the strap-like portions 81b, 82b. Numeral 72 designates seam for sewing the end portion of the tether 70A to the restriction strap 80. Also in this embodiment, the other end portion of the tether 70A functions as the lid member 60 covering the vent hole 18.

Also in this embodiment, the inner surface of the rear panel 14 is provided with an insertion loop 90 through which a midway portion of the tether 70B is inserted. The structure of the insertion loop 90 is the same as that of the aforementioned embodiments. In this embodiment, the insertion loop 90 is disposed relatively near the central side of the the rear panel 14 (an outer periphery of a patch cloth 61).

Also in this embodiment, the lid member 60 extends in a radial direction of the rear panel 14 and across the vent hole 18. The tether 70A is continued from the end of the lid member 60 near a center (proximal end) of the rear panel 14 and is inserted into the insertion loop 90. At the distal end of the lid member 60 is sewn to the rear panel 14 at a portion near the outer periphery of the rear panel 14 relative to the vent hole 18.

The length of the tether 70A is set to ensure that, when the airbag 10A is inflated, the tether 70A is pulled inside the airbag 10A by the restriction strap 80 and is thus tensioned so as to prevent the lid member 60 from moving out of the airbag 10A (from being pushed out of the airbag 10A through the vent hole 18 by the inner gas pressure of the airbag 10A) and also to ensure that the lid member 60 is prevented from being spaced apart from the inner surface of the rear panel 14 because the lid member 60 is excessively pulled inside the airbag 10A by the tether 70A.

For mounting the airbag 10A to the retainer 30, the peripheral portion of the inflator-receiving opening 82c of the base portion 82a is superposed on the peripheral portion of the inflator-receiving opening 16 of the rear panel 14. Then, the superposed peripheral portions are overlaid on the peripheral portion of the inflator mounting opening 32 of the retainer 30. Stud bolts 44 of a holding ring 42 are inserted into the respective bolt through holes 82d, 20, 34, 40 of the base portion 82a, the rear panel 14, the retainer 30, and the flange 38 and nuts 46 are screwed onto distal ends of the stud bolts 44, thereby fixing the base portion 82a, the rear panel 14, and the inflator 36 to the retainer 30.

Therefore, the strap-like portions 82b are connected to the rear panel 14 via the base portion 82a, the strap-like portions 82b, 81b are connected by the seams 84, and the strap-like portions 81b are connected to the front panel 12 via the base portion 81a.

The airbag 10A is different from the aforementioned airbag 10 as shown in FIG. 1 through FIG. 4 by using the restriction straps 80 as the inner members instead of the inner panels 22A, 22B and the other components of the airbag 10A are the same as those of the airbag 10 as shown in FIG. 1 through FIG. 4. In addition, the structure of the airbag apparatus comprising this airbag 10A has the same structure as the aforementioned embodiment shown in FIG. 1 through FIG. 4. Numerals in FIG. 5 through FIG. 7 which are the same as those in FIG. 1 through FIG. 4 designate the same components of the aforementioned embodiment as shown in FIG. 1 through FIG. 4.

Also in the embodiment, the airbag 10A is folded keeping the state that the lid member 60 is overlaid on the vent hole 18 from the inside of the airbag 10A.

In the airbag apparatus comprising the airbag 10A, the inflator 36 is actuated to spout gas so as to inflate the airbag 10A in the event of a vehicle collision. According to the inflation, the restriction straps 80 are developed to elongate toward the occupant side and the tether 70A is pulled inside the airbag 10A by the restriction strap 80 and is thus tensioned, thereby preventing the lid member 60 from moving out of the airbag 10A. Therefore, the lid member 60 is prevented from being pushed out of the airbag 10A through the vent hole 18 by the inner gas pressure of the airbag 10A and is thus overlaid on the vent hole 18 to close the vent hole 18. As a result, the airbag 10A can be rapidly inflated to have high inner pressure, thereby accelerating the inflation of the airbag 10A.

Also in this embodiment, the airbag 10A is folded keeping the state that the lid member 60 is overlaid on the vent hole 18 from the inside of the airbag 10A, whereby the lid member 60 is in the state overlaid on the vent hole 18 from the start of inflation of the airbag 10A. Since the outflow of gas through the vent hole 18 is restricted from the start of inflation of the airbag 10A, the airbag 10A can be extremely rapidly inflated.

After that, when the occupant plunges into the thus inflated airbag 10A, the front panel 12 of the airbag 10A is pressed by the occupant and thus depressed toward the rear panel 14 so that the restriction straps 80 are distorted as shown in FIG. 6, thereby allowing the lid member 60 to move out of the airbag 10A. Therefore, the lid member 60 is pushed out of the airbag 10A through the vent hole 18 by inner gas pressure of the airbag 10A so that the vent hole 18 is opened. As a result, gas flows out of the airbag 10A through the vent hole 18, whereby the occupant is softly received and restrained by the airbag 10A.

Since the restriction straps 80 for connecting the front panel 12 and the rear panel 14 of the airbag 10A are used as the inner members, the airbag 10A has a simple structure.

Figure 8:
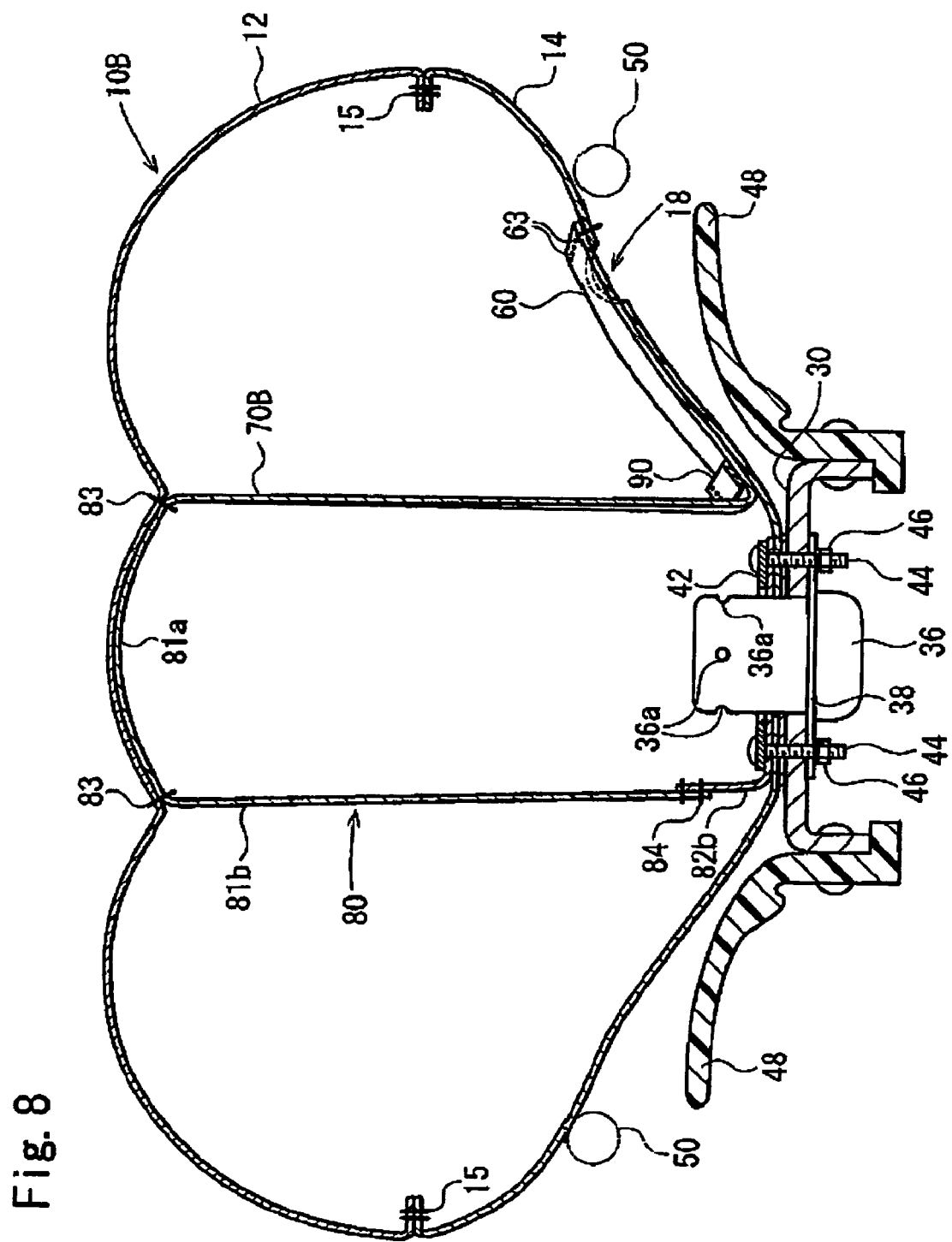
FIG. 8 is a sectional view of an airbag and an airbag apparatus according to an embodiment.
Figure 9:
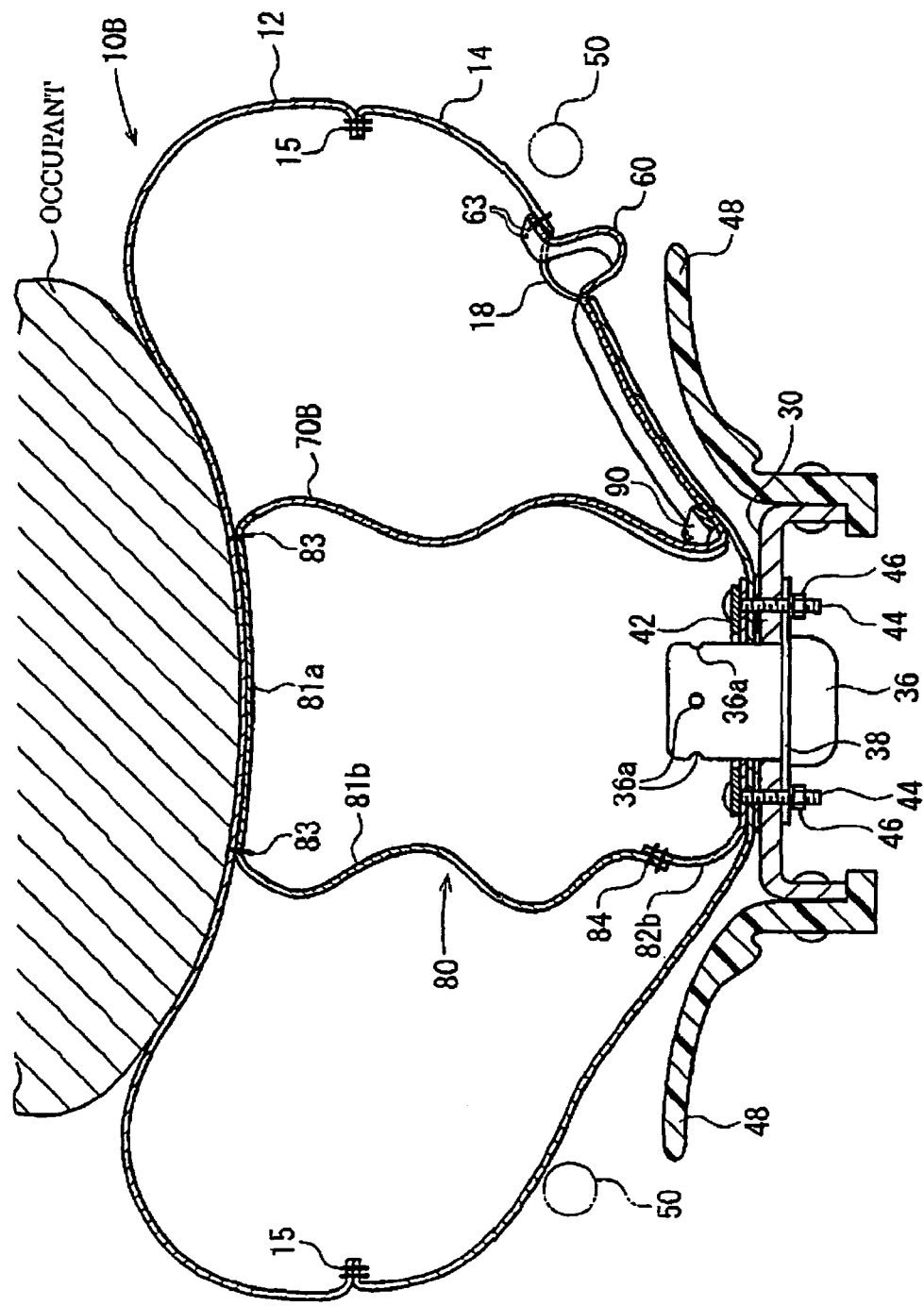
FIG. 9 is a sectional view of the airbag and the airbag apparatus shown in FIG. 8 when receiving an occupant.
Figure 10:
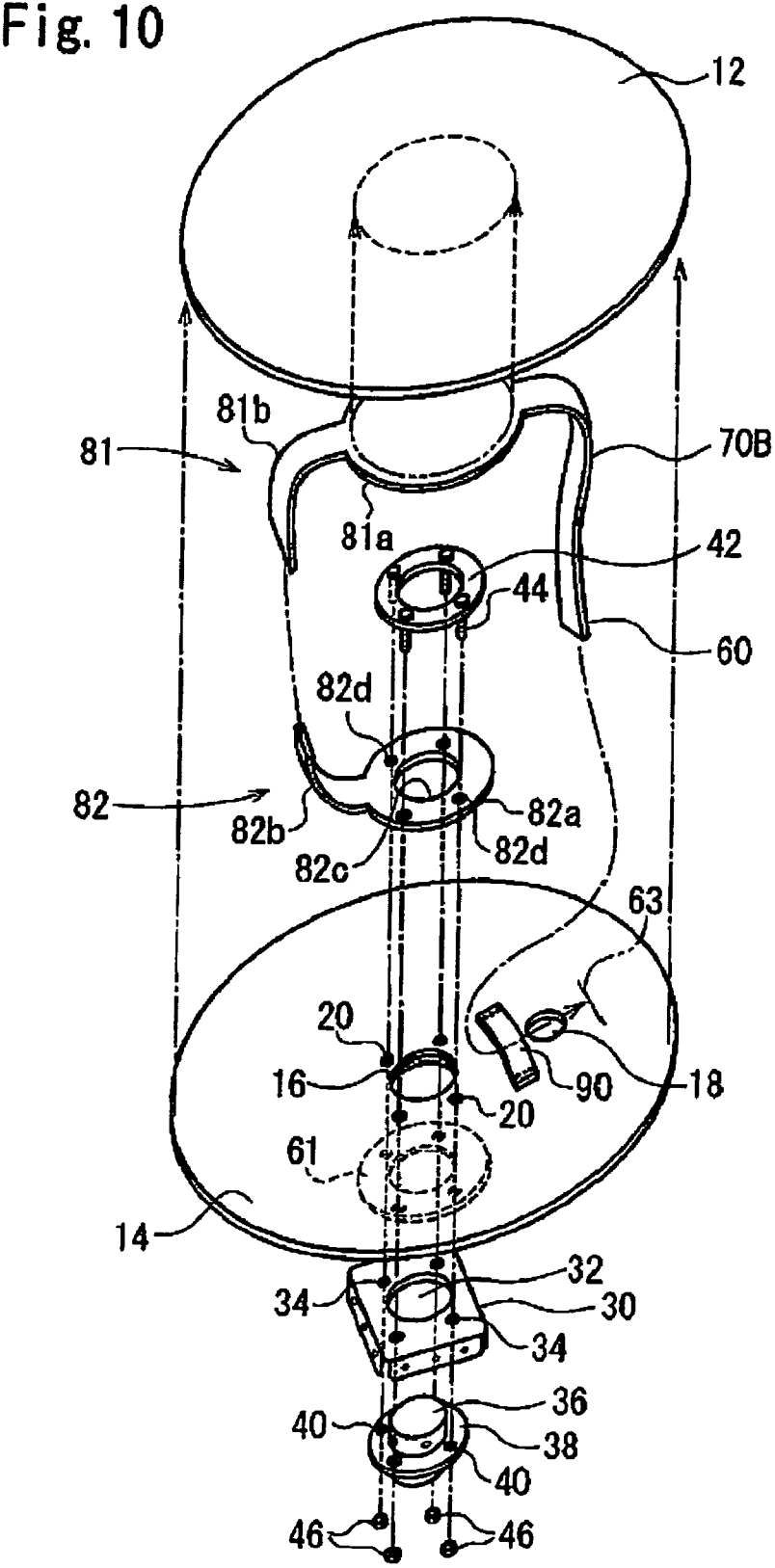
FIG. 10 is an exploded perspective view of the airbag and the airbag apparatus shown in FIG. 8.

Though the tether 70, 70A is connected to the inner member of the airbag such as the inner panels 22A, 22B or the restriction strap in any of the aforementioned embodiments, the tether may be directly connected to the front panel 12 (the occupant-side surface) of the airbag. FIG. 8 and FIG. 9 are sectional views of an airbag and an airbag apparatus having such a structure, and FIG. 10 is an exploded perspective view of the airbag and the airbag apparatus. FIG. 8 shows a state before an occupant plunges into the airbag and FIG. 9 shows a state after the occupant plunges into the airbag.

The airbag 10B of this embodiment is different from the aforementioned airbag 10A as shown in FIG. 5 through FIG. 7 in that one of two strap-like portions 81b extending from a first strap component 81 which is attached to the front panel 12 is arranged to function as a tether 70B as the tethering member.

That is, in this embodiment, a strap-like portion 81b composing a restriction strap 80 connecting the front panel 12 and the rear panel 14 of the airbag 10B and the tether 70B as the tethering member for connecting the front panel 12 and the lid member 60 extend from a base portion 81a of the first strap component 81.

Also in this embodiment, the base portion 81a is sewn to the front panel 12 and a distal end portion of the strap-like portion 81b is connected to a distal end portion of a strap-like portion 82b extending from a second strap component 82 on the rear panel 14 side by seam 84, thereby composing the restriction strap 80 connecting the front panel 12 and the rear panel 14. In addition, one end (proximal end) portion of the tether 70B is connected to the front panel 12 via the base portion 81a.

Also in this embodiment, a lid member 60 is integrally formed with the other end (distal end) portion of the tether 70B.

Also in this embodiment, the inner surface of the rear panel 14 is provided with an insertion loop 90 through which a midway portion of the tether 70B is inserted. The structure of the insertion loop 90 is the same as that of any of the aforementioned embodiments. In this embodiment, the insertion loop 90 is disposed relatively near the central side of the rear panel 14 (an outer periphery of a patch cloth 61).

The midway portion of the tether 70B is inserted into the insertion loop 90 and the distal end portion of the tether 70B is drawn to extend along the inner surface of the rear panel 14 toward the outer periphery of the rear panel 14. The lid member 60 continues from the distal end of the tether 70B extends in a radial direction of the rear panel 14 and across the vent hole 18 and the distal end of the lid member 60 is sewn to the rear panel 14 by seam 63 at a portion near the outer periphery of the rear panel 14 relative to the vent hole 18.

Also in this embodiment, the length of the tether 70B is set to ensure that, when the airbag 10B is inflated, the tether 70B is pulled toward the occupant side by the front panel 12 and is thus tensioned so as to prevent the lid member 60 from moving out of the airbag 10B (from being pushed out of the airbag 10B through the vent hole 18 by the inner gas pressure of the airbag 10B) and also to ensure that the lid member 60 is prevented from being spaced apart from the inner surface of the rear panel 14 because the lid member 60 is excessively pulled inside the airbag 10B by the tether 70B.

The other components of the airbag 10B are the same as those of the airbag 10A as shown in FIG. 5 through FIG. 7. The structure of the airbag apparatus comprising the airbag 10B is also the same as that of the embodiment as shown in FIG. 5 through FIG. 7. The folding method of the airbag 10B is also the same as that of the airbag 10A. Numerals in FIG. 8 through FIG. 10 which are the same as those in FIG. 5 through FIG. 7 designate the same components of the aforementioned embodiment as shown in FIG. 5 through FIG. 7.

In the airbag apparatus comprising the airbag 10B, the inflator 36 is actuated to spout gas so as to inflate the airbag 10B in the event of a vehicle collision. According to the inflation, the tether 70B is directly pulled toward the occupant side by the front panel 12 and is thus tensioned, thereby preventing the lid member 60 from moving out of the airbag 10B. Therefore, the lid member 60 is prevented from being pushed out of the airbag 10B through the vent hole 18 by the inner gas pressure of the airbag 10B and is thus overlaid on the vent hole 18 to close the vent hole 18. As a result, the airbag 10B can be rapidly inflated to have high inner pressure, thereby accelerating the inflation of the airbag 10B.

Also in this embodiment, the airbag 10B is folded keeping the state that the lid member 60 is overlaid on the vent hole 18 from the inside of the airbag 10B, whereby the lid member 60 is in the state overlaid on the vent hole 18 from the start of inflation of the airbag 10B. Since the outflow of gas through the vent hole 18 is restricted from the start of inflation of the airbag 10B, the airbag 10B can be extremely rapidly inflated.

After that, when the occupant plunges into the thus inflated airbag 10B, the front panel 12 of the airbag 10B is pressed by the occupant and thus depressed toward the rear panel 14 as shown in FIG. 9, thereby allowing the lid member 60 to move out of the airbag 10B. Therefore, the lid member 60 is pushed out of the airbag through the vent hole 18 by inner gas pressure so that the vent hole 18 is opened. As a result, gas flows out of the airbag 10B through the vent hole 18, whereby the occupant is softly received and restrained by the airbag 10B.

Though the insertion loop 90 for the tether as the tethering member is disposed on the inner surface of the rear panel 14 in any of the aforementioned embodiments, the insertion loop 90 for the tether may be disposed on another member inside the airbag, for example, the holding ring 42 as the fixing member for fixing the rear panel 14 to the retainer 30.

Figure 11:
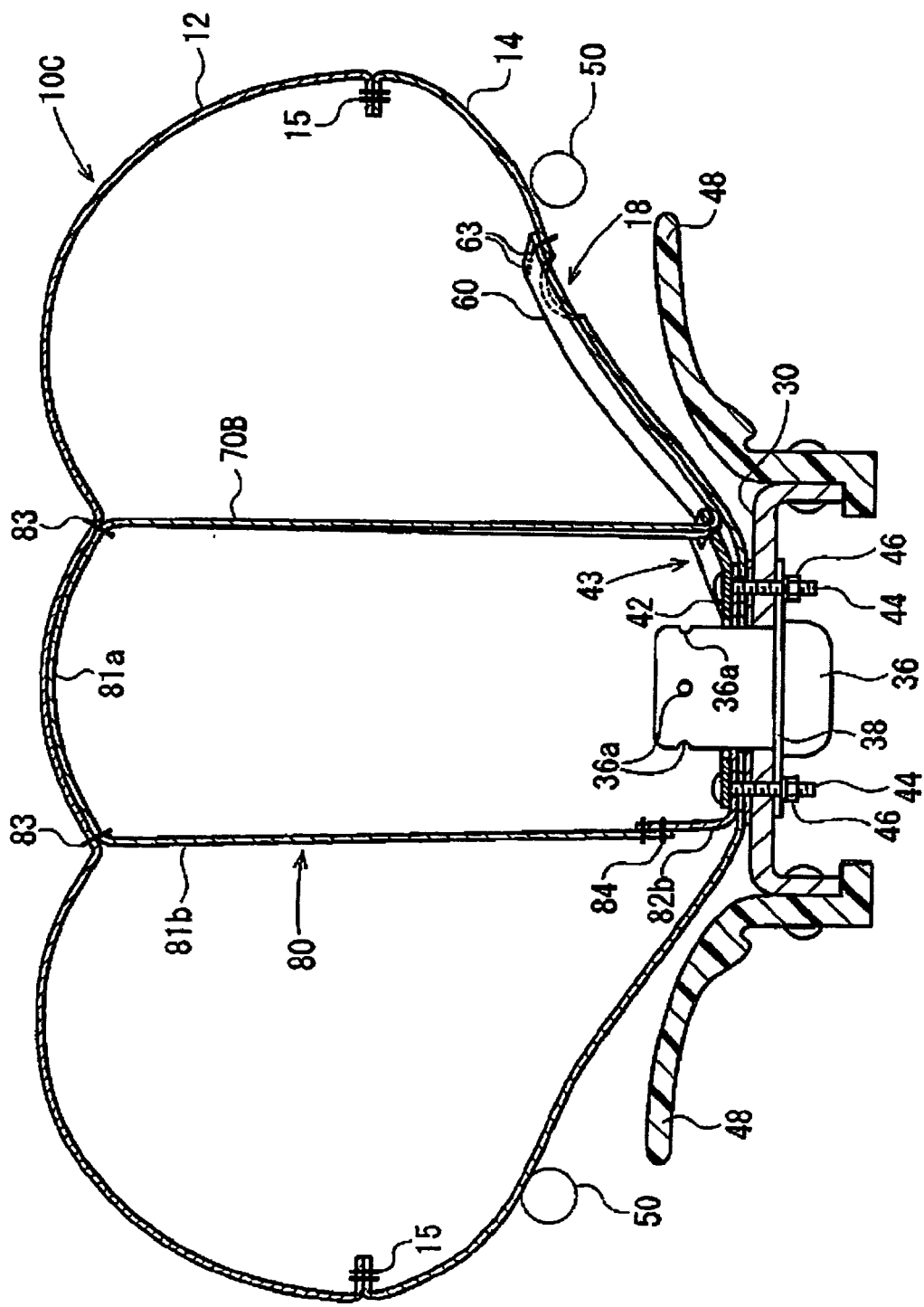
FIG. 11 is a sectional view of an airbag and an airbag apparatus according to an embodiment.
Figure 12:
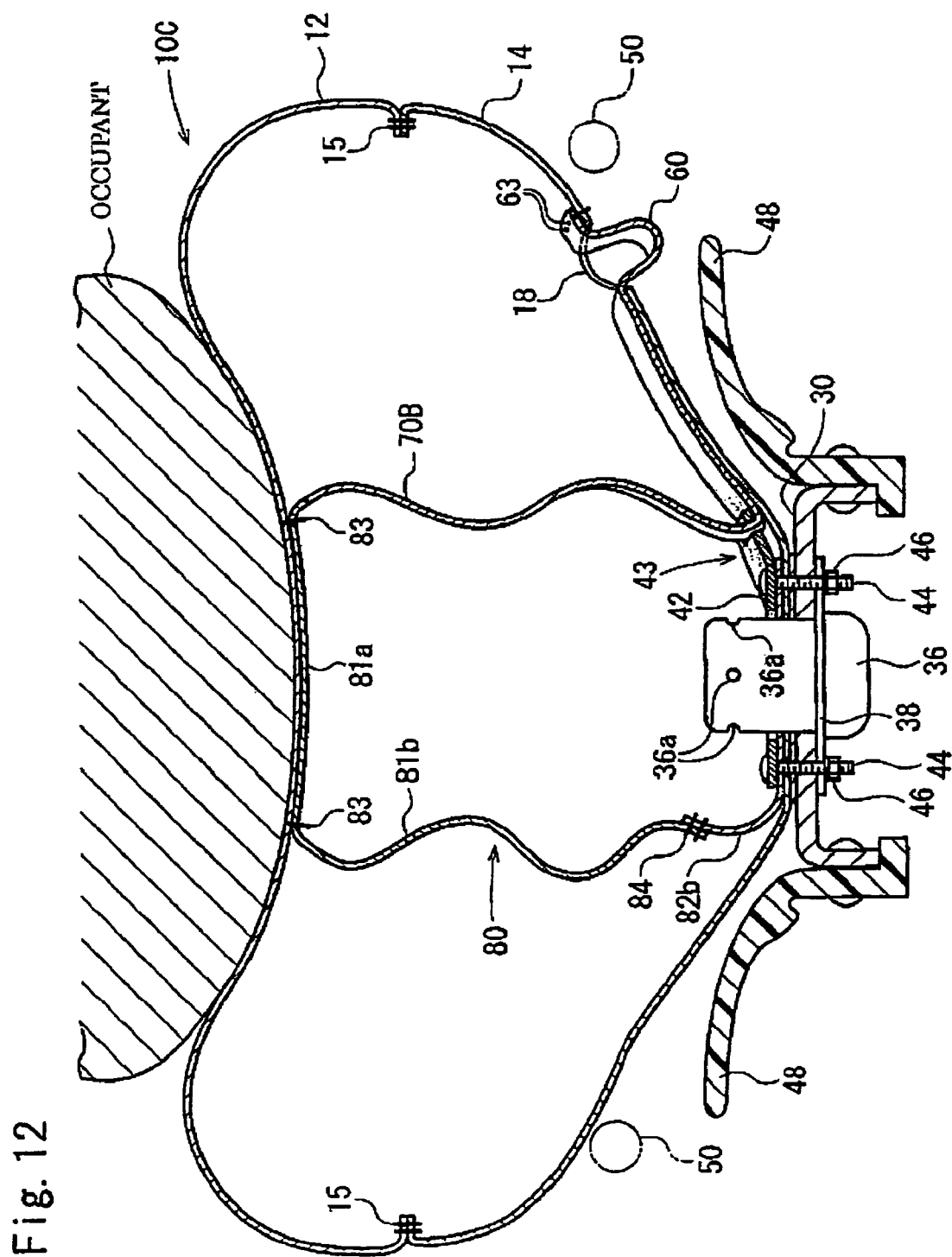
FIG. 12 is a sectional view of the airbag and the airbag apparatus shown in FIG. 11 when receiving an occupant.
Figure 13:
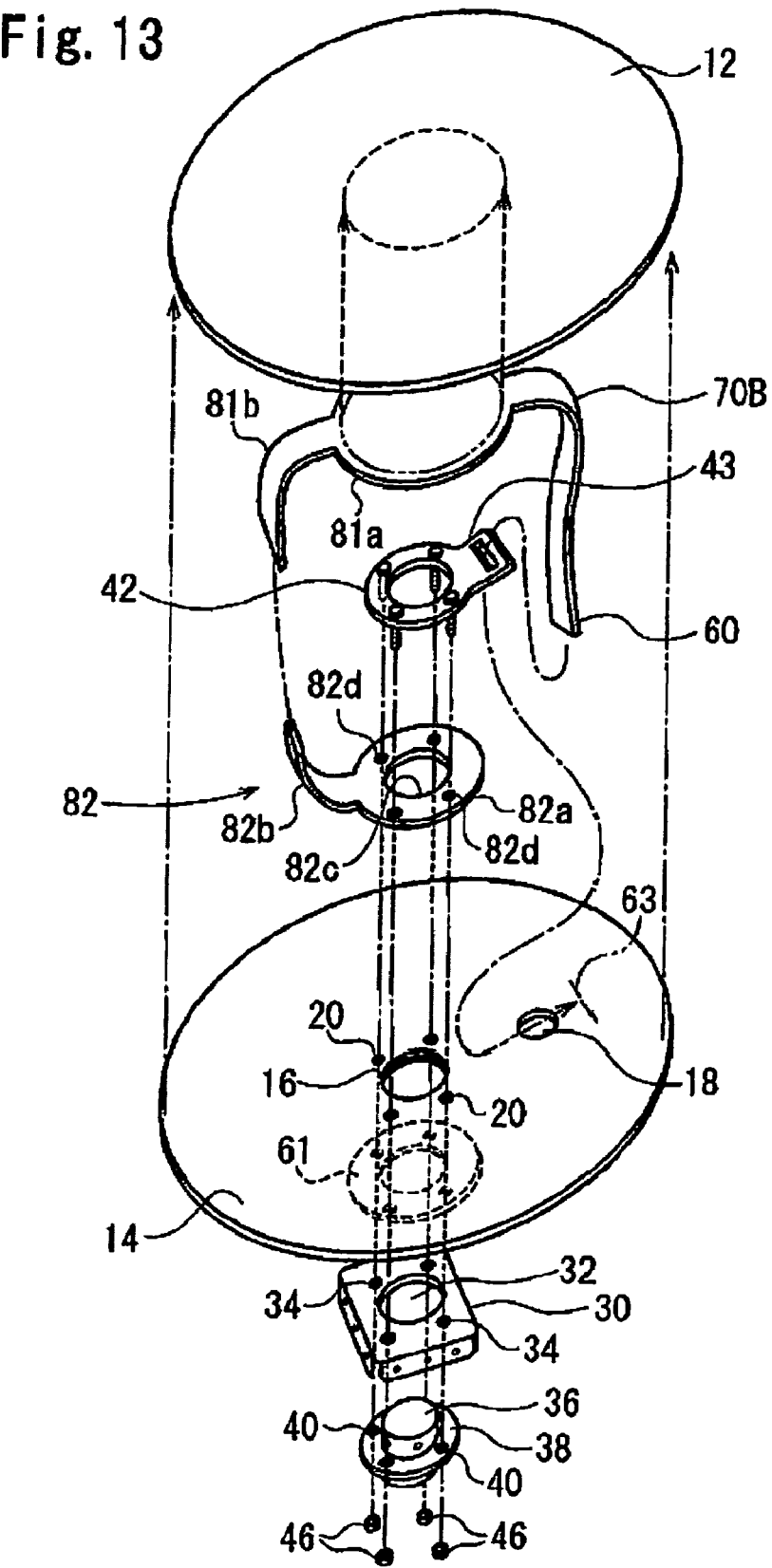
FIG. 13 is an exploded perspective view of the airbag and the airbag apparatus shown in FIG. 11.

FIG. 11 and FIG. 12 are sectional views of an airbag and an airbag apparatus having such a structure and FIG. 13 is an exploded perspective view of the airbag and the airbag apparatus. FIG. 11 shows a state before an occupant plunges into the airbag and FIG. 12 shows a state after the occupant plunges into the airbag.

The airbag 10C of this embodiment is different from the aforementioned airbag 10B as shown in FIG. 8 through FIG. 10 in that the insertion loop 90 disposed on the rear panel 14 is omitted. In this embodiment, an insertion loop 43 through which a midway portion of a tether 70B as the tethering member is inserted is formed in a holding ring 42 which is disposed inside the airbag 10C to fix the rear panel 14 to the retainer 30.

For details, in this embodiment, the insertion loop 43 as a projecting piece projecting laterally from the outer periphery of the holding ring 42 is integrally formed with the holding ring 42. The insertion loop 43 is provided with a tether through hole (no numeral) through which a midway of the tether 70B is inserted. The insertion loop 43 may be formed separately from the holding ring 42 and then attached to the holding ring 42.

The other components of the airbag 10C are the same as those of the airbag 10B as shown in FIG. 8 through FIG. 10. The structure of the airbag apparatus comprising the airbag 10C is also the same as that of the embodiment as shown in FIG. 8 through FIG. 10. The folding method of the airbag 10C is also the same as that of the airbag 10B. Numerals in FIG. 11 through FIG. 13 which are the same as those in FIG. 8 through FIG. 10 designate the same components of the aforementioned embodiment as shown in FIG. 8 through FIG. 10.

The actions of the airbag apparatus of this embodiment are the same as the airbag apparatus of FIG. 8 through FIG. 10.

In any of the aforementioned embodiments, the longer the length of each tether 70, 70A, or 70B is, the larger the opening degree of the vent hole 18 is because the lid member 60 moves to a position apart from the vent hole 18 by a longer distance when the lid member 60 is pushed out of the airbag 10, 10A, 10B or 10C through the vent hole 18. On the other hand, the shorter the length of each tether 70, 70A, or 70B is, the smaller the opening degree of the vent hole 18 is because the lid member 60 moves to a position relatively near the vent hole 18.

That is, by suitably adjusting the length of each tether 70, 70A, or 70B, the opening degree of the vent hole 18 when the lid member 60 is pushed out through the vent hole 18 (i.e. the flowing speed or flowing rate of gas through the vent hole 18) can be controlled.

Figure 14:
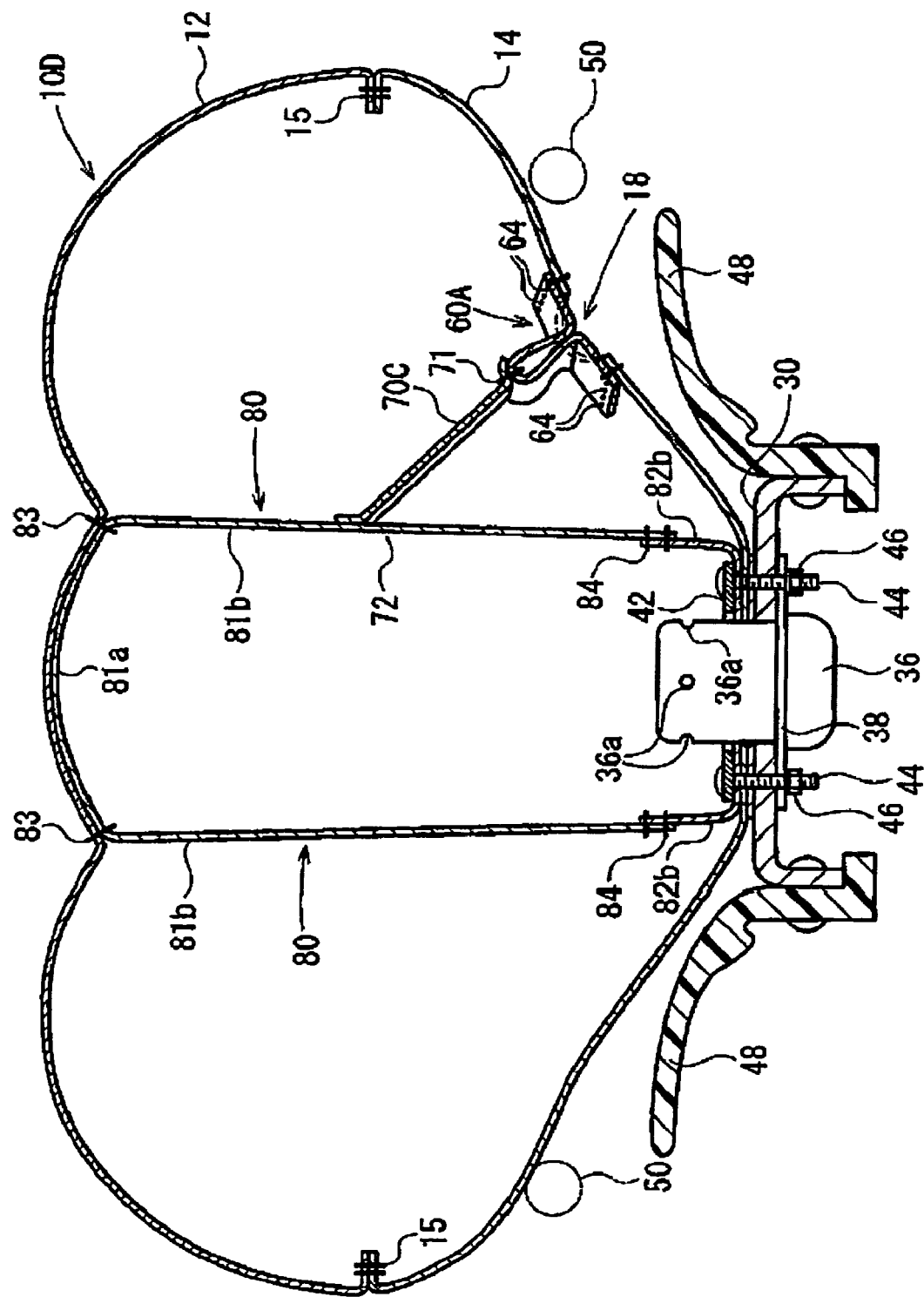
FIG. 14 is a sectional view of an airbag and an airbag apparatus according to an embodiment.
Figure 15:
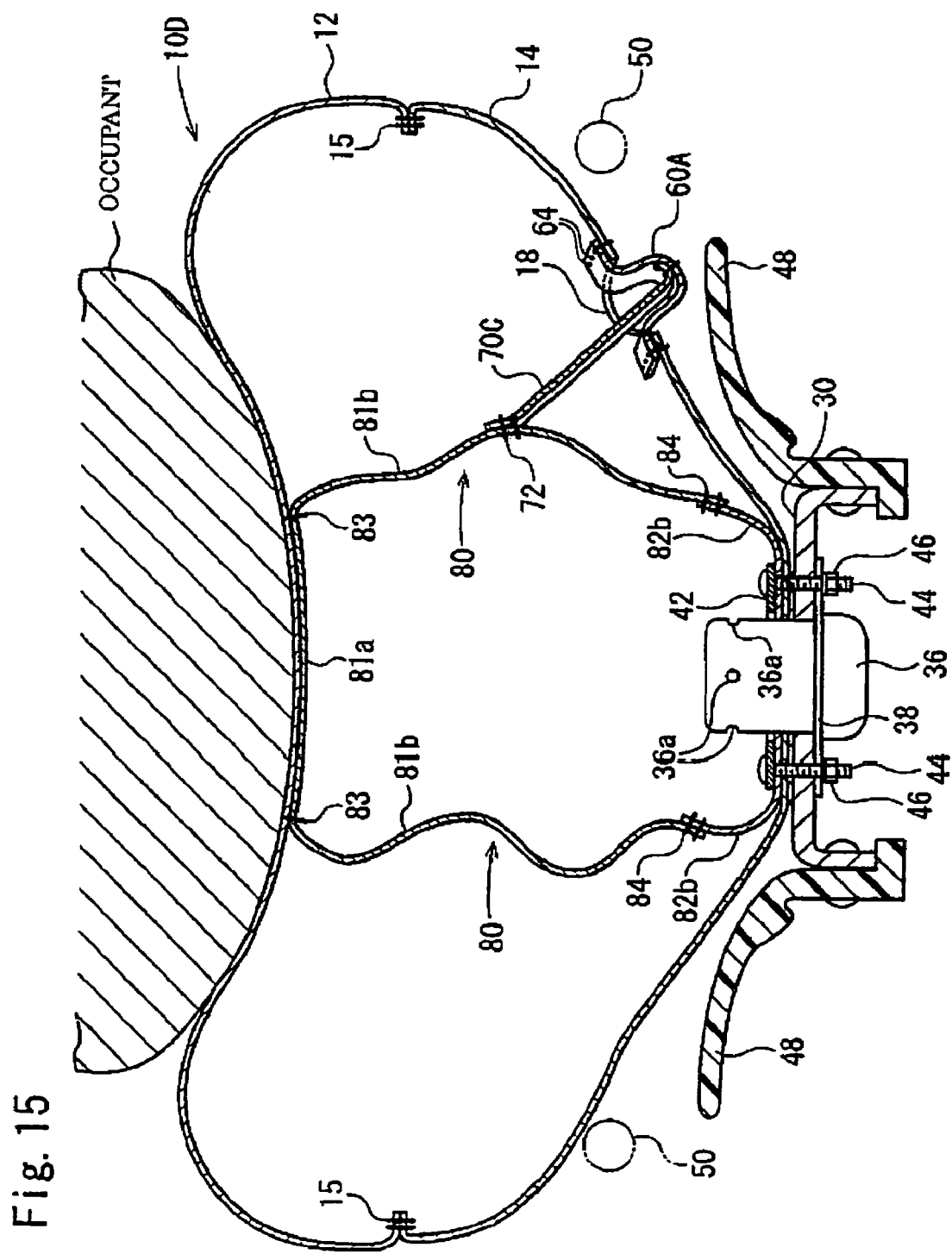
FIG. 15 is a sectional view of the airbag and the airbag apparatus shown in FIG. 14 when receiving an occupant.
Figure 16:
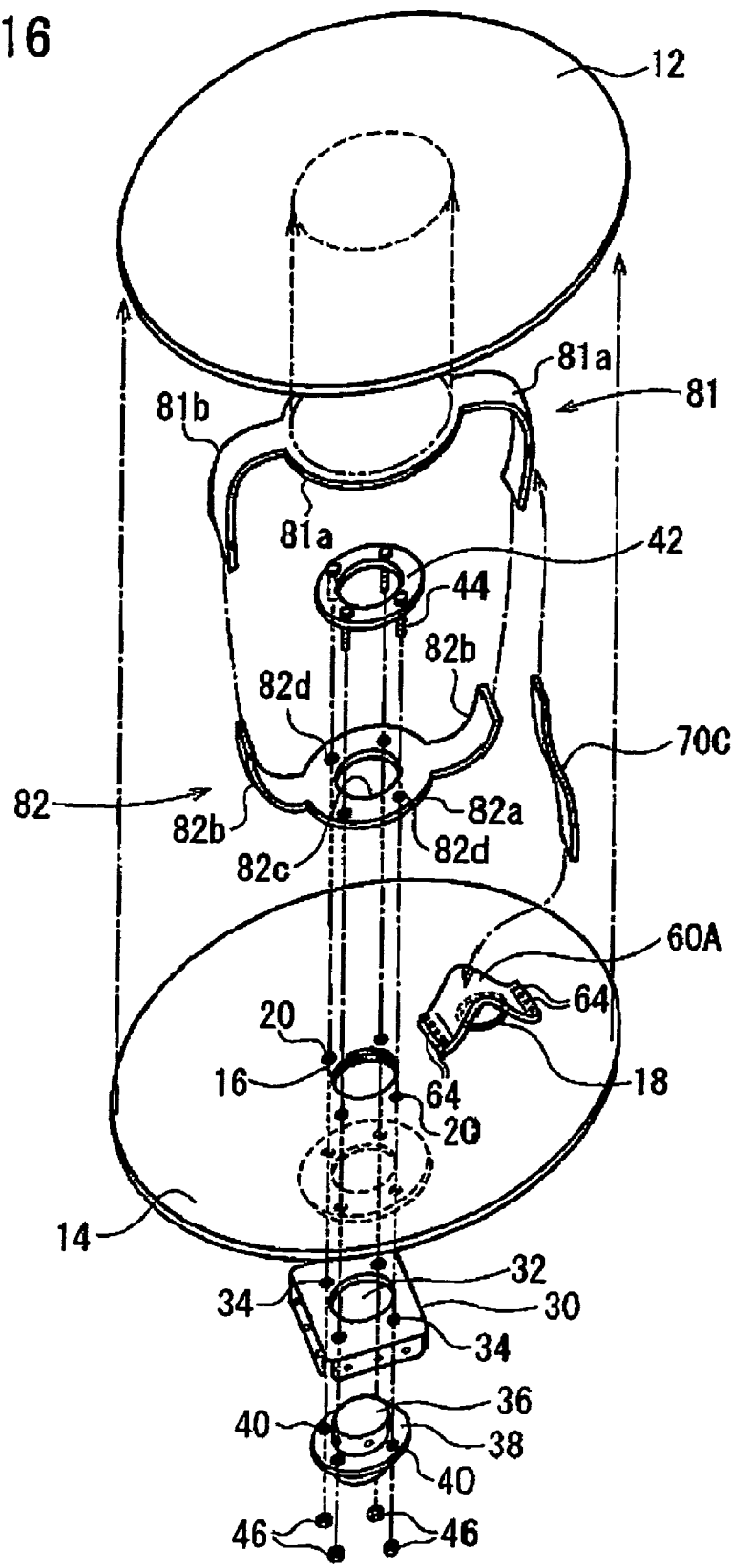
FIG. 16 is an exploded perspective view of the airbag and the airbag apparatus shown in FIG. 14.
Figure 17A:
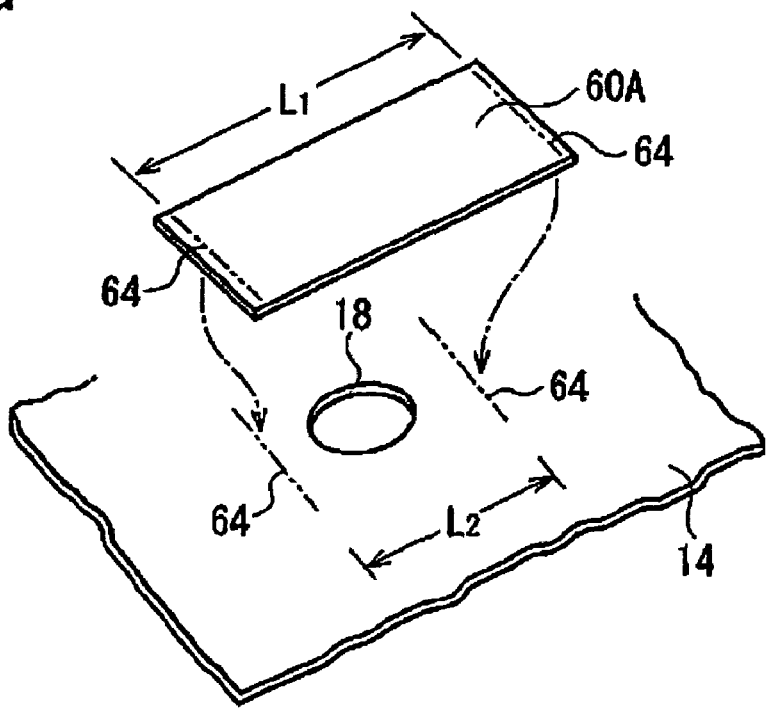
FIG. 17a is an enlarged exploded perspective view of a vent hole and its periphery of the airbag shown in FIG. 14
Figure 17B:
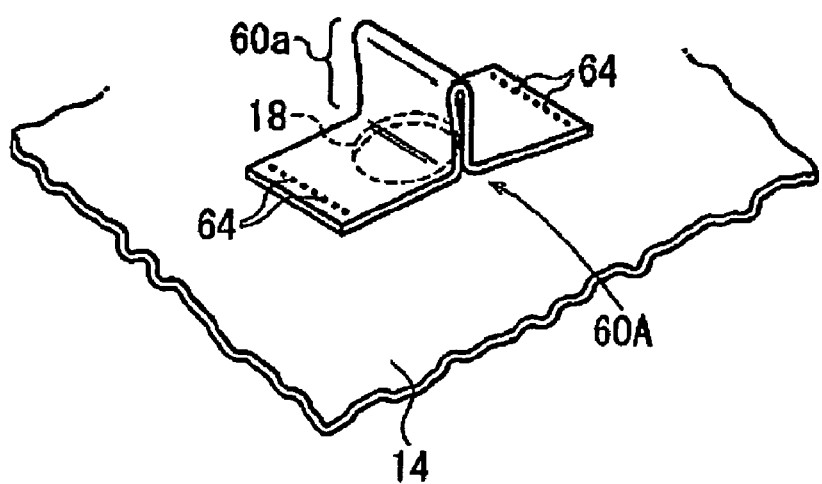

FIG. 14 and FIG. 15 are sectional views of an airbag and an airbag apparatus according to still another embodiment, FIG. 16 is an exploded perspective view of the airbag and the airbag apparatus, FIG. 17a is an enlarged exploded perspective view of a vent hole and a peripheral portion thereof, and FIG. 17b is an enlarged perspective view of the vent hole and the peripheral portion thereof. FIG. 14 shows a state before an occupant plunges into the airbag and FIG. 15 shows a state after the occupant plunges into the airbag.

The airbag 10D of this embodiment is different from the aforementioned airbag 10B as shown in FIG. 8 through FIG. 10 by a lid member 60A which is provided separately from the tethering member to cover the vent hole 18 from the inside of the airbag 10D. The lid member 60A and the restriction strap 80 are connected by a tether 70C as the tethering member.

For details, in this embodiment, the lid member 60A is a rectangular sheet. The lid member 60A is arranged such that the longitudinal direction thereof extends along the radial direction of the rear panel 14 and the both end portions in the longitudinal direction are sewn to the rear panel 14 at positions across the vent hole 18 by seams 64.

As shown in FIG. 17a, the distance L2 between sewn positions of the lid member 60A relative to the rear panel 14 in the state that the rear panel 14 is deployed to elongate flatly is shorter than the distance L1 between both ends of the lid member 60A in the state that the lid member 60A is deployed to elongate flatly. Accordingly, as the lid member 60A is overlaid on the inner surface of the rear panel 14 from both ends of the lid member 60A, a slack 60a is generated about at a middle portion in the longitudinal direction of the lid member 60A as shown in FIG. 17b.

The tether 70C is sewn at its one end (proximal end) portion to a midway of the restriction strap 80 by seam 72 and is sewn at the other end (distal end) portion to a portion about the middle portion in the longitudinal direction of the lid member 60A by seam 71.

In this embodiment, the length of the tether 70C is set to ensure that, when the airbag 10D is inflated, the tether 70C pulls the lid member 60A inside the airbag 10D only for an amount corresponding to the aforementioned slack 60a generated at the middle portion in the longitudinal direction of the lid member 60A.

According to the aforementioned structure, when the airbag 10D is inflated, the lid member 60A is pressed against the inner surface of the rear panel 14 from the both ends in the longitudinal direction thereof toward the middle portion by the inner gas pressure of the airbag 10D so that the slack 60a generated at the middle portion is in a state pulled inside the airbag 10D by the tether 70C. As a result, the lid member 60A is prevented from being pushed out of the airbag 10D through the vent hold 18 by the inner gas pressure of the airbag 10D so that the lid member 60A is overlaid on the vent hole 18 to close the vent hole 18.

The other components of the airbag 10D are the same as those of the airbag 10B as shown in FIG. 8 through FIG. 10. The structure of the airbag apparatus comprising the airbag 10D is also the same as that of the embodiment as shown in FIG. 8 through FIG. 10. The folding method of the airbag 10D is also the same as that of the airbag 10B. Numerals in FIG. 14 through FIG. 17b which are the same as those in FIG. 8 through FIG. 10 designate the same components of the aforementioned embodiment as shown in FIG. 8 through FIG. 10.

In the airbag apparatus comprising the airbag 10D, the inflator 36 is actuated to spout gas so as to inflate the airbag 10D in the event of a vehicle collision. According to the inflation, the restriction straps 80 are developed to elongate toward the occupant side and the tether 70D is pulled inside the airbag 10D by the restriction strap 80 and is thus tensioned, thereby pulling the lid member 60A inside the airbag 10D only for an amount corresponding to the slack 60a. Therefore, the lid member 60 is prevented from being pushed out of the airbag 10D through the vent hole 18 by the inner gas pressure of the airbag 10D and is thus overlaid on the vent hole 18 to close the vent hole 18. As a result, the airbag 10D can be rapidly inflated to have high inner pressure, thereby accelerating the inflation of the airbag 10D.

Also in this embodiment, the airbag 10D is folded keeping the state that the lid member 60A is overlaid on the vent hole 18 from the inside of the airbag 10D, whereby the lid member 60A is in the state overlaid on the vent hole 18 from the start of inflation of the airbag 10D. Since the outflow of gas through the vent hole 18 is restricted from the start of inflation of the airbag 10D, the airbag 10D can be extremely rapidly inflated.

After that, when the occupant plunges into the thus inflated airbag 10D, the front panel 12 of the airbag 10D is pressed by the occupant and thus depressed toward the rear panel 14 so that the restriction straps 80 are distorted as shown in FIG. 15, thereby allowing the lid member 60A to move out of the airbag 10D. Therefore, the lid member 60A is pushed out of the airbag 10D through the vent hole 18 by inner gas pressure so that the vent hole 18 is opened. As a result, gas flows out of the airbag 10D through the vent hole 18, whereby the occupant is softly received and restrained by the airbag 10D.

In this embodiment, the larger the amount of the slack 60a of the lid member 60A is, the larger the opening degree of the vent hole 18 is because the lid member 60A moves to a position apart from the vent hole 18 by a longer distance when the lid member 60A is pushed out of the airbag 10D through the vent hole 18. On the other hand, the smaller the amount of the slack 60a of the lid member 60A is, the smaller the opening degree of the vent hole 18 is because the lid member 60 moves to a position relatively near the vent hole 18.

That is, by suitably adjusting the amount of the slack 60a of the lid member 60A as well as the length of the tether 70C, the opening degree of the vent hole 18 when the lid member 60A is pushed out through the vent hole 18 (i.e. the flowing speed or flowing rate of gas through the vent hole 18) can be controlled.

Though application examples in which the present invention is applied to a driver-side airbag and airbag apparatus of a vehicle are referred in the aforementioned embodiments, the present invention can be applied to various airbag and airbag apparatuses other than the application examples.

Figure 18A:
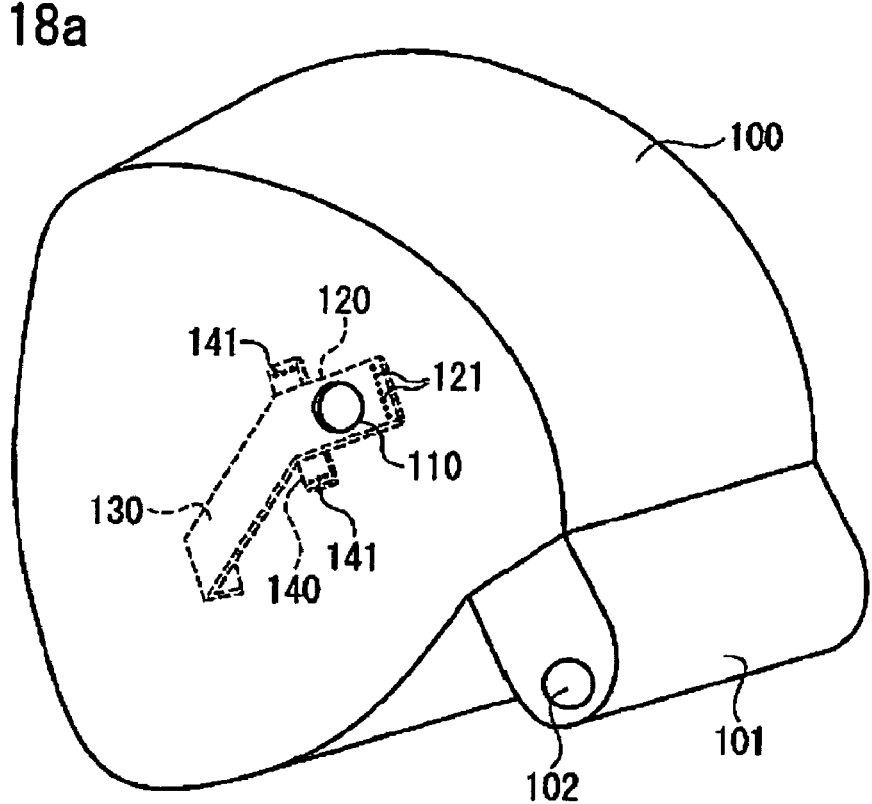
Figure 18B:
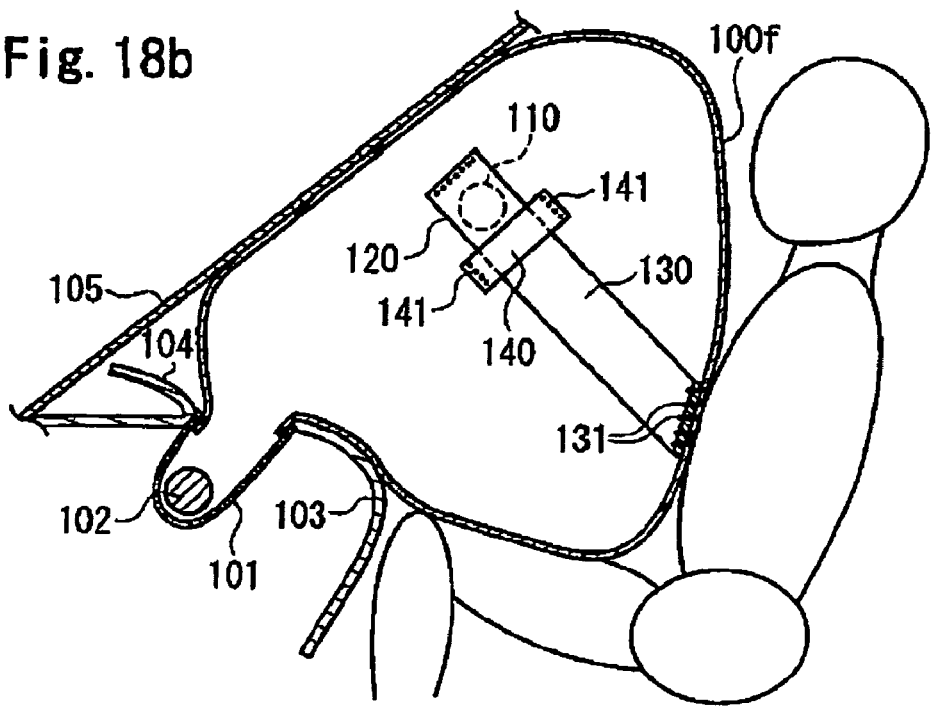
Figure 19A:
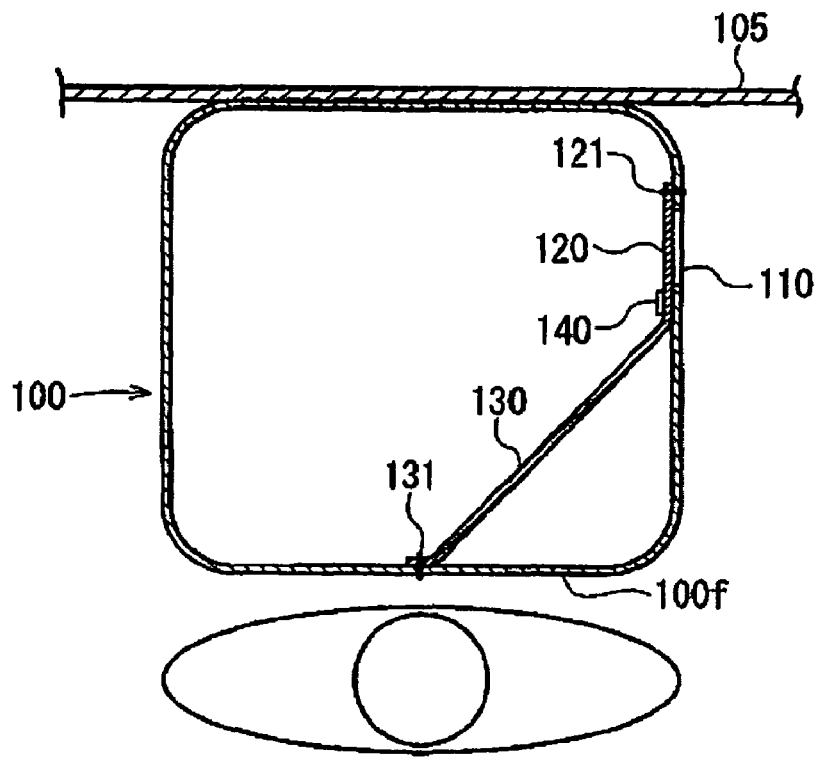
FIG. 19a is a horizontal sectional view of the airbag shown in FIG. 18a before an occupant plunges into the airbag and FIG. 19b is a horizontal sectional view of the airbag shown in FIG. 18a after the occupant plunges into the airbag.
Figure 19B:
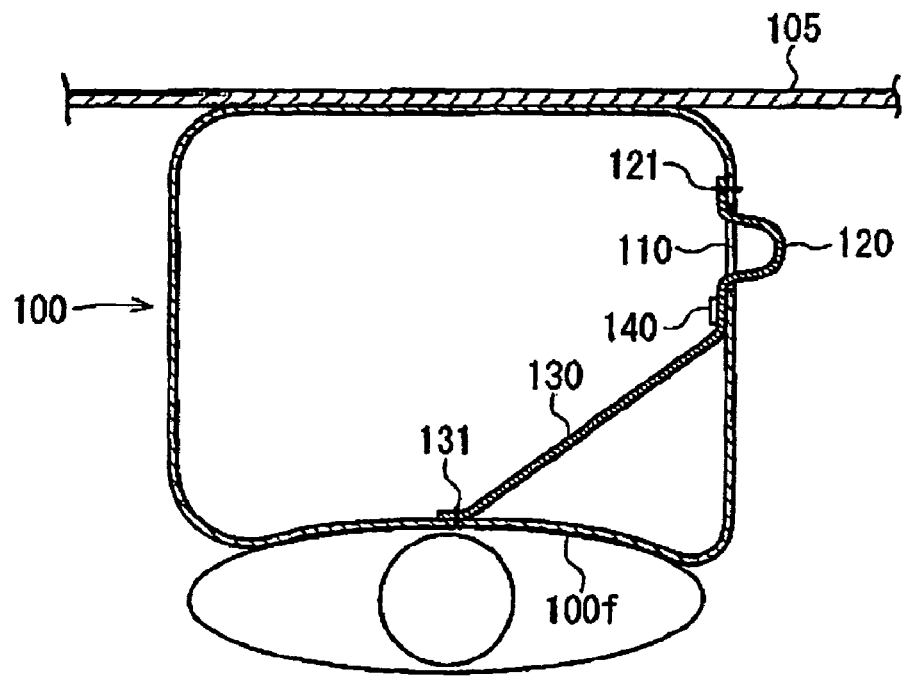

FIGS. 18a, 18b, 19a, 19b show an example of a front passenger-side airbag to which the present invention is applied. FIG. 18a is a perspective view of the front passenger-side airbag when inflated, FIG. 18b is a vertical sectional view of the inflated airbag, FIG. 19a is a horizontal sectional view showing a state before an occupant plunges into the airbag, and FIG. 19b is a horizontal sectional view showing a state after the occupant plunges into the airbag.

The front passenger-side airbag 100 is folded and accommodated in a container 101 and is inflated by an inflator 102. The front passenger-side airbag is disposed in an instrument panel 103. The open top of the container 101 is covered by a lid 104. Numeral 105 designates a windshield.

The front passenger-side airbag 100 is provided with a vent hole 110 formed in a side surface thereof. The vent hole 110 is covered by a lid member 120 from the inside of the airbag. The lid member 120 extends roughly an anteroposterior direction (a direction connecting an occupant side to the side opposite to the occupant side) of the airbag 100 and across the vent hole 110. An end portion of the lid member 120 on the side opposite to the occupant side is sewn to the side surface (inner surface) of the airbag 100 at a position near the rear end side (the side opposite to the occupant side) of the airbag 100 relative to the vent hole 110 by seam 121. The end on the occupant side of the lid member 120 continues to a tether 130.

Though the lid member 110 and the tether 130 are formed integrally with each other in this embodiment, these may be formed separately from each other.

At a position near the occupant relative to the vent hole 110, an insertion loop 140 through which the tether 130 is inserted is attached to the side surface (inner surface) of the airbag 100. The structure of the insertion loop 140 is the same as that of the insertion loop 90 of any one of the embodiments as shown in FIG. 1 through FIG. 4. Numeral 141 designates seams for sewing both end portions of a small cloth composing the insertion loop 140 to the side surface of the airbag 100.

The tether 130, of which a midway portion is inserted through the insertion loop 140, is sewn at its distal end (the end opposite to the lid member 120) to an occupant facing surface 100f of the airbag 100 by seam 131.

Also in this embodiment, the length of the tether 130 is set to ensure that, when the airbag 100 is inflated, the tether 130 is pulled toward the occupant side by the occupant facing surface 100f of the airbag 100 and is thus tensioned so as to prevent the lid member 120 from moving out of the airbag 100 (from being pushed out of the airbag 100 through the vent hole 110 by the inner gas pressure of the airbag 100) and also to ensure that the lid member 120 is prevented from being spaced apart from the side surface of the airbag 100 because the lid member 120 is excessively pulled inside the airbag 100 by the tether 130.

Also in this embodiment, the airbag 100 is folded keeping the state that the lid member 120 is overlaid on the vent hole 110 from the inside of the airbag 100.

In the airbag apparatus comprising the airbag 100, the inflator 102 is actuated to spout gas so as to inflate the airbag 100 in the event of a vehicle collision. As shown in FIG. 18b and FIG. 19a, according to the bulge of the occupant facing surface 100f toward the occupant side, the tether 130 is pulled toward the occupant side by the occupant facing surface 100f and is thus tensioned, thereby preventing the lid member 120 from moving out of the airbag 100. Therefore, the lid member 120 is prevented from being pushed out of the airbag 100 through the vent hole 110 by the inner gas pressure of the airbag 100 and is thus overlaid on the vent hole 110 to close the vent hole 110. As a result, the airbag 100 can be rapidly inflated to have high inner pressure, thereby accelerating the inflation of the airbag 100.

Also in this embodiment, the airbag 100 is folded keeping the state that the lid member 120 is overlaid on the vent hole 110 from the inside of the airbag 100, whereby the lid member 120 is in the state overlaid on the vent hole 110 from the start of inflation of the airbag 100. Since the outflow of gas through the vent hole 110 is restricted from the start of inflation of the airbag 100, the airbag 100 can be extremely rapidly inflated.

After that, when the occupant plunges into the thus inflated airbag 100, the occupant facing surface 100f is pressed by the occupant and thus depressed as shown in FIG. 19b, thereby allowing the lid member 120 to move out of the airbag 100. Therefore, the lid member 120 is pushed out of the airbag 100 through the vent hole 110 by inner gas pressure of the airbag 100 so that the vent hole 110 is opened. As a result, gas flows out of the airbag 100 through the vent hole 110, whereby the occupant is softly received and restrained by the airbag 100.

Also in this embodiment, by suitably adjusting the length of the tether 130, the opening degree of the vent hole 110 when the lid member 120 is pushed out through the vent hole 110 (i.e. the flowing speed or flowing rate of gas through the vent hole 110) can be controlled.

Also in the front passenger-side airbag 100, the vent hole 110 may be covered by a lid member with a slack like the aforementioned embodiment as shown in FIG. 14 through FIG. 17b. In this case, during the inflation of the airbag 100, the lid member is pulled inside the airbag 100 by the tether 130 only for an amount corresponding to the slack so as to press the lid member against the vent hole 110. When the occupant plunges into the inflated airbag 100, the tension of the tether 130 is released so as to allow the lid member to be pushed out through the vent hole 110 for an amount corresponding to the slack.

In this case, by suitably adjusting the amount of the slack of the lid member as well as the length of the tether 130, the opening degree of the vent hole 110 when the lid member is pushed out through the vent hole 110 (i.e. the flowing speed or flowing rate of gas through the vent hole 110) can be controlled.

Figure 20:
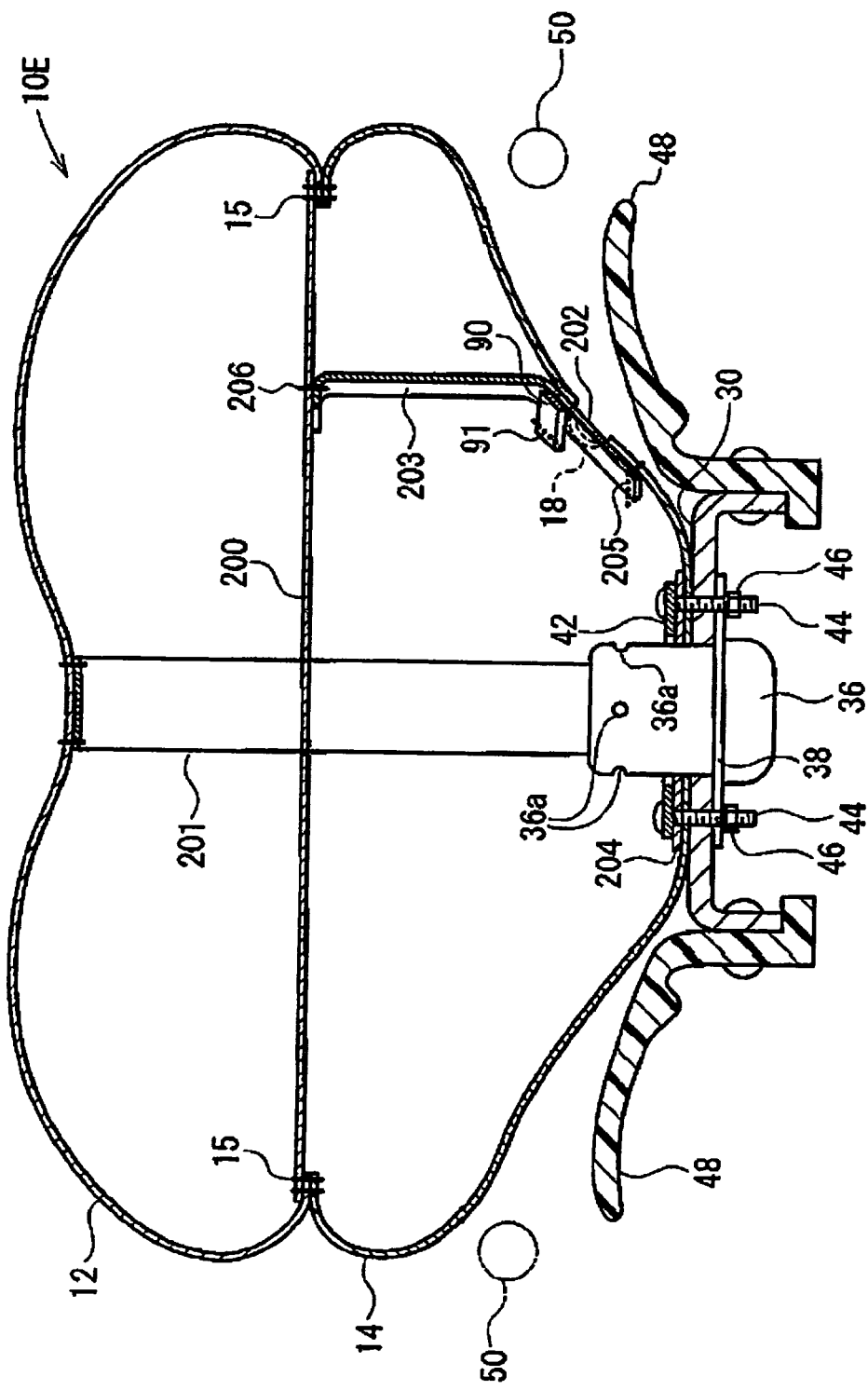
FIG. 20 is a sectional view of an airbag and an airbag apparatus according to an embodiment.
Figure 21:
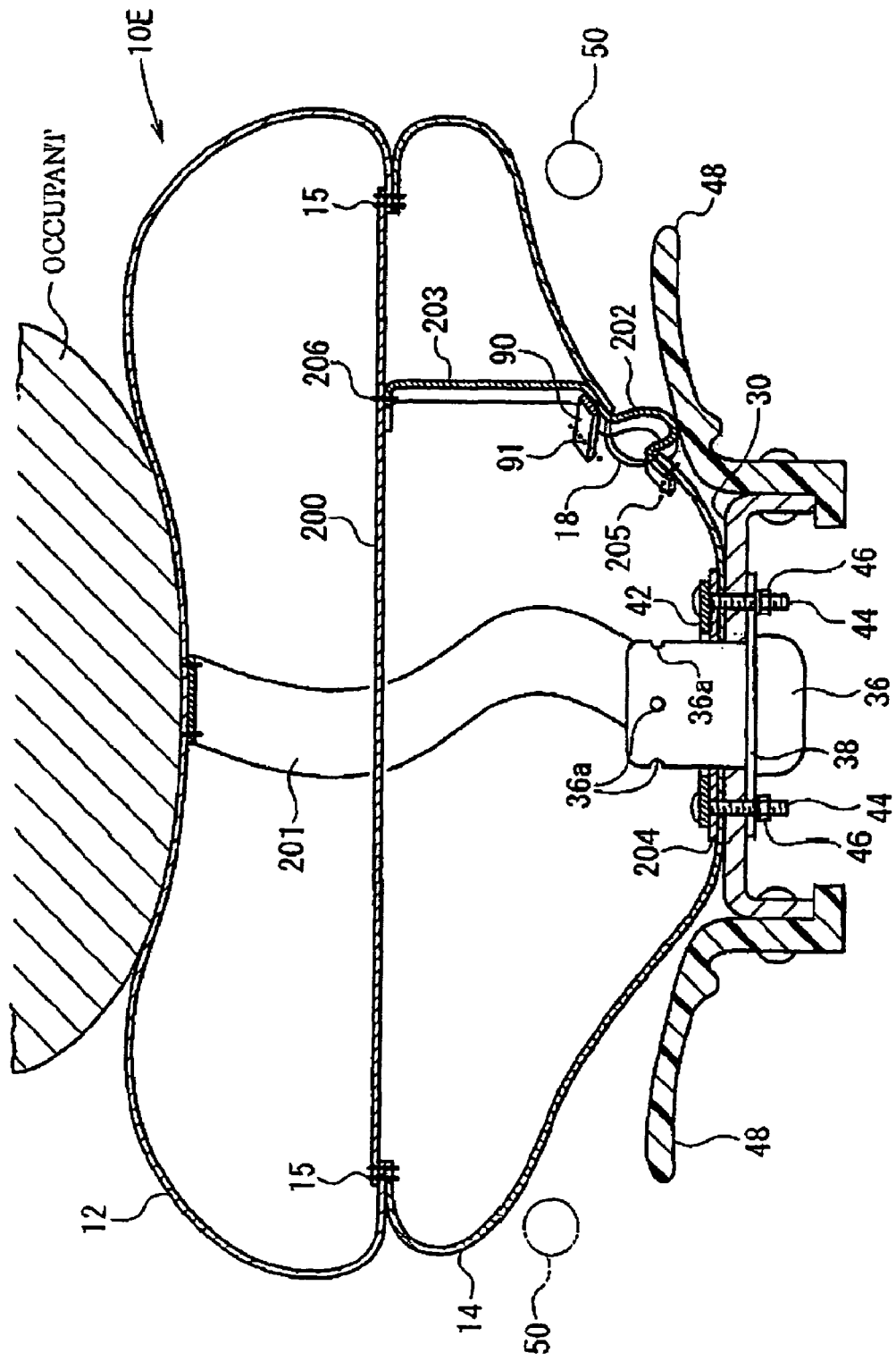
FIG. 21 is a sectional view of the airbag and the airbag apparatus shown in FIG. 20 when receiving an occupant.

FIG. 20 and FIG. 21 are sectional views of an airbag apparatus according to still another embodiment, FIG. 20 shows a state before an occupant is received, and FIG. 21 shows a state when the occupant is received.

An airbag 10E of this embodiment comprises a front panel 12 composing an occupant facing surface, a rear panel 14 composing an outer surface opposite to the occupant facing surface, a restriction strap 200 as an inner member which extends across the inside of the airbag 10E to connect side portions of the airbag 10E to each other, restriction straps 201 for connecting the front panel 12 and the rear panel 14, a vent hole 18 allowing communication between the inside and the outside of the airbag 10E, a lid member 202 for restricting the outflow of gas through the vent hole 18, and a tether 203 as a tethering member for connecting the lid member 202 to the restriction strap 200.

Also in this embodiment, the outer peripheries of the front panel 12 and the rear panel 14 are sewn together by seam 15 to compose an outer shell of the envelope-shape airbag 10E. The restriction strap 200 are arranged to extend in the radial direction of the airbag 10E and are sewn at its both ends to outer peripheral portions of the front panel 12 and the rear panel 14 by the seams 15. The restriction strap 200 prevents or restricts the airbag 10E from bulging laterally over a predetermined value when the airbag 10E is inflated.

The restriction straps 201 are disposed such that one ends thereof are connected to a patch cloth 204 which is sewn to the peripheral portion of an inflator-receiving opening (no numeral) of the rear panel 14 and the other ends thereof are sewn to a middle portion of the front panel 12 by seam (no numeral). The restriction straps 201 prevent or restrict the airbag 10E from bulging toward the occupant side over a predetermined value when the airbag 10E is inflated.

Though the vent hole 18 is a circular opening in this embodiment, the configuration of the vent hole is not limited thereto. The vent hole 18 is disposed at a position not to overlap with a steering wheel 50.

The aforementioned lid member 202 is overlaid on the vent hole 18 from the inside of the airbag 10E. Also in this embodiment, the lid member 202 is integrally formed with the aforementioned tether 203.

Also in this embodiment, the inner surface of the rear panel 14 is provided with an insertion loop 90 through which a midway portion of the tether 203 is inserted. In this embodiment, the insertion loop 90 is disposed at a position near the outer periphery of the rear panel 14 relative to the vent hole 18 as illustrated. The structure of the insertion loop 90 is the same as that of the aforementioned embodiment as shown in FIG. 1 through FIG. 4. Numeral 91 designates seams for sewing both end portions of a small cloth composing the insertion loop 90 to the rear panel 14.

The lid member 202 extends in a radial direction of the rear panel 14 to cover the vent hole 18. One end of the tether 203 continues to an end of the lid member 202 near the outer periphery of the rear panel 14 after inserted into the aforementioned insertion loop 90. The end portion of the lid member 202 near the center of the rear panel 14 is sewn to the rear panel 14 at a position near the center of the rear panel 14 relative to the vent hole 18 by seam 205.

The other end portion of the tether 203 is sewn to a midway portion of the restriction strap 200 in the extending direction (the radial direction of the airbag 10E) by seam 206.

The length of the tether 203 is set to ensure that, when the airbag 10E is inflated and the restriction strap 200 is tensioned in the radial direction of the airbag 10E, the tether 203 is also pulled inside the airbag 10E by the restriction strap 200 and is thus tensioned so as to prevent the lid member 202 from moving out of the airbag 10E (from being pushed out of the airbag 10E through the vent hole 18 by the inner gas pressure of the airbag 10E) and also to ensure that the lid member 202 is prevented from being spaced apart from the inner surface of the rear panel 14 because the lid member 202 is excessively pulled inside the airbag 10E by the tether 203.

The other components of the airbag 10E are the same as those of the airbag 10 as shown in FIG. 1 through FIG. 4.

Also in the embodiment, the airbag 10E is folded keeping the state that the lid member 202 is overlaid on the vent hole 18 from the inside of the airbag 10E.

When the airbag 10E is inflated, as shown in FIG. 20, the restriction strap 200 is tensioned to extend across the inside of the airbag 10E, thereby preventing the airbag 10E from excessively bulging laterally, and the restriction straps 201 are tensioned between the front panel 12 and the rear panel 14, thereby preventing the airbag 10E from excessively bulging toward the occupant side.

As shown in the drawings, according to the tension of the restriction strap 200, the tether 203 is pulled inside the airbag 10E and is thus tensioned, thereby preventing the lid member 202 from moving out of the airbag 10E. Therefore, the lid member 202 is prevented from being pushed out of the airbag 10E through the vent hole 18 by the inner gas pressure of the airbag 10E and is thus overlaid on the vent hole 18 to close the vent hole 18. As a result, the airbag 10E can be rapidly inflated to have high inner pressure, thereby accelerating the inflation of the airbag 10E.

Also in this embodiment, the airbag 10E is folded keeping the state that the lid member 202 is overlaid on the vent hole 18 from the inside of the airbag 10E, whereby the lid member 202 is in the state overlaid on the vent hole 18 from the start of inflation of the airbag 10E. Since the outflow of gas through the vent hole 18 is restricted from the start of inflation of the airbag 10E, the airbag 10E can be extremely rapidly inflated.

After that, when the occupant plunges into the thus inflated airbag 10E, the front panel 12 of the airbag 10E is pressed by the occupant and thus depressed toward the rear panel 14 so that the restriction strap 200 is retracted so as to loosen the tether 203 as shown in FIG. 21, thereby allowing the lid member 202 to move out of the airbag 10E. Therefore, the lid member 202 is pushed out of the airbag 10E through the vent hole 18 by inner gas pressure of the airbag 10E so that the vent hole 18 is opened. As a result, gas flows out of the airbag 10E through the vent hole 18, whereby the occupant is softly received and restrained by the airbag 10E.

This airbag 10E senses depression of the airbag 10E (retraction of the front panel 12) in a relatively wide area of the front panel 12. That is, the restriction strap 200 extending across the inside of the airbag 10E and connecting the side portions of the airbag 10E can retract according to the depression of the front panel 12 to loosen the tether 203 so as to cancel the closed state of the vent hole 18 by the lid member 202 not only when the occupant plunges into the inflated airbag 10E at the center of the front panel 12 but also when the occupant plunges into the airbag 10E at a position shifting from the center to depress a portion relatively near the outer periphery of the front panel 12.

In the airbag 10E, since the restriction strap 200 is disposed to extend across the inside of the airbag 10E to connect the side portions of the airbag 10E, the possibility of location of the vent hole 18 has been increased.

Though the restriction strap 200 extends in a straight line across the airbag 10E in this embodiment, the restriction strap 200 may branch to extend in a plurality of direction to extend across the airbag. Two or more restriction straps may be disposed to extend across the airbag. The inner member arranged to extend across the inside of the airbag is not limited to have specific configuration and may be an inner panel which extend across the airbag to partition the inside of the airbag into an occupant-side portion and the other portion. In this case, a lid member may be connected to the inner panel through a tether (tethering member).

Figure 22:
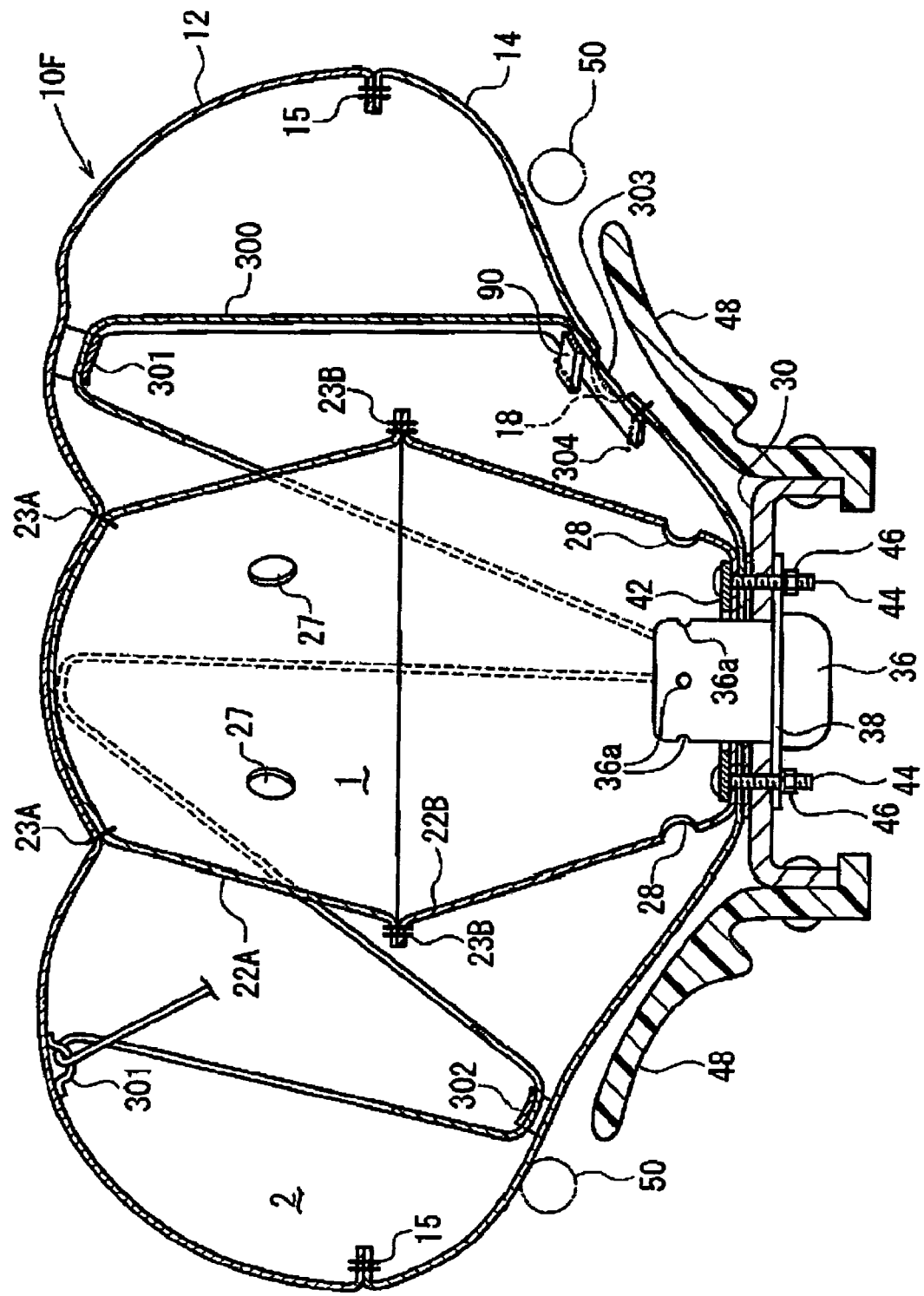
FIG. 22 is a sectional view of an airbag and an airbag apparatus according to an embodiment.

In the present invention, as an airbag 10F as shown in FIG. 22, a long strap-shape tether 300 as a tethering member may be suspended alternately between the front panel 12 and the rear panel 14.

In the airbag 10F, the front panel 12 is provided with a plurality of deflection loops 301 through which a midway portion of the tether 300 is inserted and which are arranged at positions different from each other and the rear panel 14 is also provided with a plurality of deflection loop 301 similar to the deflection loops 301 which are arranged at positions different from each other. Each of these deflection loops 301, 302 is a substantially rectangular small cloth. A pair of side portions of the rectangular small cloth are sewn to the front panel 12 or the rear panel 14. The tether 300 is inserted and drawn between the cloth and the panel 12 or 14 from the other pair of sides of the cloth.

Also in this embodiment, on the distal end side of the tether 300, a lid member 303 for covering the vent hole 18 from the inside of the airbag 10F is integrally formed with the aforementioned tether 300. The lid member 303 extends in a radial direction of the rear panel 14 to cover the vent hole 18. An end of the lid member 303 near the center of the rear panel 14 is sewn to the rear panel 14 by seam 304. The distal end of the tether 300 continues to an end of the lid member 303 near the outer periphery of the rear panel 14.

Also in this embodiment, the rear panel 14 is provided with an insertion loop 90 through which the distal end portion of the tether 300 is inserted. The insertion loop 90 is disposed at a position near the outer periphery of the rear panel 14 relative to the vent hole 18. The distal end of the tether 300 continues to the lid member 303 after inserted into the insertion loop 90. The structure of the insertion loop 90 is the same as that of any of the aforementioned embodiments.

The other end (opposite to the lid member 303) portion of the tether 300 is slidably inserted and drawn through the deflection loops 301 on the front panel 12 and the deflection loop 301 on the rear panel 14 alternately and is sewn at its end to the front panel 12. However, illustration of the sewn portion of the end of the tether 300 to the front panel 12 is omitted in FIG. 22.

The other components of the airbag 10F are the same as those of the airbag 10 as shown in FIG. 1 through FIG. 4.

Also in the embodiment, the airbag 10F is folded keeping the state that the lid member 303 is overlaid on the vent hole 18 from the inside of the airbag 10F.

When the airbag 10F is inflated, as shown in FIG. 22, the front panel 12 bulges toward the occupant side and, according to this bulging, the tether 300 is tensioned between the front panel 12 and the rear panel 14, thereby preventing the lid member 303 from moving out of the airbag 10F. Therefore, the lid member 303 is prevented from being pushed out of the airbag 10F through the vent hole 18 by the inner gas pressure of the airbag 10F and is thus overlaid on the vent hole 18 to close the vent hole 18. As a result, the airbag 10F can be rapidly inflated to have high inner pressure, thereby accelerating the inflation of the airbag 10F.

Also in this embodiment, the airbag 10F is folded keeping the state that the lid member 303 is overlaid on the vent hole 18 from the inside of the airbag 10F, whereby the lid member 303 is in the state overlaid on the vent hole 18 from the start of inflation of the airbag 10F. Since the outflow of gas through the vent hole 18 is restricted from the start of inflation of the airbag 10F, the airbag 10F can be extremely rapidly inflated.

After that, when the occupant plunges into the thus inflated airbag 10F, the front panel 12 is pressed by the occupant and thus depressed toward the rear panel 14 so that the tether 300 is distorted, not shown but similarly to the state shown in FIG. 2, thereby allowing the lid member 303 to move out of the airbag 10F. Therefore, the lid member 303 is pushed out of the airbag through the vent hole 18 by inner gas pressure of the airbag 10F so that the vent hole 18 is opened. As a result, gas flows out of the airbag 10F through the vent hole 18, whereby the occupant is softly received and restrained by the airbag 10F.

In the airbag 10F, since the tether 300 is suspended in zigzag arrangement between the front panel 12 and the rear panel 14, the distortion amount of the tether 300 as a whole when the front panel 12 is pressed by the occupant and this depressed toward the rear panel 14 is greater than that in case not zigzag arrangement. Therefore, enough distortion amount of the tether 300, that is, enough protruding amount of the lid member 303 from the vent hole 18 can be secured even when the depression amount of the front panel 12 is small.

Further in the airbag 10F, the deflection loops 301 are arranged at different position on the front panel 12. Therefore, the tether 300 is distorted so that the lid member 303 is pushed out of the airbag 10F through the vent hole 18 even when the front panel 12 is partially retracted.

Figure 23A:
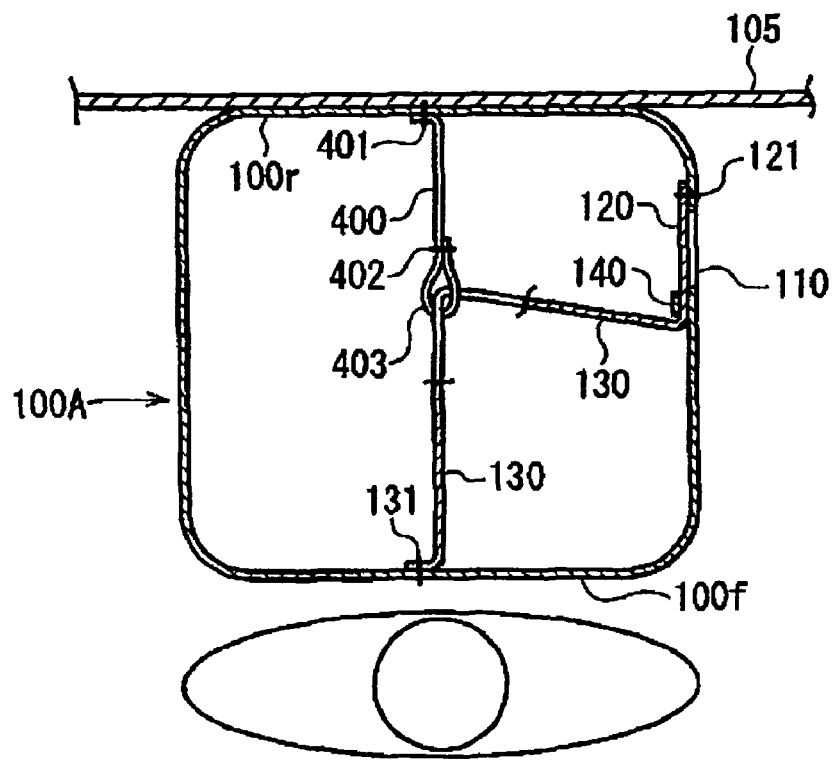
Figure 23B:
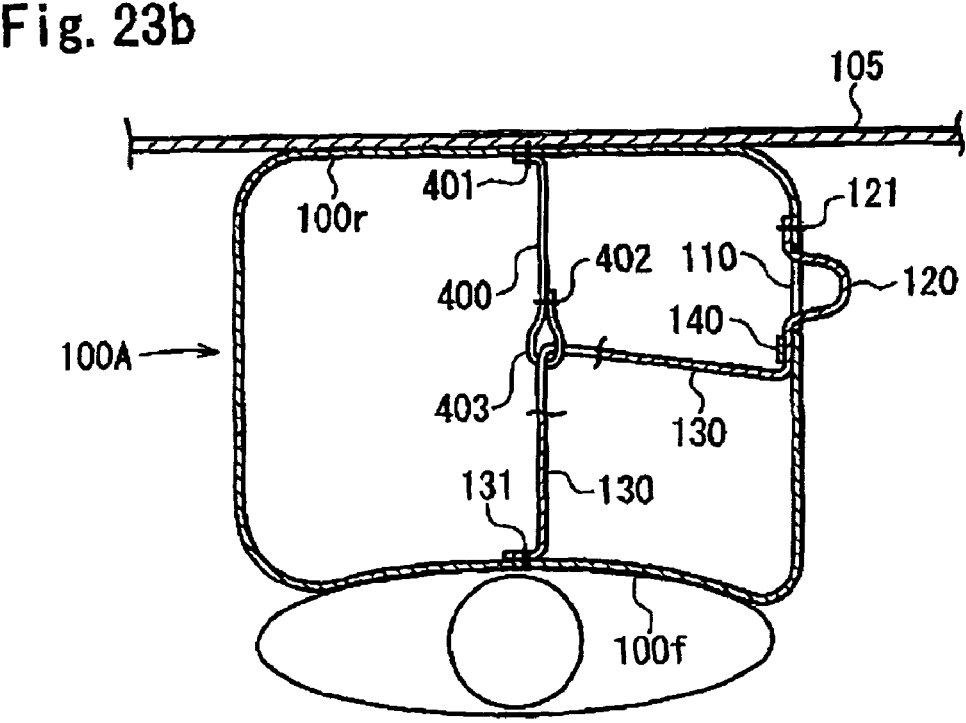

FIGS. 23a and 23b are horizontal sectional views showing operational states of an airbag according to still another embodiment. FIG. 23a shows a state before an occupant depresses an occupant-side surface of the inflated airbag and FIG. 23b shows a state that the occupant depresses the occupant-side surface.

An airbag 10A of this embodiment is different from the airbag 100 of the aforementioned embodiment as shown in FIG. 18a through FIG. 19b by a pulling member 400 for pulling a midway portion in the longitudinal direction of the tether 130 to the side opposite to the occupant facing surface 100f.

For details, the pulling member 400 is a cord-like or band-like member in this embodiment. One end portion (proximal end portion) of the pulling member 400 is sewn to an airbag inner surface 100r (hereinafter, this surface will be sometimes referred to as a rear surface 100r) opposite to the occupant facing surface 100f when the airbag 100A is inflated, by seam 401. Therefore, the other end portion (distal end portion) of the pulling member 400 is folded back toward the proximal end of the pulling member 400 and is sewn to a midway portion in the longitudinal direction of the pulling member 400 by seam 402. Accordingly, an annular guide loop 403 is formed at the distal end of the pulling member 400.

A proximal end portion of the tether 130 is sewn to the occupant facing surface 100f by seam 131, a middle portion in the longitudinal direction of the tether 130 is slidably inserted into the guide loop 403, and a distal end portion of the tether 130 is inserted into an insertion loop 140 attached to a side surface of the airbag 100A and continues to a lid member 120.

The other components of the airbag 100A are the same as those of the airbag 100 as shown in FIG. 18a through FIG. 19b. The folding method of the airbag 100A is also the same as that of the airbag 100.

Also in this embodiment, the airbag 100A is folded keeping the state that the lid member 120 is overlaid on the vent hole 110 from the inside of the airbag 100A, whereby the lid member 120 is in the state overlaid on the vent hole 110 from the start of inflation of the airbag 100A. Since the outflow of gas through the vent hole 110 is restricted from the start of inflation of the airbag 100A, the airbag 100A can be extremely rapidly inflated.

When the airbag 100A is inflated, as shown in FIG. 23a, the proximal end portion of the tether 130 is pulled toward the occupant side by the occupant facing surface 100f of the airbag 100A and the midway portion in the longitudinal direction of the tether 130 is pulled toward the side opposite to the occupant side by the rear surface 100r of the airbag 100A via the pulling member 400. Therefore, in a stage before the occupant depresses the occupant facing surface 100f toward the rear surface 100r when the occupant plunges into the inflated airbag 100A, the tether 130 is hardly distorted so as to improve the closure of the vent hole 110 by the lid member 120.

However, as shown in FIG. 23b, when the occupant plunges into the inflated airbag 100A and depresses the occupant facing surface 100f toward the rear surface 100r, a portion of the tether 130 extending from the guide loop 403 to the occupant facing surface 100f is veered out through the guide loop 403 to the side of the lid member 120. This allow the lid member 120 to move out of the airbag 100A so that the lid member 120 is pushed out of the airbag 100A through the vent hole 110 by the inner gas pressure of the airbag 100A so as to open the vent hole 110.

Though the vent hole 110 is formed in only one side surface of the airbag 100 or 100A in any of the aforementioned embodiments shown in FIGS. 18a through 19b and FIGS. 23a and 23b, vent holes may be formed in both side surfaces of the airbag in the present invention.

Figure 24A:
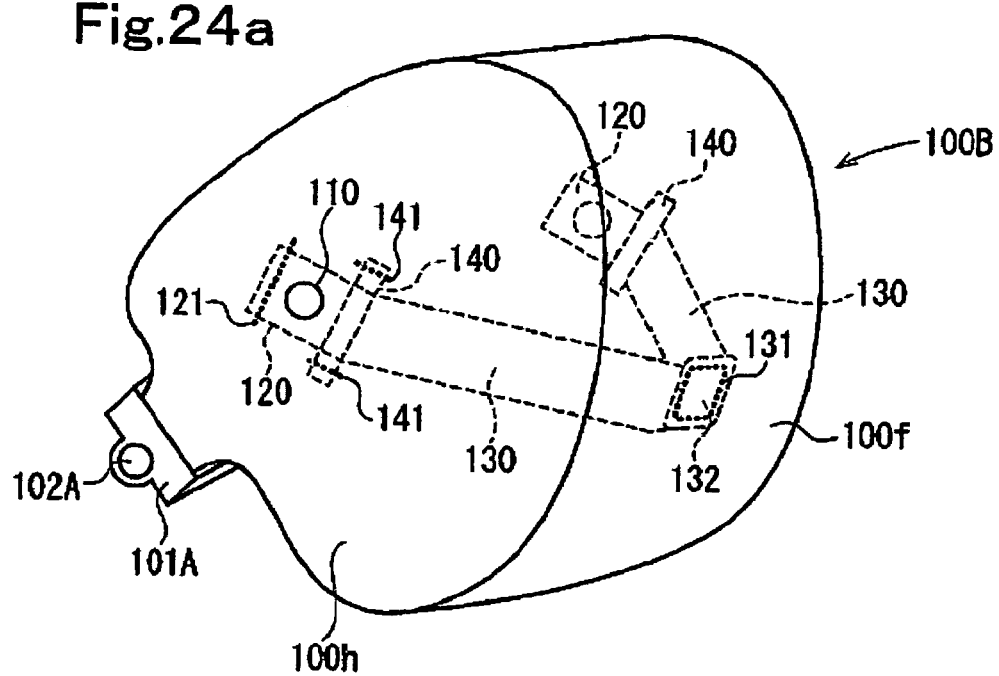
Figure 24B:
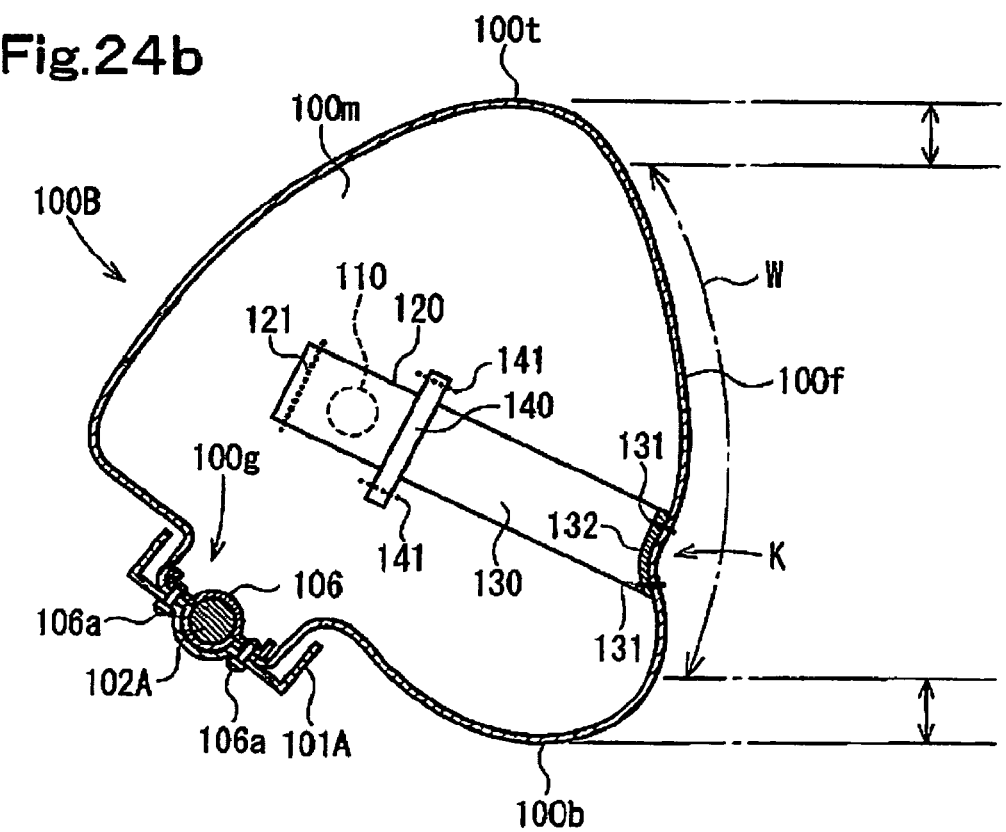
Figure 25A:
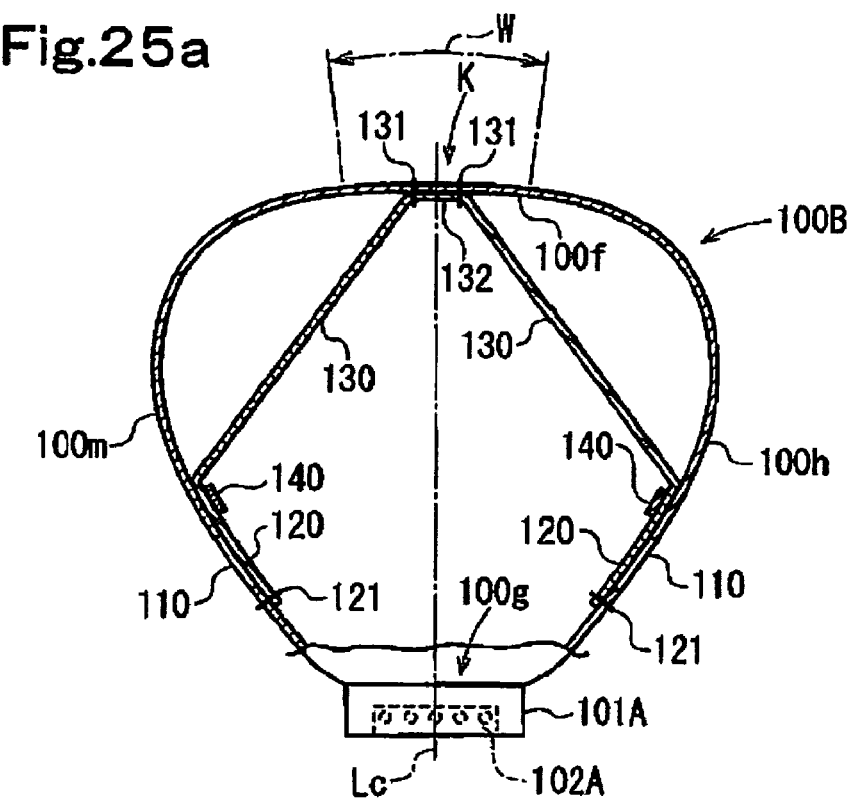
Figure 25B:
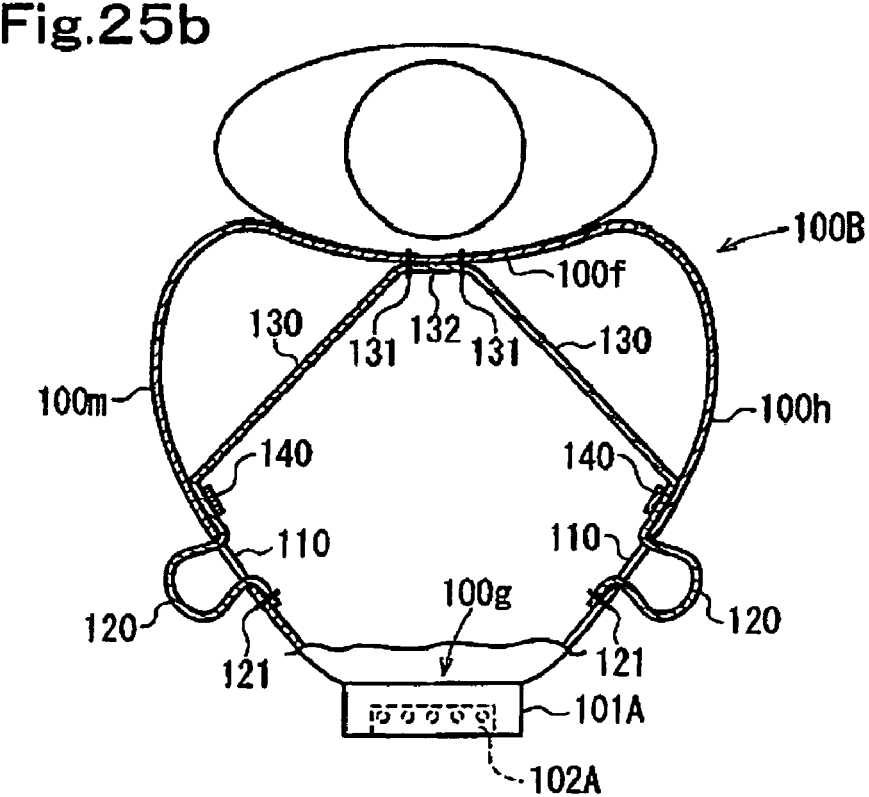
Figure 26:
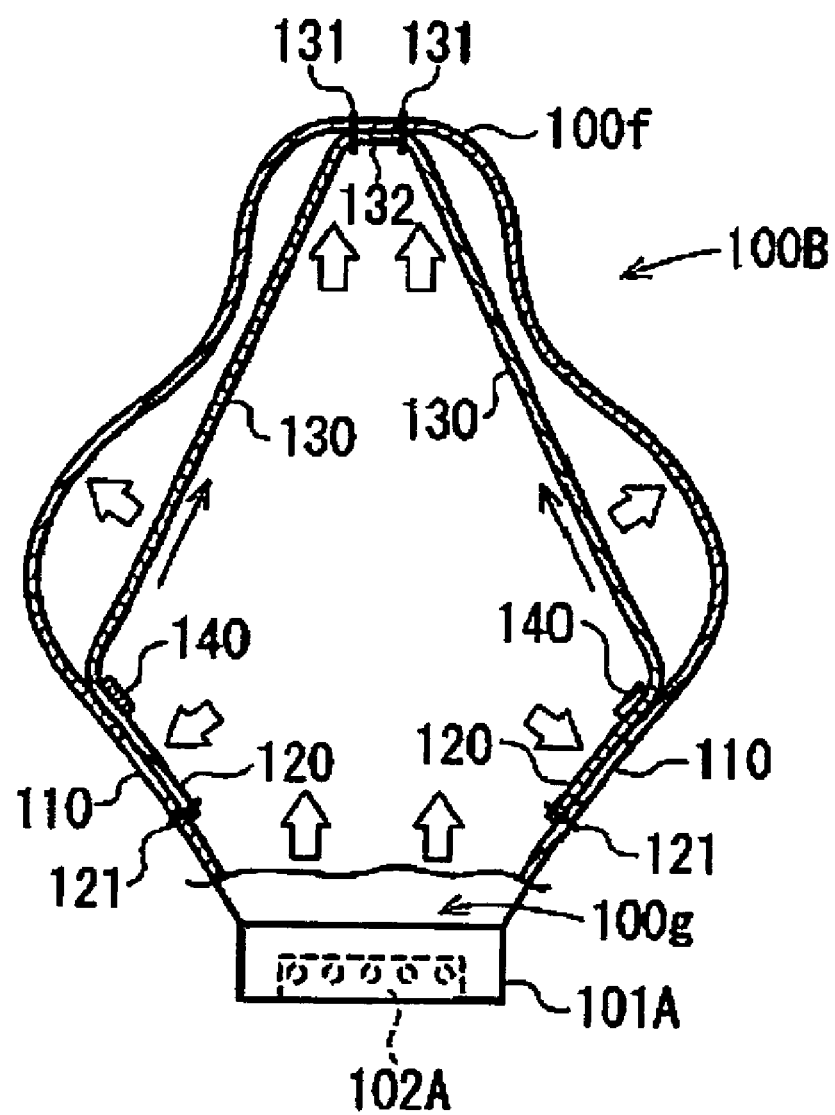

FIG. 24a is a perspective view of an airbag 100B having such a structure in the inflated state, FIG. 24b is a vertical sectional view of the inflated airbag 100B, FIG. 25a is a horizontal sectional view before an occupant collides with the inflated airbag 100B, FIG. 25b is a horizontal sectional view after the occupant collides with the inflated airbag 100B, and FIG. 26 is a horizontal sectional view just after the airbag 100B starts to be inflated.

The airbag 100B is also a front passenger-side airbag disposed in an instrument panel (not shown) of a vehicle. In this embodiment, the airbag 100B is folded and accommodated in a container 101A and can be inflated by an inflator 102A.

The airbag 100B narrows toward the rear end side (the side opposite to the occupant side) and thus has a triangular shape in a side view and a plan view when the airbag 100B is inflated, as shown in FIG. 24b and FIG. 25a. In this embodiment, an inflator mounting portion 100g is provided near the rear end of a lower surface of the airbag 100B. In this embodiment, an inflator receiving opening (not shown) is formed in the lower surface of the airbag 100B near the rear end. The inflator 102A is inserted into the airbag 100B through the inflator receiving opening.

Numeral 106 in FIG. 24b designates a fixing member for fixing the inflator 102A and the airbag 100B to the container 101A. The fixing member 106 is arranged to press the inflator 102A and the inflator mounting portion 100g of the airbag 100B against the bottom of the container 101A from the inside of the airbag 100B. The fixing member 106 is fixed to the bottom of the container 101A by bolts 106a.

As shown in FIG. 25a, in this embodiment, vent holes 110 are formed in left and right side surfaces 100h, 100m of the airbag 100B, respectively. Both the vent holes 110 are covered by lid members 120 from the inside of the airbag 100B, respectively.

Also in this embodiment, each lid member 120 extends roughly in an anteroposterior direction (a direction connecting the occupant side to the side opposite to the occupant side) of the airbag 100B and across each vent hole 110. An end portion of each lid member 120 on the side opposite to the occupant side is sewn to each side surface 100h, 100m (inner surface) of the airbag 100B by seam 121 at a position near the rear end side of the airbag 100B relative to each vent hole 110. The end on the occupant side of each lid member 120 continues to a tether 130.

At a position near the occupant side relative to each vent hole 110, an insertion loop 140 through which the tether 130 is inserted is attached to the side surface 100h, 100m (inner surface) of the airbag 100B, respectively. Each tether 130 is arranged to extend to the occupant side from each lid member 120 and has a midway portion inserted through the insertion loop 140.

Also in this embodiment, each lid member 120 and each corresponding tether 130 are integrally formed. In this embodiment, the occupant-side ends of the left and right tethers 130, 130 are connected to each other via a mounting piece 132. That is, in this embodiment, the left and right lid members 120, 120, the tethers 130, 130 continued from the lid members 120, and the mounting piece 132 are integrally formed by cutting out them from a sheet of fabric. However, these components 120, 130, 132 may be separately formed.

The mounting piece 132 is sewn to the occupant facing surface 100f of the airbag 100B by seam 131. Therefore, the occupant-side ends of the tethers 130 are connected to the occupant facing surface 100f.

The description will be made as regard to the airbag 100B. In the present invention, the occupant-side ends of the tethers 130 are preferably connected to a portion of the occupant facing surface 100f confronting the aforementioned inflator mounting portion 100g, i.e. the inflator 102A. As shown in FIG. 25a, in this embodiment, a portion about the middle in the lateral direction of the occupant facing surface 100f confronts the inflator 102. The occupant-side ends of the tethers 130 are connected to the portion about the middle in the lateral direction of the occupant facing surface 100f. A line segment Lc in FIG. 25a indicates a center line passing through the middle in the lateral direction of the airbag 100B.

Details will be described in the explanation for the operation of an airbag device comprising the airbag 100B. The occupant-side ends of the tethers 130 are connected to the portion confronting the inflator 102A of the occupant facing surface 100f of the airbag 100B, whereby the lid members 120 can be rapidly overlaid on the respective vent holes 110 at an early stage of the inflation of the airbag 100B.

In the present invention, it is preferable that the connected position K where the occupant-side ends of the tethers 130 are connected to the occupant facing surface 100f is 50 mm or more apart down from the upper end 100t of the inflated airbag 100B and 100 mm or more apart above from the lower end 100b of the airbag 100B and is within a range about 200 mm or less from the center (the aforementioned center line Lc) of the occupant facing surface 100f in both leftward and rightward directions.

By setting the connected position K of the occupant-side ends of the tethers 130 to the occupant facing surface 100f in this manner, any of parts from the abdominal part to the head of the occupant collides with the connected position K, where the occupant facing surface 100f and the occupant-side ends of the tethers 130 are connected to each other, when the occupant depresses the occupant facing surface 100f of the airbag 100B even though the seated height and seated position vary to some level from person to person. Accordingly, the tethers 130 are pushed toward the lid members 120 so that the lid members 120 conduct opening operation.

The other components of the airbag 100B are the same as those of the aforementioned airbag 100 as shown in FIG. 18a through FIG. 19b. The folding method of the airbag 100B is also the same as that of the airbag 100. Numerals in FIG. 24 through FIG. 26 which are the same as those in FIG. 18a through FIG. 19b designate the same components of the aforementioned embodiment as shown in FIG. 18a through FIG. 19b.

Hereinafter, the actions of the airbag apparatus comprising the airbag 100B of this embodiment will be described.

In the event of a vehicle collision, the inflator 102A is actuated to spout gas into the airbag 100B so as to inflate the airbag 100B. As shown in FIG. 25a, according to the bulge of the occupant facing surface 100f of the airbag 100B toward the occupant side, the tethers 130 are deployed to elongate toward the occupant side. Accordingly, the lid members 120 are pulled toward the occupant side by the tethers 130, are thus tensioned, and are overlaid on the vent holes 110, respectively. Therefore, the vent holes 110 are closed, thereby restricting the outflow of gas from the airbag 100B.

In the airbag 100B, the occupant side end portions of the respective tethers 130 are connected to a portion about the center in the lateral direction of the occupant facing surface 100f of the airbag 100B confronting the inflator 102A. As shown in FIG. 26, as the inflator 102A is actuated, gas spouted from the inflator 102A collides with the portion about the center in the lateral direction of the occupant facing surface 100f so that the portion about the center in the lateral direction of the occupant facing surface 100f is rapidly deployed toward the occupant side. Therefore, the tethers 130 are also deployed to elongate toward the occupant side. As a result of this, the lid members 120 are pulled and tensioned by the tethers 130 to close the vent holes 110 in the early stage of inflation of the airbag 100B, thereby extremely rapidly inflating the airbag 100.

Also in this embodiment, the airbag 100B is folded keeping the state that the lid members 120 are overlaid on the vent holes 110 from the inside of the airbag 100B, whereby the lid members 120 are in the state overlaid on the vent holes 110 from the start of inflation of the airbag 100B. Therefore, the outflow of gas through the vent hole 110 is restricted from the start of inflation of the airbag 100B.

Figure 29:
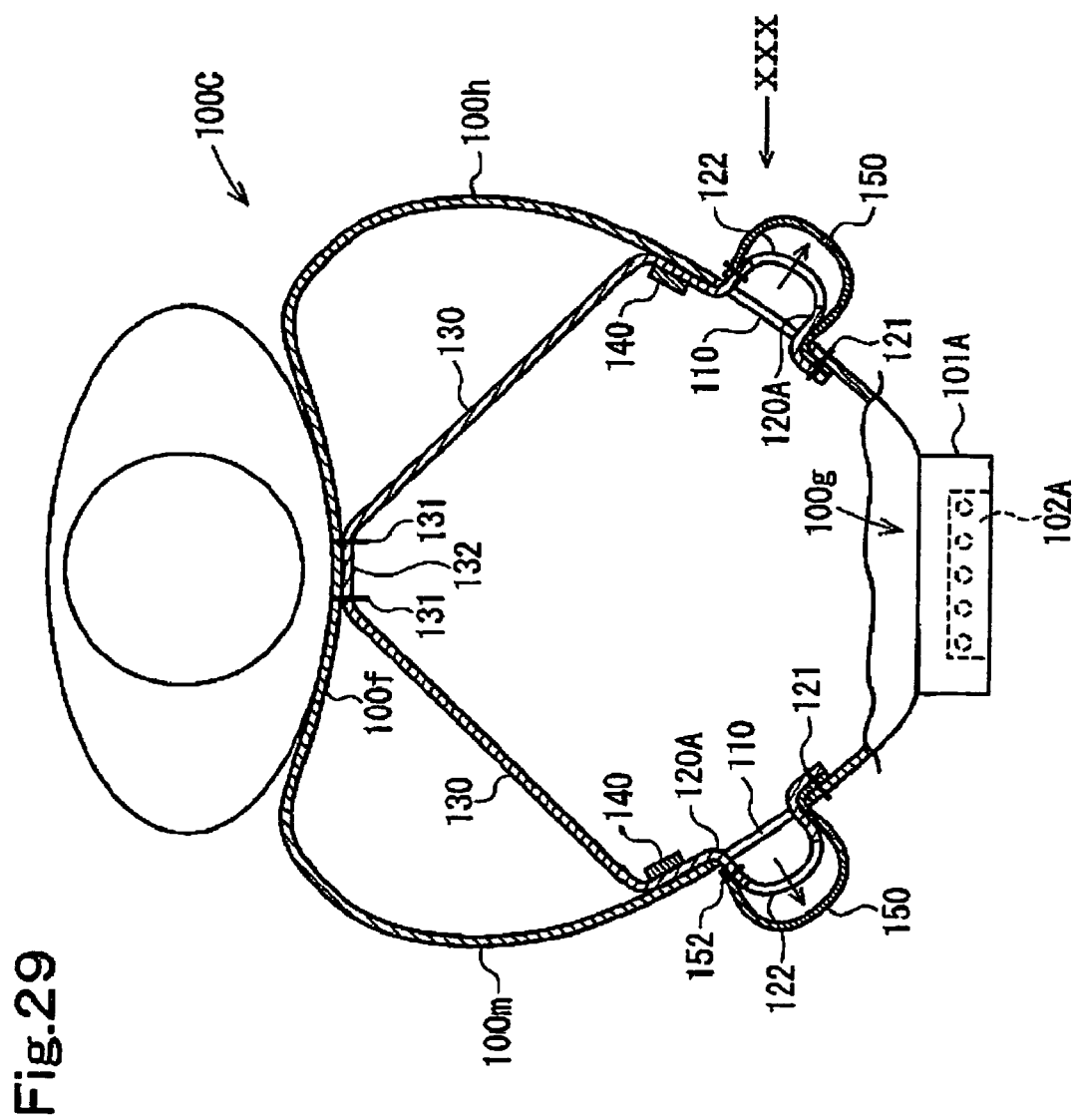

After that, when the occupant plunges into the thus inflated airbag 100C, the occupant facing surface 100f is pressed by the occupant and thus depressed as shown in FIG. 29. Accordingly, the pulling force of the tethers 130 for pulling the lid members 120A toward the occupant side is cancelled so that the tension of the lid members 120A is released. Therefore, the lid members 120A are pushed out of the airbag 100C through the vent holes 110 by inner gas pressure of the airbag 100C so that the vent holes 110 are opened. As a result, gas flows out of the airbag 100C through the vent holes 110, whereby the occupant is softly received and restrained by the airbag 100C.

In the airbag 100B, since both the left and right side surfaces 100h, 100m of the airbag 100B have the vent holes 110, respectively, gas substantially laterally evenly flows out of the airbag 100B when the respective vent holes 110 are opened.

In addition, even when the depression amount of the occupant facing surface 100f is small when the occupant collides with the inflated airbag 100C so that the spacing amounts of the lid members 120A from the vent holes 110 are small, enough amount of gas flows out of the airbag 100C because the gas flows out not only through spaces between each lid member 120A and each vent hole 110 but also the first windows 122 and the second windows 151.

Figure 27A:
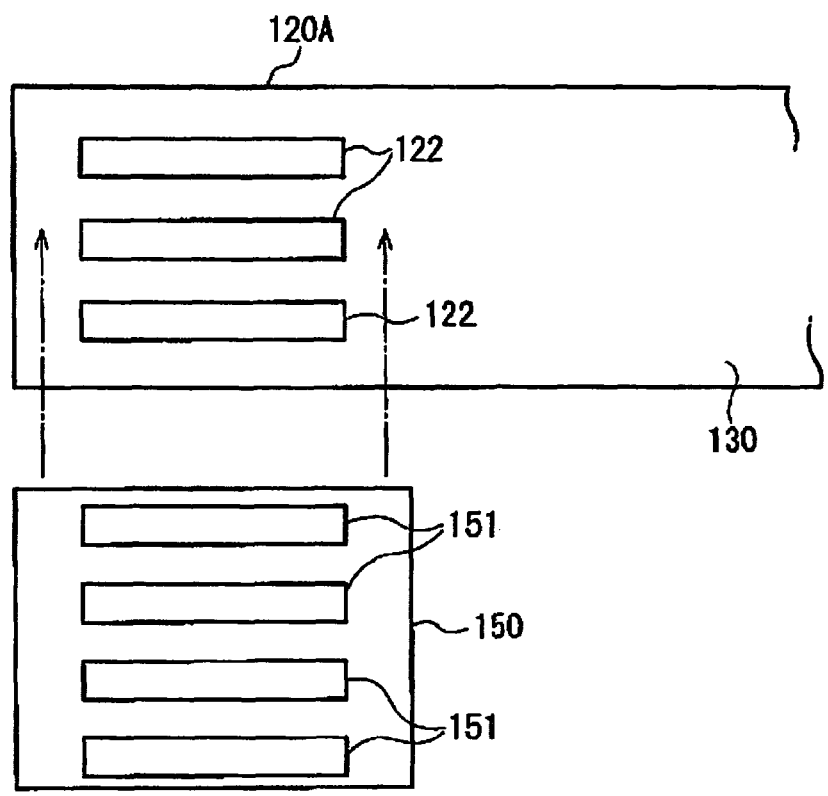
FIG. 27a is an exploded plan view of a lid member and a cover panel of an airbag of an embodiment and FIG. 27b is a plan view of the lid member after the cover panel is mounted.
Figure 27B:
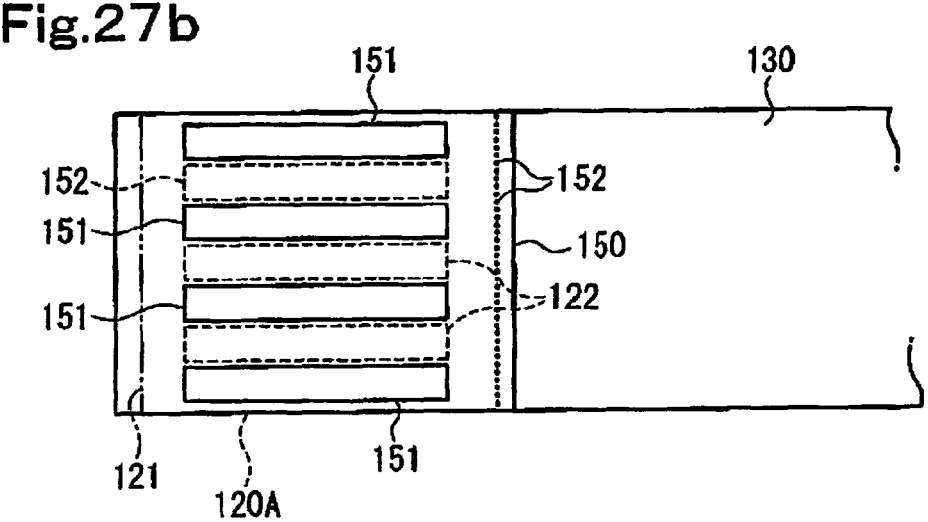
Figure 30:
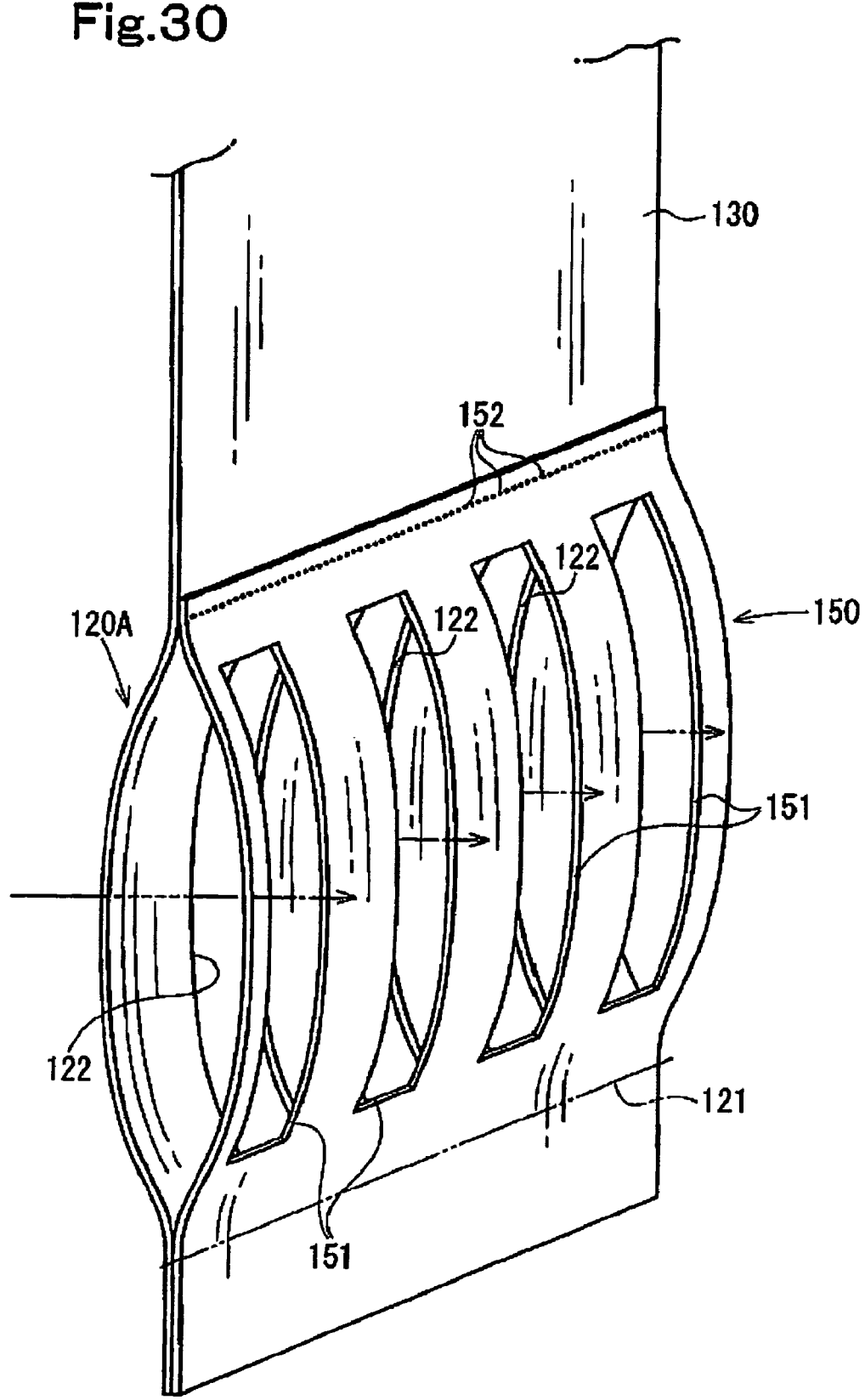
FIG. 30 is a perspective view showing a portion XXX of FIG. 29.

FIG. 27a is an exploded plan view of a lid member 120A and a cover panel 150 of an airbag 100C according to a different embodiment, FIG. 27b is a plan view of the lid member 120A after the cover panel 150 is attached, FIG. 28 is a horizontal sectional view of the airbag 100C having the lid member 120A in the inflated state, FIG. 29 is a horizontal sectional view of the inflated airbag 100C in the state after an occupant collides with the airbag 100C, and FIG. 30 is a perspective view of an XXX portion (around a vent hole 110) of FIG. 29. It should be noted that the illustration of the panel around the bent hole 110 of the airbag 100C is omitted.

Also in the airbag 100C, vent holes 110 are formed in left and right side surfaces 100h, 100m, respectively and lid members 120A are overlaid on vent holes 110 from the inside of the airbag 100C, respectively.

Also in this embodiment, each lid member 120A extends roughly in an anteroposterior direction (a direction connecting the occupant side to the side opposite to the occupant side) of the airbag 100C and across each vent hole 110. An end portion of each lid member 120 on the side opposite to the occupant side is sewn to each side surface 100h, 100m (inner surface) of the airbag 100C by seam 121 at a position near the rear end side (the side opposite to the occupant side) of the airbag 100C relative to each vent hole 110. The end on the occupant side of each lid member 120 continues to a tether 130.

In this embodiment, each lid member 120A is provided with a plurality of (three in this embodiment) first windows 122 formed therein. In this embodiment, each first window 122 is a slit-like opening extending in the longitudinal direction of the tether 130 continued from the lid member 120A and the first windows 122 are arranged in parallel to each other and spaced from each other in the width direction of the tether 130. Also in this embodiment, each lid member 120 and each corresponding tether 130 are integrally formed.

In this embodiment, a cover panel 150 is overlaid on each lid member 120A to cover the first windows 122. The cover panel 150 is a substantially rectangular woven fabric having substantially the same width as the lid member 120A.

One end portion of each cover panel 150 is sewn to each lid member 120A by seam 123 on the side near the tether 130 relative to the first windows 122. The other end portion of each cover panel 150 is superposed on the end portion of each lid member 120A opposite to the tether 130 relative to the first windows 122 and is sewn to the side surface 100h, 100m of the airbag 100C together with the end portion of the lid member 120A. It should be noted that the other end portion of the cover panel 150 may be previously sewn to the lid member 120A prior to the sewing of the lid member 120A to the side surface 100h, 100m of the airbag 100C.

Each cover panel 150 is provided with a plurality of (four in this embodiment) second windows 151 formed in portions not facing the first windows 122. In this embodiment, each second window 151 is also a slit-like opening extending in the longitudinal direction of the tether 130 continued from the lid member 120A and the second windows 151 are arranged in parallel to each other and spaced from each other in the width direction of the tether 130.

As shown in FIG. 27b, the windows 122, 151 are arranged such that each first window 122 faces a panel portion of the cover panel 150 between adjacent second windows 151, 151 and each second window 151 faces a panel portion of the lid member 120A between adjacent first windows 122, 122 when the cover panel 150 is overlaid on the lid member 120A.

The other components of the airbag 100C are the same as those of the aforementioned airbag 100B as shown in FIGS. 24a through 26. The folding method of the airbag 100C is also the same as that of the airbag 100B. Numerals in FIG. 27a through FIG. 30 which are the same as those in FIG. 24a through FIG. 26 designate the same components of the aforementioned embodiment as shown in FIG. 24a through FIG. 26.

Hereinafter, the actions of the airbag apparatus comprising the airbag 100C of this embodiment will be described.

In the event of a vehicle collision, the inflator 102A is actuated to spout gas into the airbag 100C so as to inflate the airbag 100C. As shown in FIG. 28, according to the bulge of the occupant facing surface 100f of the airbag 100C toward the occupant side, the tethers 130 are deployed to elongate toward the occupant side. Accordingly, the lid members 120 are pulled toward the occupant side by the tethers 130, are thus tensioned, and are overlaid on the vent holes 110, respectively.

As the lid members 120A are pulled toward the occupant side by the tethers 130, the end portions of the cover panels 150 on the tether 130 side are also pulled toward the occupant side, are thus tensioned, and are overlaid on the lid members 120A, respectively as shown in FIG. 28. Therefore, the first windows 122 of each lid member 120A are closed by the cover panel 150 and the second windows 151 of each cover panel 150 are closed by the lid member 120A.

As a result, the outflow of gas through the vent holes 110 and the respective windows 122, 155 is prevented, thereby rapidly inflating the airbag 100C.

Also in this embodiment, the airbag 100C is folded keeping the state that the lid members 120A are overlaid on the vent holes 110 from the inside of the airbag 100C, whereby the lid members 120A are in the state overlaid on the vent holes 110 from the start of inflation of the airbag 100C. Therefore, the outflow of gas through the vent holes 110 is restricted from the start of inflation of the airbag 100C, thereby extremely rapidly inflating the airbag 100C.

Also in the airbag 100C, the occupant-side ends of the tethers 130 are connected to a portion about the center in the lateral direction of the occupant facing surface 100f of the airbag 100C which confronts the inflator 102A. Therefore, as the inflator 102A is actuated, gas spouted from the inflator 102A collides with the portion about the center in the lateral direction of the occupant facing surface 100f so that the portion about the center in the lateral direction of the occupant facing surface 100f is rapidly deployed toward the occupant side. Accordingly, the tethers 130 are also rapidly deployed to elongate toward the occupant side. As a result of this, the lid members 120A and the cover panels 150 are pulled and tensioned by the tethers 130 to close the vent holes 110 and first and second windows 122, 151 in the early stage of inflation of the airbag 100C, thereby extremely rapidly inflating the airbag 100C.

After that, when the occupant plunges into the thus inflated airbag 100C, the occupant facing surface 100f is pressed by the occupant and thus depressed as shown in FIG. 29. Accordingly, the pulling force of the tethers 130 for pulling the lid members 120A toward the occupant side is cancelled so that the tension of the lid members 120A is released. Therefore, the lid members 120A are pushed out of the airbag 100C through the vent holes 110 by inner gas pressure of the airbag 100C so that the vent holes 110 are opened. As a result, gas flows out of the airbag 100C through the vent holes 110, whereby the occupant is softly received and restrained by the airbag 100C.

As the tension of the lid members 120A is released, the tension of the cover panels 150 is also released. Therefore, as shown in FIG. 30, each cover panel 150 is spaced apart from the lid member 120A, thereby opening the first windows 122 and the second windows 151.

In this state, gas flowing out of the airbag 100C through each vent hole 110 passes through the first windows 122 and the second windows 151 to flow to the outer side (the side opposite to the airbag 100C) even when colliding with the inner side (the airbag 100C side) of the lid member 120A, whereby gas smoothly flows out through the vent holes 110.

In addition, even when the depression amount of the occupant facing surface 100f is small when the occupant collides with the inflated airbag 100C so that the spacing amounts of the lid members 120A from the vent holes 110 are small, enough amount of gas flows out of the airbag 100C because the gas flows out not only through spaces between each lid member 120A and each vent hole 110 but also the first windows 122 and the second windows 151.

Though the first windows 122 and the second windows 151 are all slit-like openings extending in the longitudinal direction of the tethers 130 in this embodiment, the configurations of the first windows 122 and the second windows 151 are not limited thereto. The number of the windows 122, 151 is not limited to the aforementioned number.

Figure 31A:
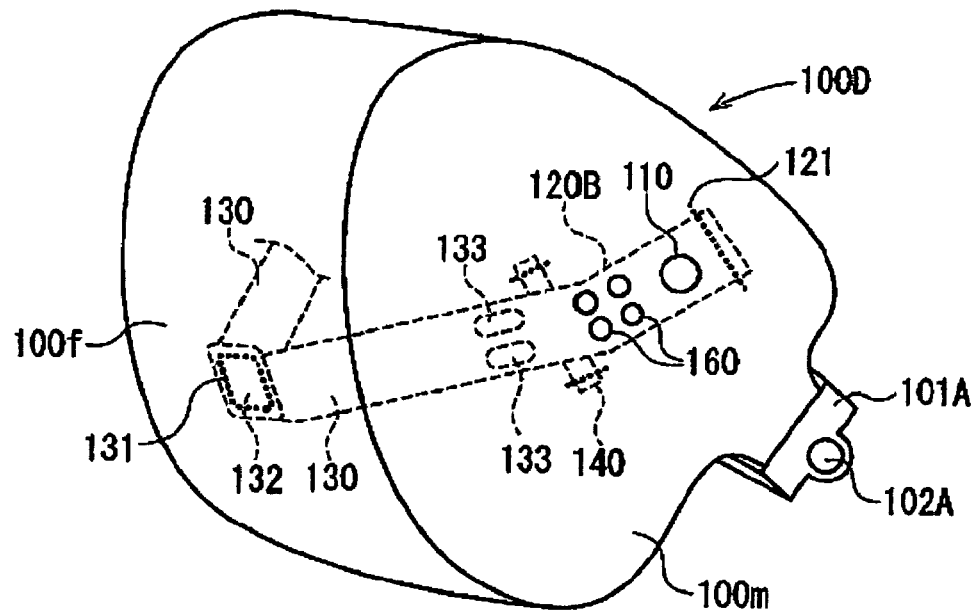
FIG. 31a is a perspective view showing an airbag according to an embodiment in its inflated state and FIG. 31b is a vertical sectional view showing the airbag shown in FIG. 31a in its inflated state.
Figure 31B:
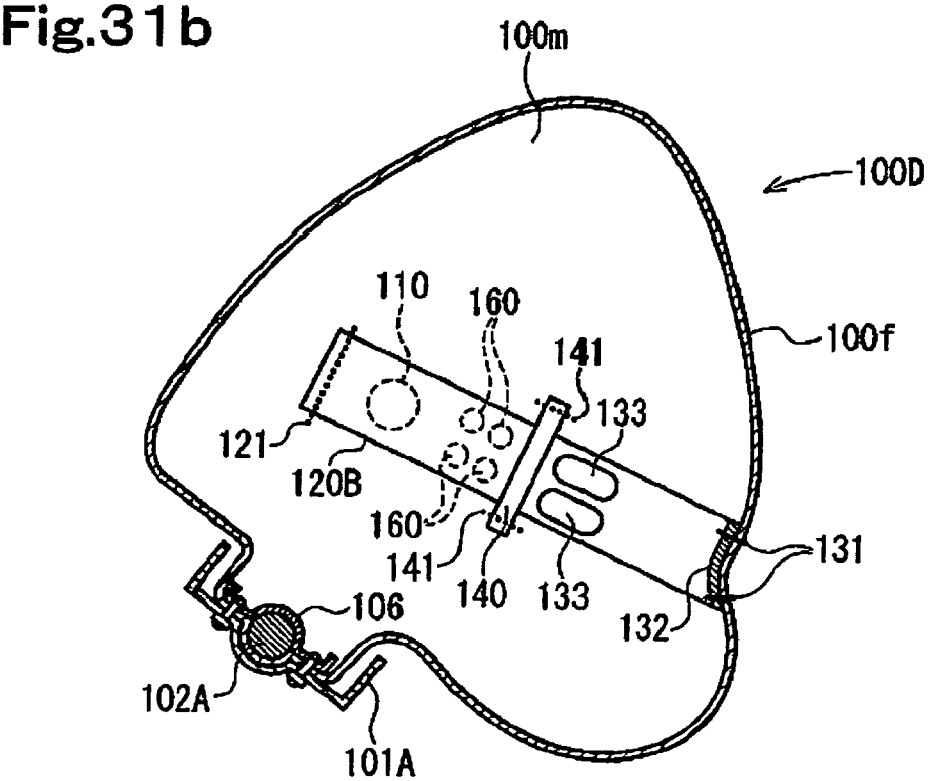
Figure 33:
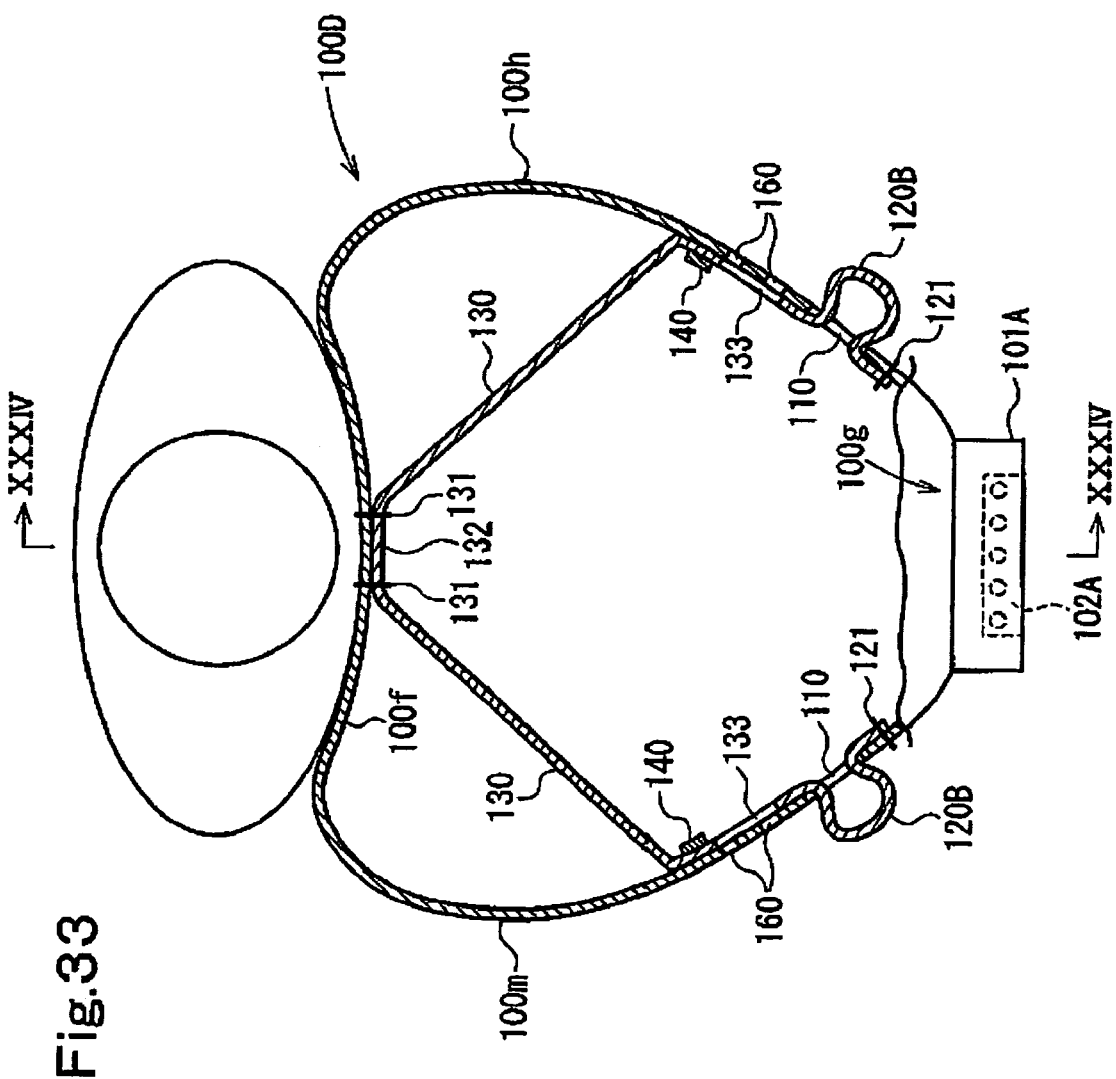
Figure 34:
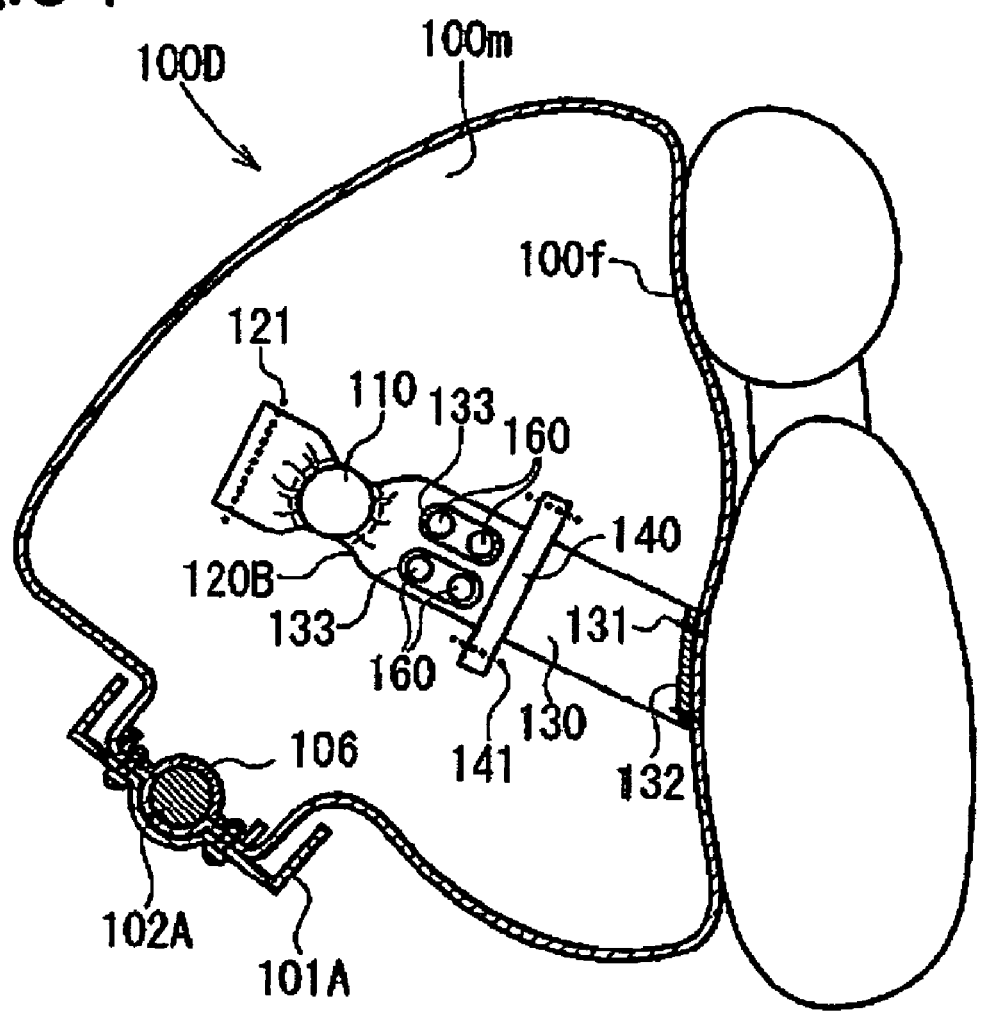

FIG. 31a is a perspective view of an airbag 100D according to still another embodiment in the inflated state, FIG. 31b is a vertical sectional view of the airbag 100D in the inflated state, FIG. 32 is a horizontal sectional view of the airbag 100D in the inflated state, FIG. 33 is a horizontal sectional view showing a state after an occupant collides with the inflated airbag 100D, and FIG. 34 is a vertical sectional view showing a state after the occupant collides with the inflated airbag 100D.

In the airbag 100D, a plurality of (four in this embodiment) small-diameter sub vent holes 160 are formed in each of left and right side surfaces 100h, 100m of the airbag 100D at a position between each vent hole 110 (hereinafter, the vent hole 110 will be sometimes referred to as "main vent hole") and each insertion loop 140.

Each lid member 120B of this embodiment extends from the inner side of the airbag 100D in an anteroposterior direction (a direction connecting an occupant side to the side opposite to the occupant side) of the airbag 100D along the left or right side surface 100h, 100m of the airbag 100D so as to continuously cover both the main vent hole 110 and the sub vent holes 160.

In this embodiment, the sub vent holes 160 in each side surface 100h, 100m of the airbag 100D are arranged in two rows and two lines so that the positions of the sub vent holes 160 are shifted in the longitudinal direction and the width direction of each lid member 120B.

In this embodiment, the tether 130 has two release holes 133 formed in a midway portion in the longitudinal direction of the tether 130 continued from the occupant side of the lid member 120B. The release holes 133 are elongated holes extending in the longitudinal direction of the tether 130 and arranged in parallel with each other and spaced apart from each other in the width direction of the tether 130.

As shown in FIG. 34, these release holes 133 are arranged such that the release holes 133 are positioned to correspond to the sub vent holes 160 when the tether 130 moves a predetermined distance toward the main vent hole 110 according to the movement of the lid member 120B to be pushed out through the main vent hole 110.

As shown in FIG. 34, each release hole 133 has such a length that the release hole 133 is continuously superposed on two sub vent holes 160, 160 which are formed in each side surface 100h, 100m of the airbag 100D to be aligned in the longitudinal direction of the lid member 120B.

Also in this embodiment, the airbag 100D is folded keeping the state that each lid member 120B is overlaid on the main vent hole 110 and the sub vent holes 160 from the inside of the airbag 100D.

The other components of the airbag 100D are the same as those of the aforementioned airbag 100B as shown in FIGS. 24 through 26. Numerals in FIGS. 31 through 34 which are the same as those in FIGS. 24 through 26 designate the same components of the aforementioned embodiment as shown in FIG. 24 through FIG. 26.

Hereinafter, the actions of the airbag apparatus comprising the airbag 100D of this embodiment will be described.

In the event of a vehicle collision, the inflator 102A is actuated to spout gas into the airbag 100D so as to inflate the airbag 100D. As shown in FIG. 32, according to the bulge of the occupant facing surface 100f of the airbag 100D toward the occupant side, the tethers 130 are deployed to elongate toward the occupant side. Accordingly, the lid members 120B are pulled toward the occupant side by the tethers 130, are thus tensioned, and are overlaid on the main vent holes 110 and the sub vent holes 160, respectively.

As a result, the outflow of gas through the main vent holes 110 and the sub vent holes 160 is restricted, thereby rapidly inflating the airbag 100D.

Also in this embodiment, the airbag 100D is folded keeping the state that the lid members 120B are overlaid on the main vent holes 110 and the sub vent holes 160 from the inside of the airbag 100D, whereby the lid members 120B are in the state overlaid on the main vent holes 110 and the sub vent holes 160 from the start of inflation of the airbag 100D. Therefore, the outflow of gas through the vent holes 110 and the sub vent holes 160 is restricted from the start of inflation of the airbag 100D, thereby extremely rapidly inflating the airbag 100D.

Also in the airbag 100D, the occupant-side ends of the tethers 130 are connected to a portion about the center in the lateral direction of the occupant facing surface 100f of the airbag 100D which confronts the inflator 102A. Therefore, as the inflator 102A is actuated, gas spouted from the inflator 102A collides with the portion about the center in the lateral direction of the occupant facing surface 100f so that the portion about the center in the lateral direction of the occupant facing surface 100f is rapidly deployed toward the occupant side. Accordingly, the tethers 130 are also rapidly deployed to elongate toward the occupant side. As a result of this, the lid members 120B are pulled and tensioned by the tethers 130 to close the main vent holes 110 and the sub vent holes 160 in the early stage of inflation of the airbag 100D, thereby extremely rapidly inflating the airbag 100.

After that, when the occupant plunges into the thus inflated airbag 100D, the occupant facing surface is pressed by the occupant and thus depressed as shown in FIG. 33. Accordingly, the pulling force of the tethers 130 for pulling the lid members 120B toward the occupant side is cancelled so that the tension of the lid members 120B is released. Therefore, the lid members 120B are pushed out of the airbag 100D through the main vent holes 110 by inner gas pressure of the airbag 100D so that the main vent holes 110 are opened.

As the lid members 120B are pushed out through the main vent holes 110, the tethers 130 move toward the main vent holes 110, respectively, so that the release holes 133 move to positions superposed on the sub vent holes 160 so as to open the sub vent holes 160.

As a result, gas flows out of the airbag 100D through the main vent holes 110 and the sub vent holes 160, whereby the occupant is softly received by the airbag 100D.

In the airbag 100D, even when the depression amount of the occupant facing surface 100f when the occupant collides with the inflated airbag 100D is small so that the spacing amounts of the lid members 120B from the vent holes 110 are small, enough amount of gas flows out of the airbag 100D because the gas flows out not only through spaces between the lid members 120B and the vent holes 110 but also the sub vent holes 160.

In this embodiment, two sub vent holes 160 are aligned in a direction from the insertion loop 140 to the main vent hole 110 in each side surface 100m, 100m of the airbag 100D. As the moving distance of the release holes 133 toward the main vent holes 110 is increased, the number of sub vent holes 160 overlaid on each release hole 133 is increased, i.e. from 0 to 1, from 1 to 2.

That is, in the airbag 100D, as the depression amount of the occupant facing surface 100f is increase, the moving distance of each release hole 133 is increased so that the release holes 133 are superposed on a larger number of sub vent holes 160. Therefore, the entire release amount of the sub vent holes 160 is increased so that a larger amount of gas flows out of the airbag 100D. Accordingly, the larger the amount of gas flowing out of the airbag 100D is, the larger the impact absorbing amount of the airbag 100D is.

Therefore, the airbag 100D can adjust the impact absorbing amount in accordance with the depression amount of the occupant facing surface 100f.

For example, the larger the occupant's body is or the higher the collision speed is, the larger the depression amount of the occupant facing surface 100f when the occupant collides with the inflated airbag 100D is. In this case, in the airbag 100D, the entire opening amount of the sub vent holes 160 is increased so that a larger amount of gas flows out of the airbag 100D, thereby sufficiently absorbing impact.

The shapes, the numbers, and the arrangements of the sub vent holes 160 and the release holes 133 are not limited to the aforementioned structure.

Figure 35A:
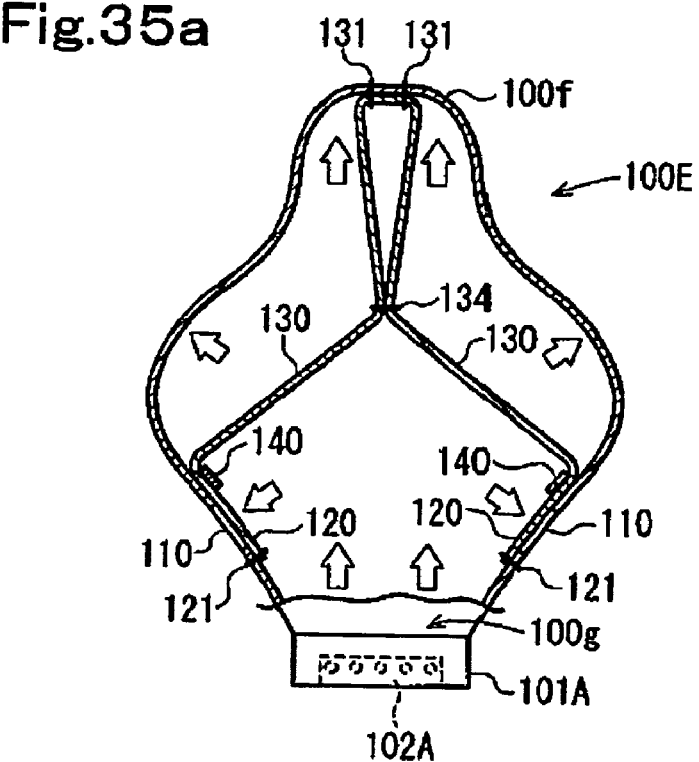
FIG. 35a is a horizontal sectional view showing an airbag according to an embodiment in a way of inflation and FIG. 35b is a horizontal sectional view of the airbag shown in FIG. 35a in a state that the airbag is completely inflated.
Figure 35B:
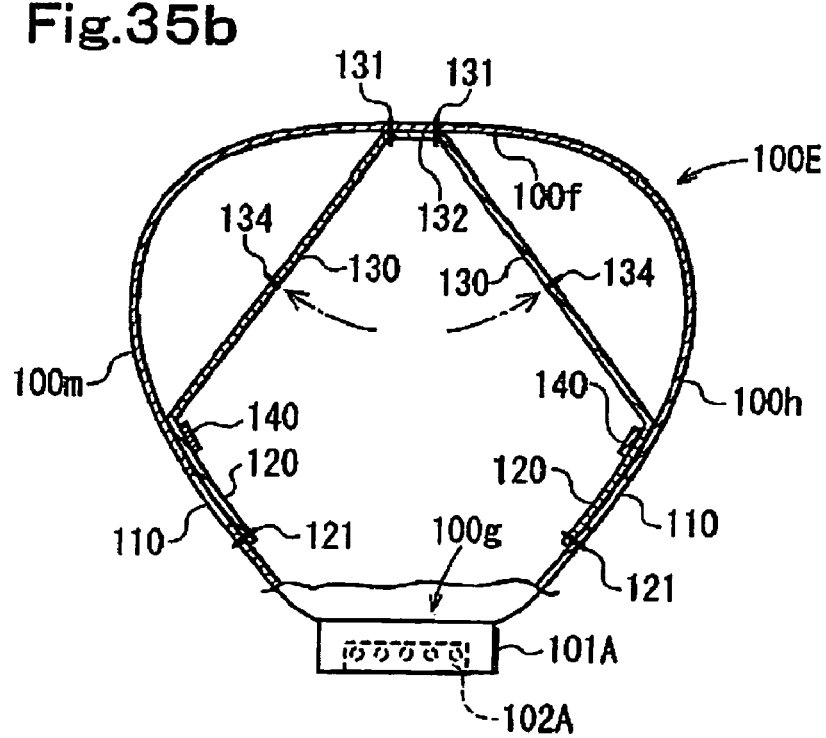

FIGS. 35a and 35b are horizontal sectional views of an airbag 100E according to still further another embodiment. FIG. 35a shows the airbag 100E on the way of inflation of the airbag 100E and FIG. 35b shows the airbag 100E at the completion of the inflation.

The airbag 100E of this embodiment is different form the aforementioned airbag 100B as shown in FIGS. 24a through 26 in which midway portions in the longitudinal direction of the tethers 130, 130 as left and right tethering members are detachably connected to each other by a tear seam 134 as a connecting means.

The tear seam 134 is made by sewing yarn which will break when predetermined tension or more acts on the yarn. In this embodiment, as the inner gas pressure of the airbag 100E becomes to a predetermined value or more, the tear seam 134 breaks to release the connection between the tethers 130, 130 so that the tethers 130, 130 are separated from each other.

The other components of the airbag 100E are the same as those of the aforementioned airbag 100B as shown in FIGS. 24a through 26. Numerals in FIGS. 35a and 35b which are the same as those in FIGS. 24a through 26 designate the same components of the aforementioned embodiment as shown in FIG. 24a through FIG. 26.

Also in this embodiment, the airbag 100E is folded keeping the state that each lid member 120 is overlaid on the vent hole 110 from the inside of the airbag 100E.

Hereinafter, the actions of the airbag apparatus comprising the airbag 100E of this embodiment will be described.

In the event of a vehicle collision, the inflator 102A is actuated to spout gas into the airbag 100E so as to inflate the airbag 100E. As shown in FIG. 35a, according to the bulge of the occupant facing surface 100f of the airbag 100E toward the occupant side, the tethers 130 are deployed to elongate toward the occupant side.

In the airbag 100E, the midway portions in the longitudinal direction of the left and right tethers 130, 130 are connected to each other by the tear seam 134 until the inner pressure of the airbag 100E reaches the predetermined value, thereby restricting the tethers 130 from elongating toward the occupant side. Therefore, the tethers 130 are tensioned before the occupant facing surface 100f of the airbag 100E bulges to a position where is the position at the completion of inflation of the airbag 100E.

At an early stage of the inflation of the airbag 100E, each lid member 120 is pulled by the tether 130 and is tensioned to close the vent hole 110. As a result, the airbag 100E is rapidly inflated to have high inner pressure, thereby accelerating the inflation of the airbag 100E.

Also in this embodiment, the occupant-side ends of the tethers 130 are connected to a portion about the center in the lateral direction of the occupant facing surface 100f of the airbag 100E which confronts the inflator 102A so that the tethers 130 can be deployed to elongate toward the occupant side by the spouting gas pressure from the inflator 102A immediately after the start of actuation of the inflator 102A.

Also in this embodiment, the airbag 100E is folded keeping the state that the lid members 120 are overlaid on the vent holes 110 from the inside of the airbag 100E, whereby the lid members 120 are in the state overlaid on the vent holes 110 from the start of inflation of the airbag 100E. Therefore, the outflow of gas through the vent holes 110 is restricted from the start of inflation of the airbag 100E.

This also accelerates the inflation of the airbag 100E.

After that, as the inner pressure of the airbag 100E reaches the predetermined value or more, the tear seam 134 breaks and the tethers 130, 130 are thus separated from each other. Accordingly, the restriction of elongation of the tethers 130 toward the occupant side is cancelled so that the airbag 100E is inflated to the maximum as shown in FIG. 35b.

The actions of the lid members 120 when the occupant plunges into the thus inflated airbag 100E after that are the same as the aforementioned airbag 100B.

Though the tear seam 134 which breaks when receiving predetermined tension or more is used as the connecting means for detachably connecting the midway portions in the longitudinal direction of the tethers 130, 130 to each other in this embodiment, another connecting means may be employed. For example, the tethers 130, 130 are detachably bonded to each other by adhesive agent having such low adhesion force that the adhesive agent is peeled when a predetermined force or more is applied in a peeling direction.

In the present invention, the airbag may have such a structure that three or more vent holes are formed, a lid member is provided for each vent hole, a free end portion of each lid member and an occupant facing surface of an airbag is connected by a tether, and midway portions in the longitudinal direction of the three or more tethers are detachably connected.

Since the aforementioned embodiments are illustrative examples of the present invention, the present invention is not limited to the aforementioned embodiments.

In the present invention, the lid member may have such a structure that the lid member covers partially the vent hole until the airbag is inflated to a predetermined level and the lid member allows the vent hole to widely open when the airbag is inflated to the predetermined volume or more.

Though the vent hole has a circular opening shape in any of the aforementioned embodiments, the shape of the vent hole is not limited thereto and the vent hole may have various shapes such as a slit-like shape.

Though only one vent hole is formed in the airbag in any of the aforementioned embodiments as shown in FIGS. 1 through 23b, two or more vent holes may be formed. Though two vent holes are formed in the airbag in any of the aforementioned embodiments as shown in FIGS. 24a through 35b, three or more vent holes may be formed.

Any of the aforementioned embodiments as shown in FIGS. 1 through 23b may have a structure similar to the aforementioned embodiment as shown in FIGS. 27a through 30, that is, first windows are formed in the lid member, a cover panel is overlaid on the lid member to cover the first windows, and second windows are formed in the cover panel at positions not corresponding to the first windows.

Any of the aforementioned embodiments as shown in FIGS. 1 through 23b may have a structure similar to the aforementioned embodiment as shown in FIGS. 31a through 34, that is, sub vent holes are formed in the airbag at a position between the main vent hole and the tether insertion loop, the lid member covers the main vent hole and the sub vent holes continuously and is provided with release holes in a portion thereof on the tether side relative to the sub vent holes or a midway in the longitudinal direction of the tether, such that the release holes are positioned to correspond to the sub vent holes to open the sub vent holes when the lid member is pushed out through the main vent hole.

In the present invention, an open type vent hole which always opens may be formed besides the vent hole(s) to be covered by the lid member(s).

The present application is based on Japanese patent application (Application No. 2006-027355) filed Feb. 3, 2006 and Japanese patent application (Application No. 2006-066041) filed Mar. 10, 2006 which are incorporated herein by reference.

What is claimed is:

1. An airbag, including a vent hole and a restriction mechanism for restricting outflow of gas through the vent hole, wherein
the vent hole is formed in a surface opposite to an occupant facing surface of the airbag in the inflated state or in a side surface of the airbag in the inflated state, wherein
the restriction mechanism comprises:
a lid member which is disposed inside the airbag to cover the vent hole; and
a tethering member which extends inside the airbag to connect the lid member and said occupant facing surface, wherein
when the airbag is inflated, the lid member is prevented from moving to outside of the airbag and is overlaid on said vent hole by the tethering member so that the vent hole is closed or slightly opened, and
as an occupant collides with the inflated airbag to depress said occupant facing surface, the lid member is pushed out of the airbag through the vent hole by the inner gas pressure of the airbag so as to open or widely open the vent hole.

2. An airbag as claimed in claim 1, further including an insertion loop through which said tethering member is inserted and which is formed on an inner surface of said surface opposite to the occupant facing surface or on an inner surface of said side surface, wherein
said tethering member has one end portion which is connected to said occupant facing surface, a midway portion which is inserted through the insertion loop, and the other end portion which continues to a first end of said lid member, and wherein
a second end of the lid member on the side opposite to the tethering member relative to the vent hole is connected to a portion in the vicinity of the vent hole of the airbag.

3. An airbag as claimed in claim 2, further including a first window formed in said lid member, and
a cover panel which is overlaid on the lid member to cover the first window, wherein
one end of said cover panel is connected to a portion of the lid member on the tethering member side relative to the first window, and the other end of said cover panel is connected to a portion of the lid member on the side opposite to the tethering member side relative to the first window, wherein
a second window is formed in the cover panel at a position not corresponding to the first window, wherein
when the airbag is inflated, the lid member is pulled by the tethering member and is thus tensioned and, according to the tension of the lid member, the cover panel is also tensioned to be overlaid on the lid member so that the first window and the second window are both closed, and wherein
when the occupant collides with the inflated airbag to depress said occupant facing surface, the tension of the lid member is canceled so that the lid member is pushed out of the airbag through the vent hole by the inner gas pressure of the airbag, and the tension of the cover panel is also cancelled so that the cover panel is spaced apart form the lid member so as to open the first window and the second window.

4. An airbag as claimed in claim 3, wherein said first window and said second window are slits extending in the longitudinal direction of said tethering member.

5. An airbag as claimed in claim 2, further including a sub vent hole which is formed in said surface opposite to the occupant facing surface or said side surface at a position between the vent hole and said insertion loop, for allowing the communication between the inside and the outside of the airbag, wherein
said lid member is arranged to cover both the vent hole and the sub vent hole continuously, and wherein
a release hole is formed in a portion of said lid member between an area thereof facing the sub vent hole and said tethering member or in a midway portion in the longitudinal direction of said tethering member, and is positioned to correspond to the sub vent hole so as to open the sub vent hole when said lid member is pushed out through the vent hole.

6. An airbag as claimed in claim 5, wherein a plurality of the sub vent holes are formed at positions shifted in a direction from said insertion loop to said vent hole, and wherein
said release hole is an elongated hole extending in the longitudinal direction of the tethering member.

7. An airbag as claimed in claim 2, wherein at least two said vent holes are formed in said surface opposite to the occupant facing surface or said side surfaces, wherein
said lid members are provided to cover the vent holes, respectively, and said first ends of said lid members are connected to said occupant facing surface via tethering members, wherein
midway portions in the longitudinal direction of the tethering members are detachably connected to each other by a connecting mechanism, and wherein
said connecting mechanism cancels the connection between said tethering members when the inner pressure of the airbag reaches a predetermined value or more.

8. An airbag as claimed in claim 1, further including an inner member which is arranged inside the airbag to connect the occupant facing surface and the surface opposite to the occupant facing surface of the airbag in the inflated state, wherein
said tethering member is connected to said inner member.

9. An airbag as claimed in claim 8, wherein said inner member is an inner panel for partitioning the inside of the airbag into a first chamber centrally located and a second chamber surrounding the first chamber, wherein
said inner panel is provided with a communication hole formed therein for allowing communication between the first chamber and the second chamber, wherein
said airbag is structured such that gas is first introduced into the first chamber so as to inflate the first chamber and the gas is then introduced from the first chamber to the second chamber through the communication hole so as to inflate the second chamber, and wherein
said vent hole is arranged to allow communication between the second chamber and the outside of the airbag.

10. An airbag as claimed in claim 8, wherein said inner member is a restriction strap of which one end is connected to the occupant facing surface of the airbag and the other end is connected to the surface opposite to the occupant facing surface.

11. An airbag as claimed in claim 1, further including an inner member which is arranged to extend across the inside of the airbag to connect side portions of the airbag in the inflated state, wherein
said tethering member is connected to said inner member.

12. An airbag as claimed in claim 8, wherein said tethering member and said inner member are integrally formed.

13. An airbag as claimed in claim 1, wherein a first end of said tethering member is connected to said lid member and a second end of said tethering member is connected to said occupant facing surface.

14. An airbag as claimed in claim 13, further including a gas inlet for introducing gas from a gas generator or a gas generator receiving portion where the gas generator is received and which is formed in the surface opposite to said occupant facing surface of the airbag, wherein the second end of the tethering member is connected to a portion confronting to the gas inlet or the gas generator receiving portion of said occupant facing surface.

15. An airbag as claimed in claim 1, wherein said tethering member and said lid member are integrally formed.

16. An airbag as claimed in claim 1, further including a deflection loop through which said tethering member is inserted and which is provided on the inner surface of said occupant facing surface, wherein one end of said tethering member is connected to said lid member and a midway portion in the longitudinal direction of said tethering member is inserted into said deflection loop.

17. An airbag as claimed in claim 16, further comprising a plurality of deflection loops, the deflection loops are a plurality of occupant-side deflection loops that are disposed on said occupant facing surface at different positions and a plurality of opposite-occupant-side deflection loops that are disposed on the surface opposite to said occupant facing surface, and wherein the midway portion of said tethering member is inserted through the occupant-side deflection loops and the opposite-occupant-side deflection loops alternately.

18. An airbag as claimed in claim 1, further including a pulling member which is arranged inside the airbag for pulling a midway portion in the longitudinal direction of said tethering member to the side opposite to the occupant facing surface, wherein said pulling member is connected at its proximal end to the inner surface of the airbag at the side opposite to the occupant facing surface and is provided at its distal end with a guide loop through which the tethering member is inserted, and wherein a midway portion in the longitudinal direction of said tethering member is inserted through the guide loop.

19. An airbag as claimed in claim 1, wherein said lid member does not protrude outside the airbag through the vent hole and is overlaid on the vent hole from the inside of the airbag at the start of inflation of the airbag.

20. An airbag as claimed in claim 19, the airbag is in the folded state before the inflation, and the airbag is folded keeping the state that the lid member does not protrude outside the airbag through the vent hole and is overlaid on the vent hole from the inside of the airbag.

21. An airbag as claimed in claim 1, further including an open type vent hole which always allows communication between the inside and the outside of the airbag.

22. An airbag apparatus comprising:

an airbag as claimed in claim 1;

a gas generator for supplying gas into the airbag;

a retainer to which the airbag is mounted; and a fixing member for fixing the airbag to the retainer.

23. An airbag apparatus as claimed in claim 22, wherein said fixing member is arranged inside the airbag, wherein said fixing member is provided with an insertion loop through which said tethering member is inserted, wherein said tethering member has a first end portion which is connected to said occupant facing surface of the airbag, a midway portion which is inserted through the insertion loop, and a second end portion which continues to a first end of said lid member, and wherein a second end of the lid member on the side opposite to the tethering member relative to the vent hole is connected to a portion near the vent hole of the airbag.

* * * * *